United States Patent
Ozeki

(10) Patent No.: US 7,156,631 B2
(45) Date of Patent: Jan. 2, 2007

(54) APPARATUS FOR MANUFACTURING A MOLDED PRODUCT, AND MOLDED PRODUCT THAT CAN BE MANUFACTURED WITH THE APPARATUS

(75) Inventor: Yuichi Ozeki, Nagoya (JP)

(73) Assignee: Sanwa Kagaku Kenkyusho Co., Ltd., Nagoya (JP)

(*) Notice: Subject to any disclaimer, the term of this patent is extended or adjusted under 35 U.S.C. 154(b) by 0 days.

(21) Appl. No.: 10/487,779

(22) PCT Filed: Aug. 28, 2002

(86) PCT No.: PCT/JP02/08695

§ 371 (c)(1),
(2), (4) Date: Feb. 24, 2004

(87) PCT Pub. No.: WO03/018302

PCT Pub. Date: Mar. 6, 2003

(65) Prior Publication Data

US 2004/0247728 A1    Dec. 9, 2004

(30) Foreign Application Priority Data

Aug. 30, 2001  (JP) .............................. 2001-260924
Oct. 23, 2001  (JP) .............................. 2001-325284

(51) Int. Cl.
B29C 43/08     (2006.01)
B30B 11/02     (2006.01)
B30B 11/08     (2006.01)

(52) U.S. Cl. ........................ 425/78; 425/195; 425/216; 425/345; 425/355

(58) Field of Classification Search .................. 425/78, 425/193, 195, 344, 345, 352–356, 215–216
See application file for complete search history.

(56) References Cited

U.S. PATENT DOCUMENTS 3,849,041 A * 11/1974 Knapp ......................... 425/128
4,057,381 A * 11/1977 Korsch ........................ 425/345
4,157,148 A *  6/1979 White .......................... 425/182
5,213,738 A *  5/1993 Hampton et al. ............ 425/345

(Continued)

FOREIGN PATENT DOCUMENTS

GB          1034713        4/1963

(Continued)

OTHER PUBLICATIONS

PCT International Search Report for Ozeki, Yuichi, Int'l Application No. PCT/JP02/08695, Filed Aug. 28, 2002, Dated Nov. 25, 2002.

(Continued)

Primary Examiner—Yogendra N. Gupta
Assistant Examiner—Thu Khanh T. Nguyen
(74) Attorney, Agent, or Firm—Michael L. Crapenhoft; Hiroe & Associates

(57) ABSTRACT

The present invention provides a rotary press that allows mass production of a molded product. The rotary press has upper and lower punches that may be split in to a plurality of split punches, a means for moving the split punches, and a means for manipulating the plurality of split punches. In addition, the rotary press also has a plurality of molding material supply-charging units for supplying and charging molding materials into the space formed by the tip portions of the split punches, a precompression molding unit and a main compression molding unit for compression-molding the molding materials supplied and charged the entire molded product, respectively. Optionally, a unit to remove residual molding material remaining on the lower punches and/or the temporary molded product may be provided.

8 Claims, 42 Drawing Sheets

U.S. PATENT DOCUMENTS 5,350,548 A * 9/1994 Hinzpeter et al. .......... 425/345
5,698,149 A * 12/1997 Hinzmann et al. .......... 425/354

FOREIGN PATENT DOCUMENTS

| | | |
|---|---|---|
| JP | 52-2817 | 1/1977 |
| JP | 59-39499 | 3/1984 |
| JP | 62-114907 | 5/1987 |
| JP | 07-214396 | 8/1995 |
| JP | 2000-61699 | 2/2000 |
| WO | WO 00/10800 | 3/2000 |

OTHER PUBLICATIONS

PCT International Search Report for Kondo, et al., Int'l Application No. PCT/JP01/05296, Filed Jun. 20, 2001, Dated Sep. 17, 2001.

* cited by examiner

Fig.1
(A)
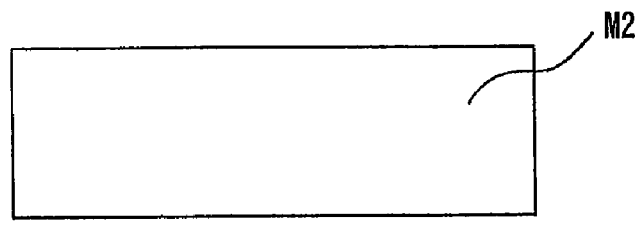
(B)
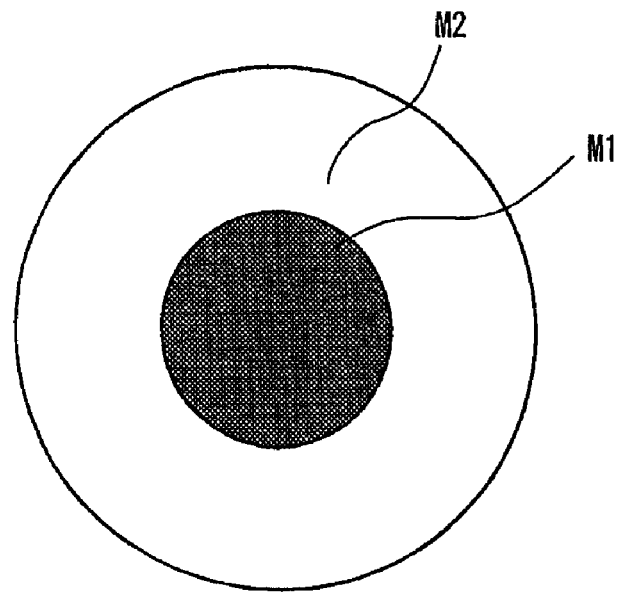
(C)
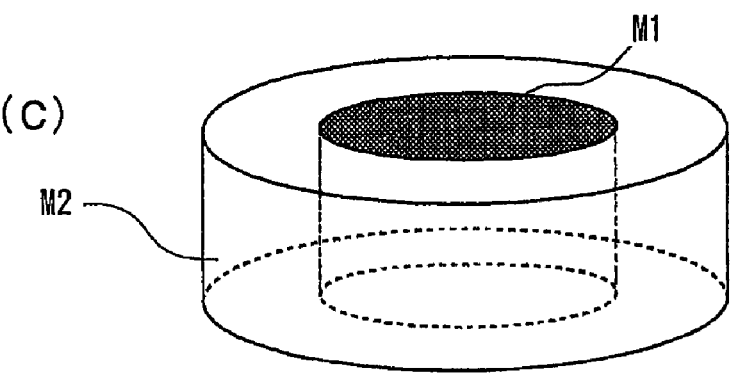

Fig.6
(A) 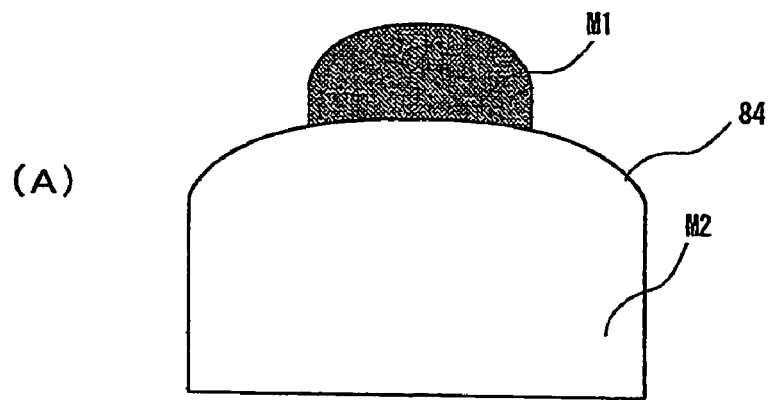
(B) 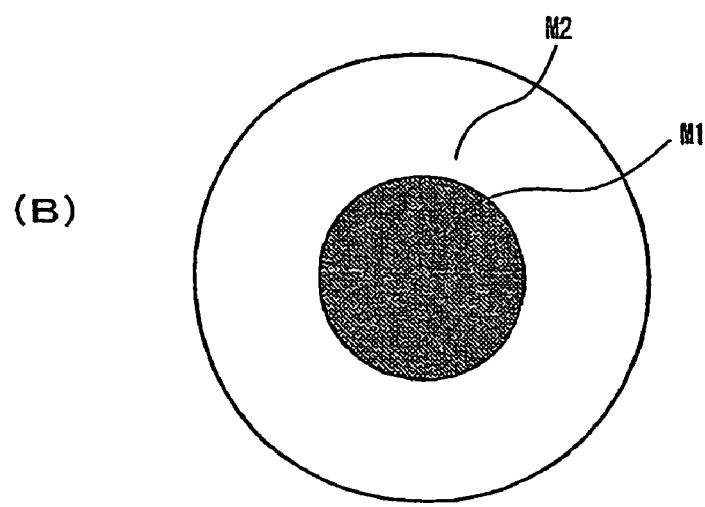
(C) 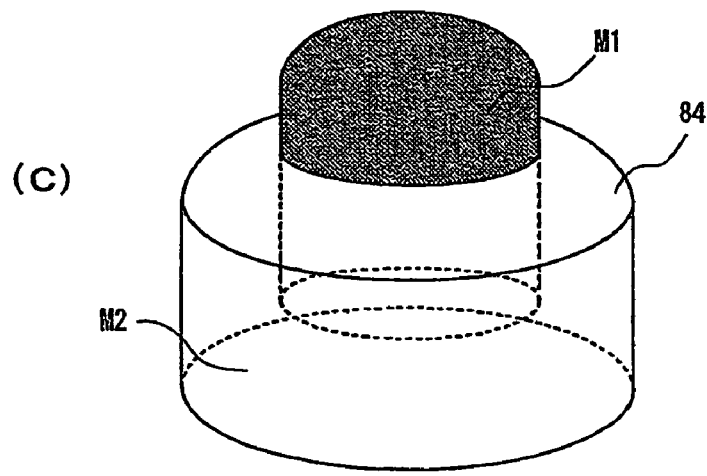

Fig.8
(A) 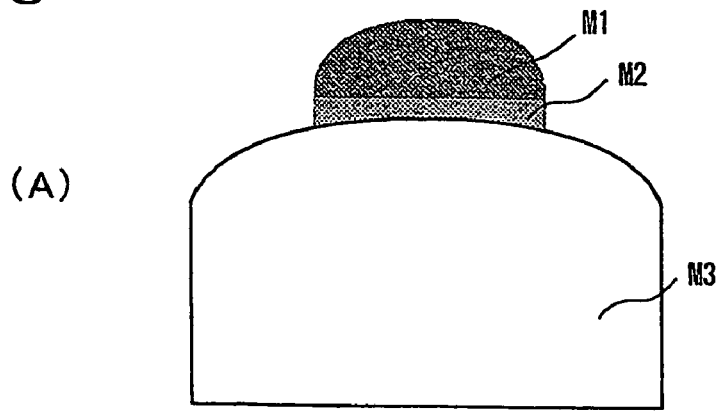
(B) 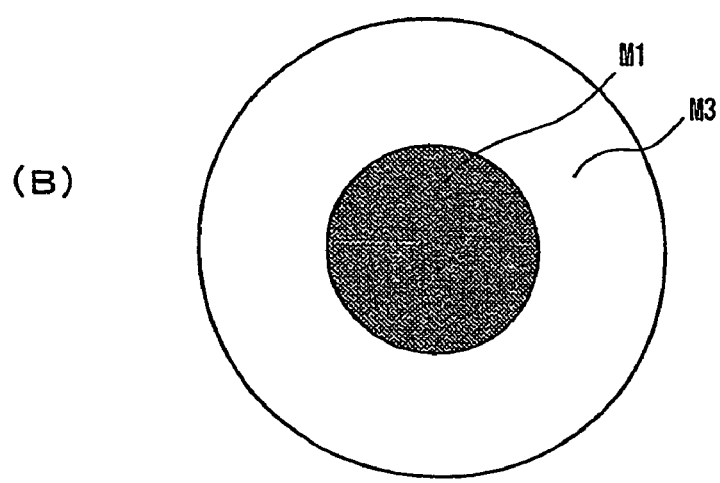
(C) 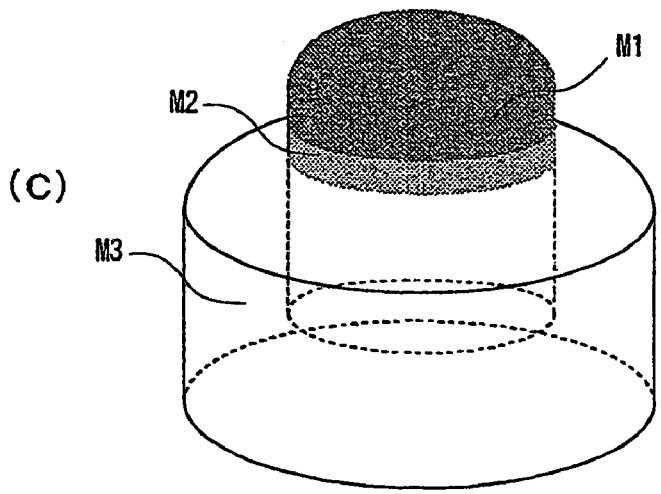

Fig.10
(A) 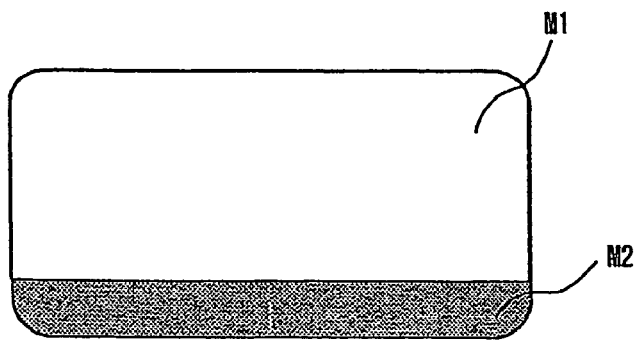
(B) 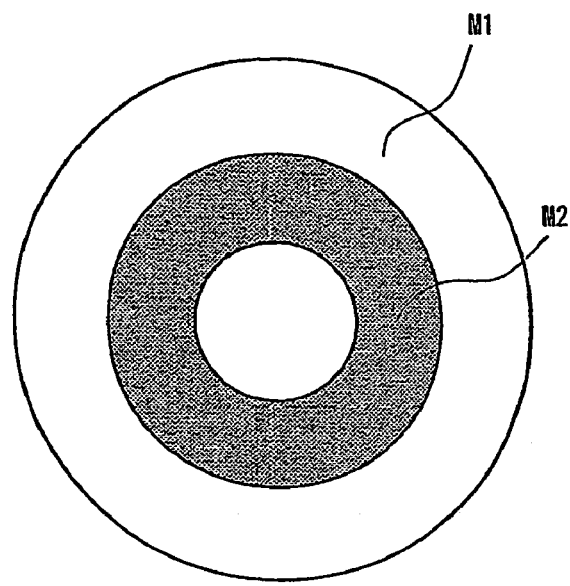
(C) 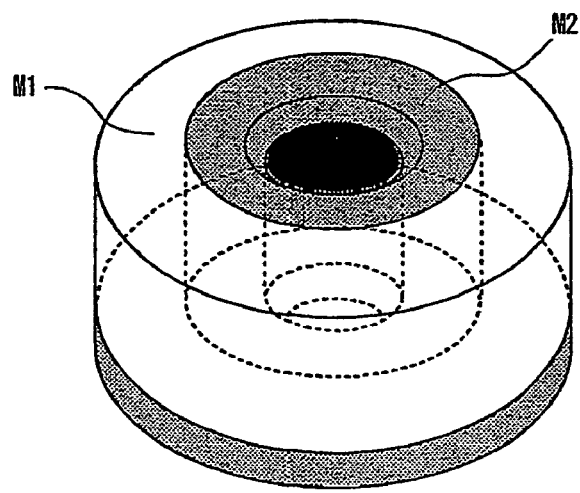

Fig.12
(A) 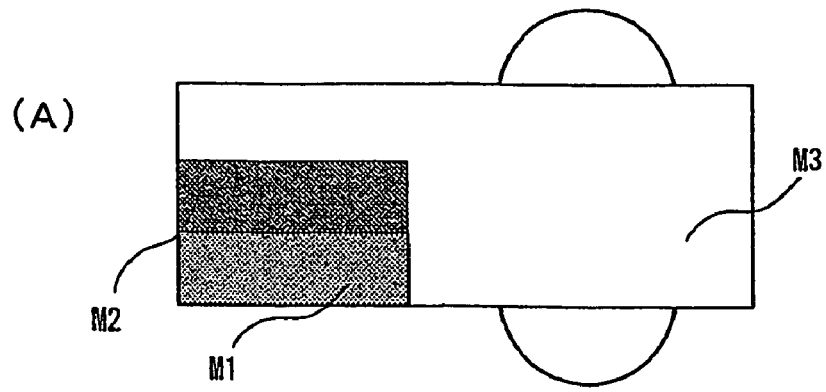
(B) 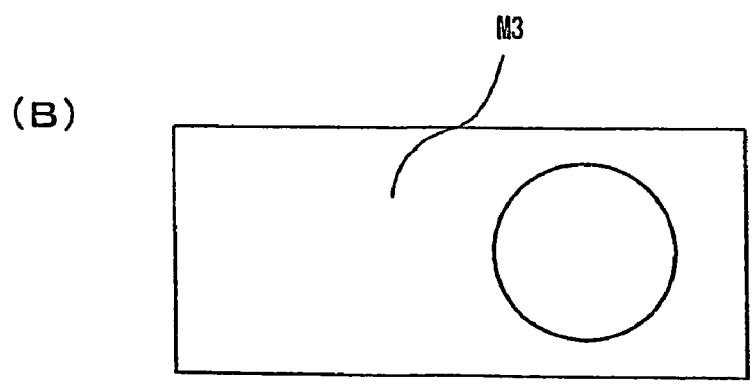
(C) 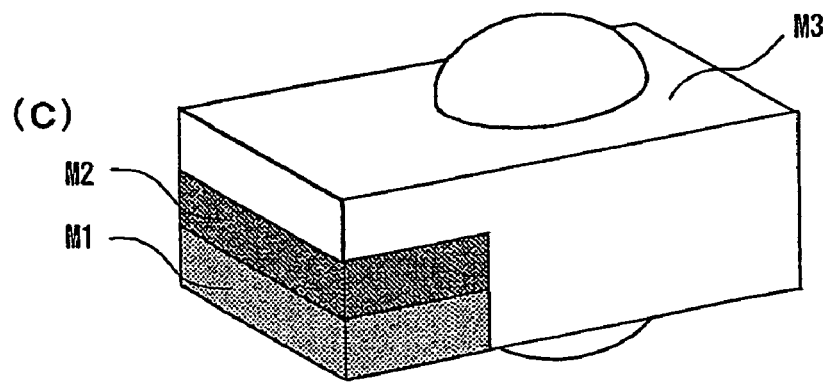

Fig.14
(A) 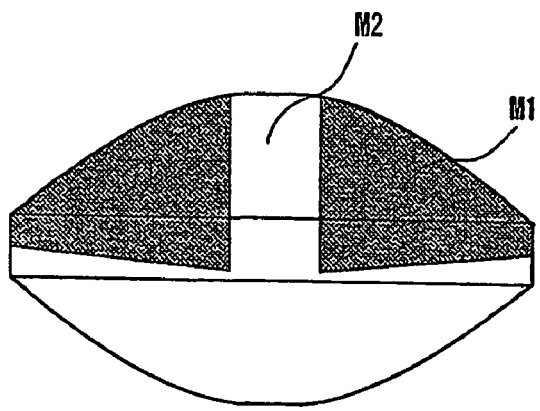
(B) 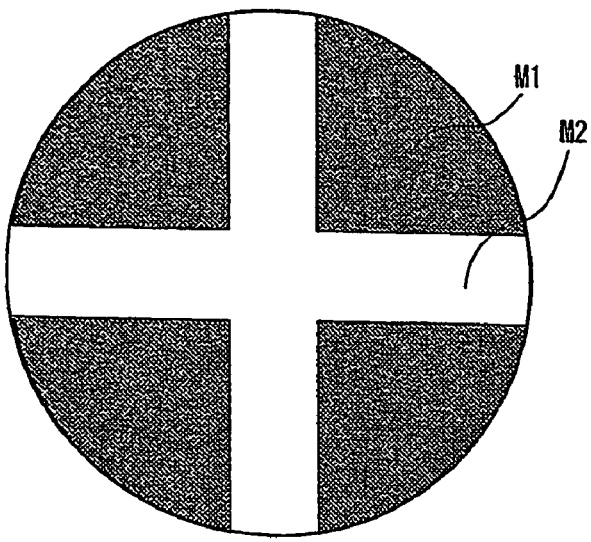
(C) 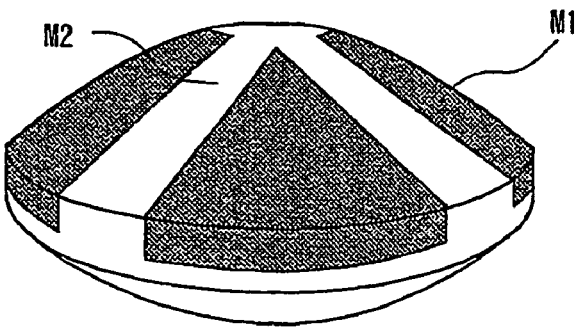

Fig.16
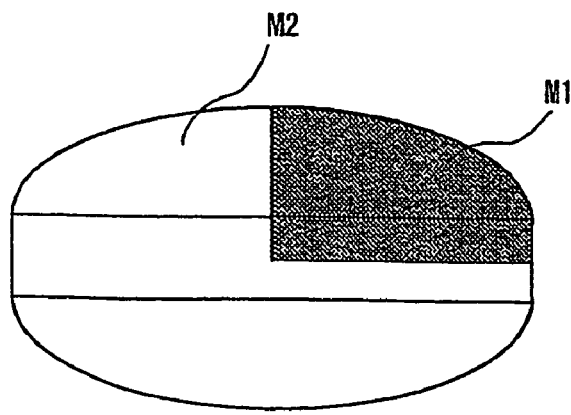
(A)
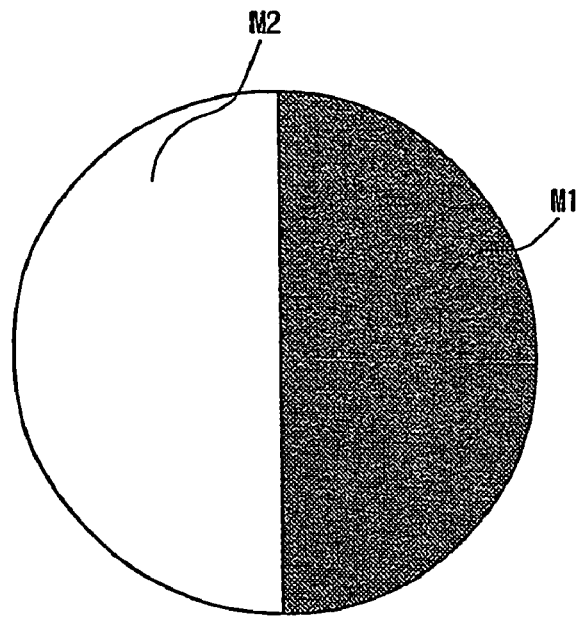
(B)
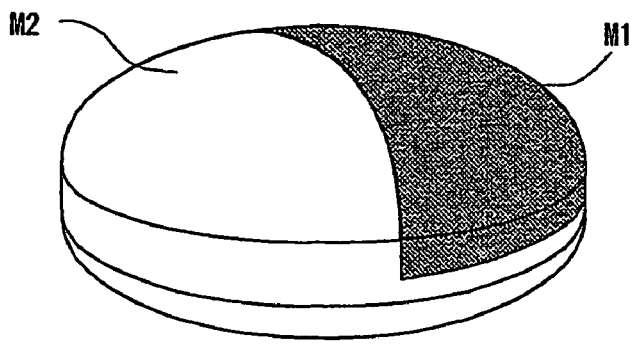
(C)

Fig.18
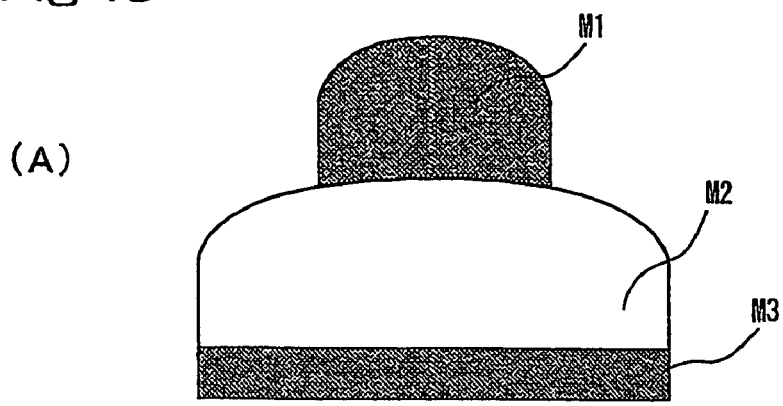
(A)
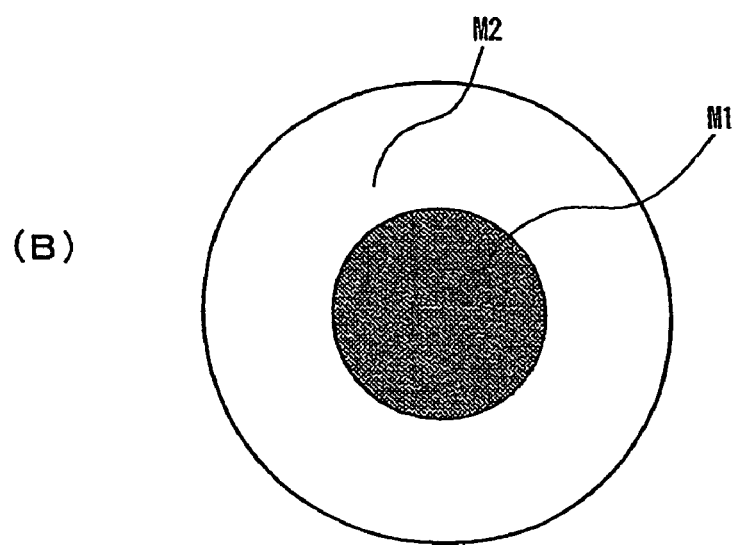
(B)
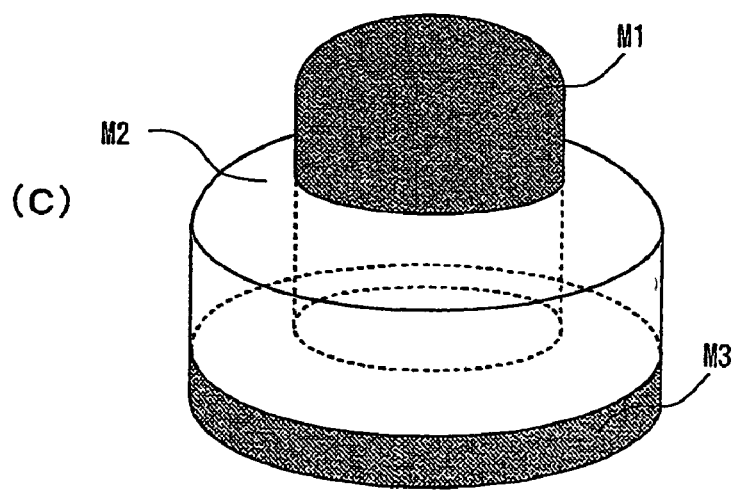
(C)

Fig.20
(A)
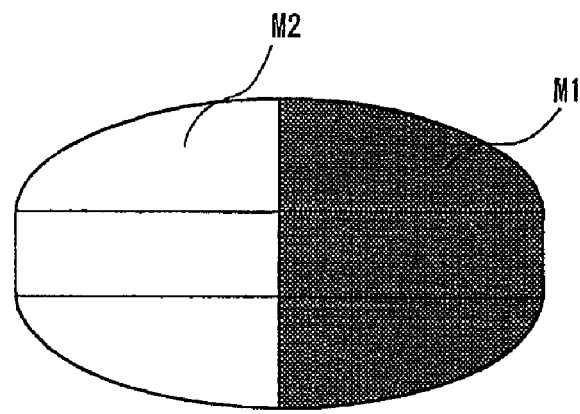
(B)
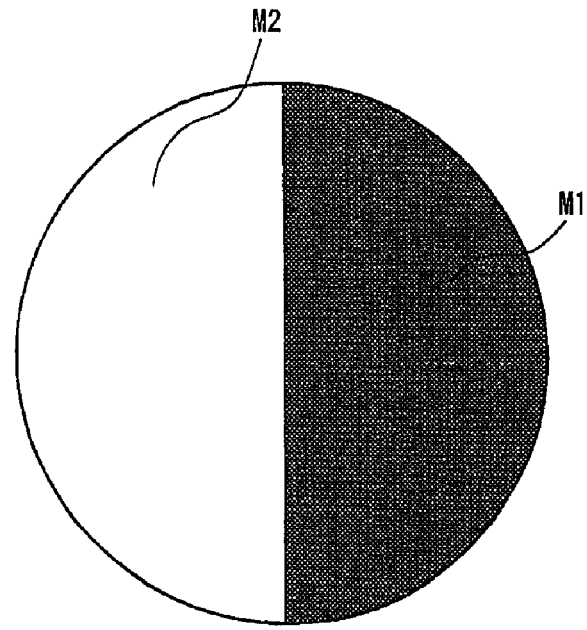
(C)
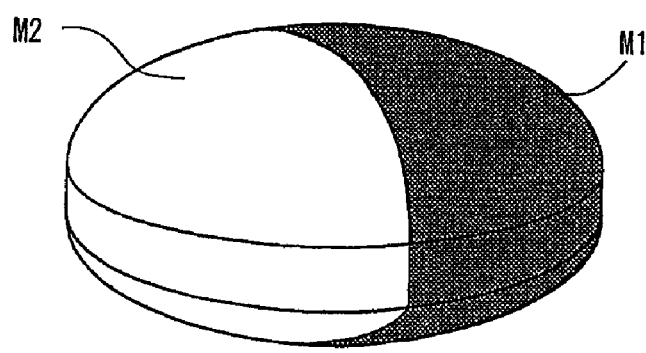

Fig.26
A-1 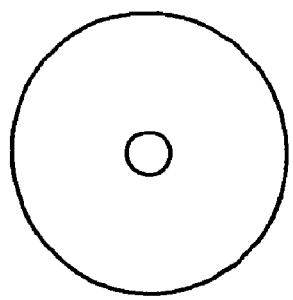
A-3 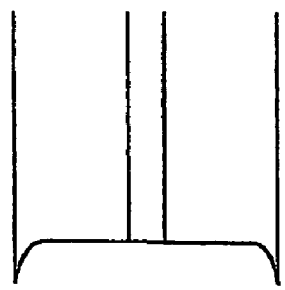
A-2 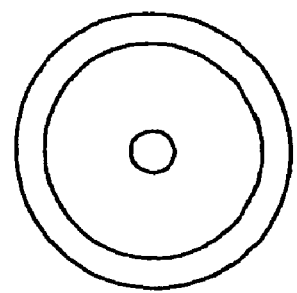
B-1 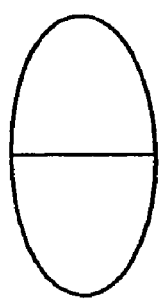
B-3 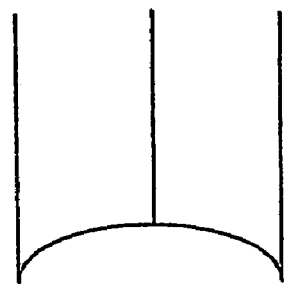
B-2 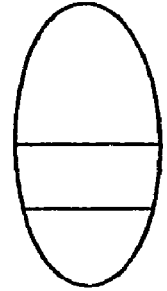

Fig.27
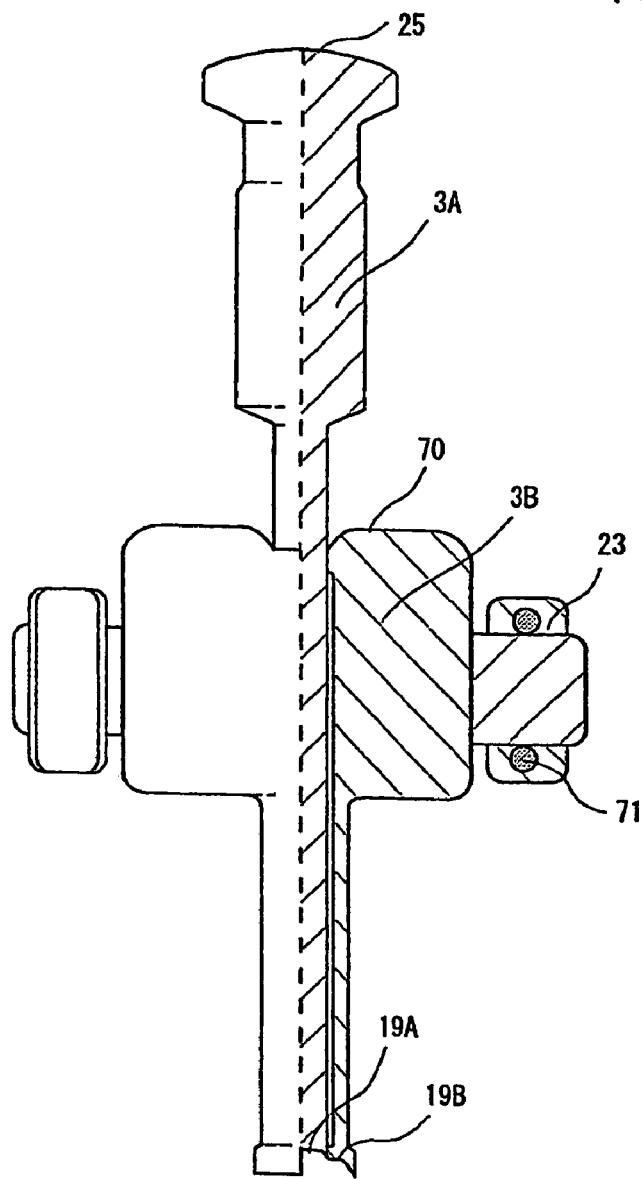 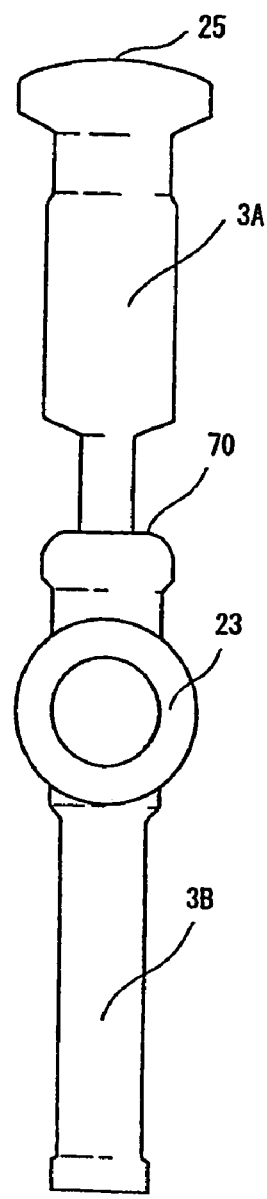
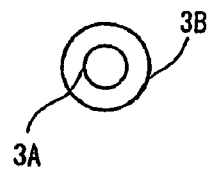

Fig.33
(A)
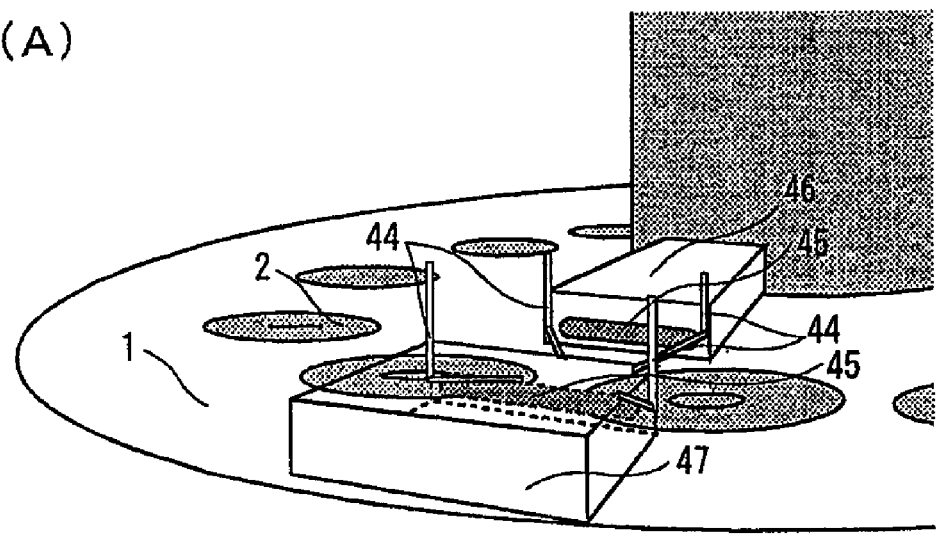
(B)
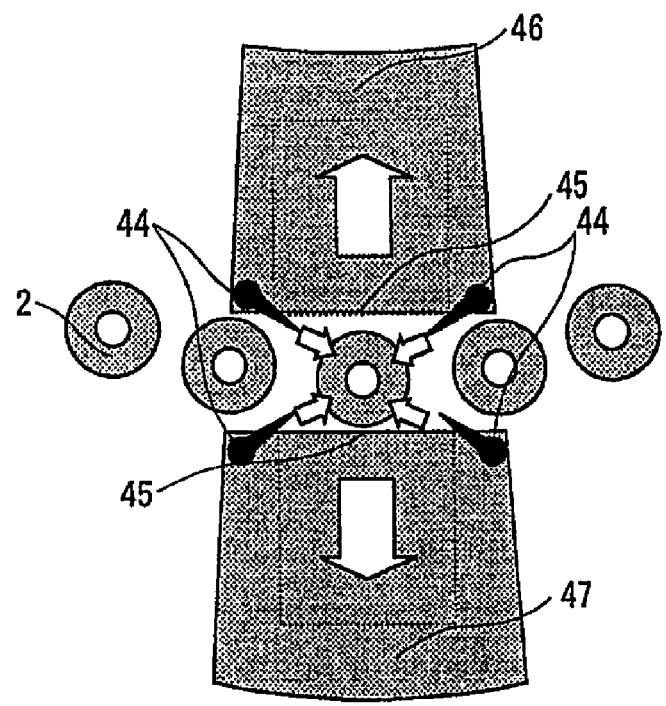

Fig.34
(A)
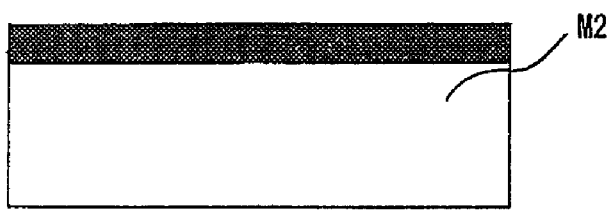
(B)
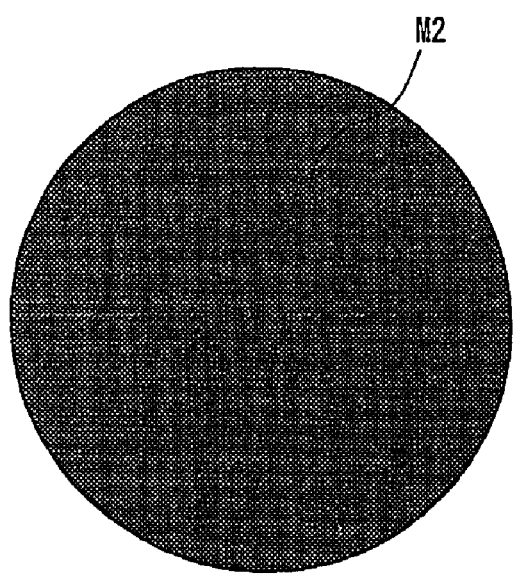
(C)
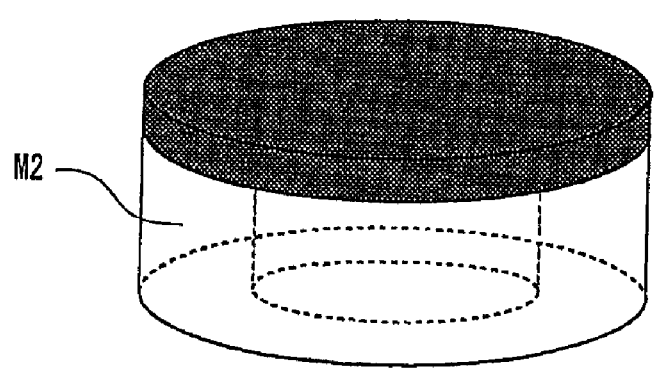

Fig.36
(A)
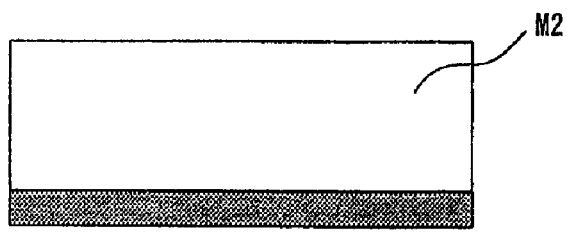
(B)
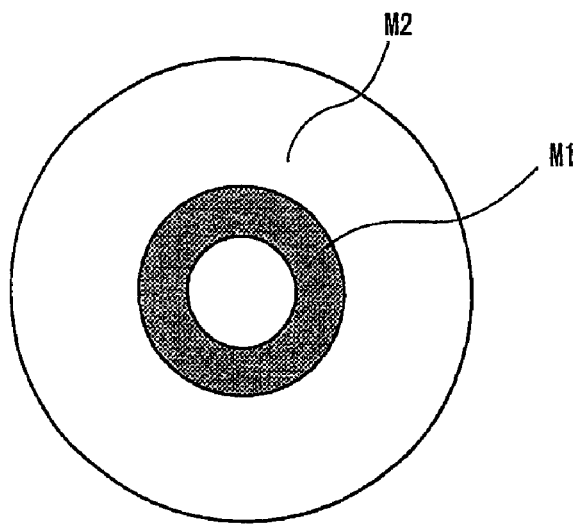
(C)
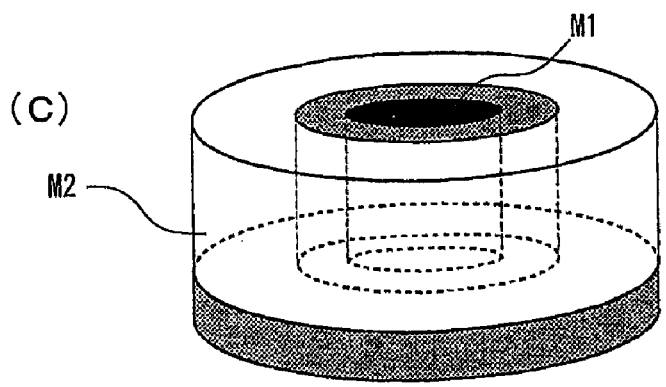

Fig.38
(A) 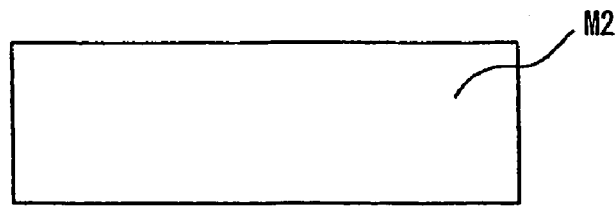
(B) 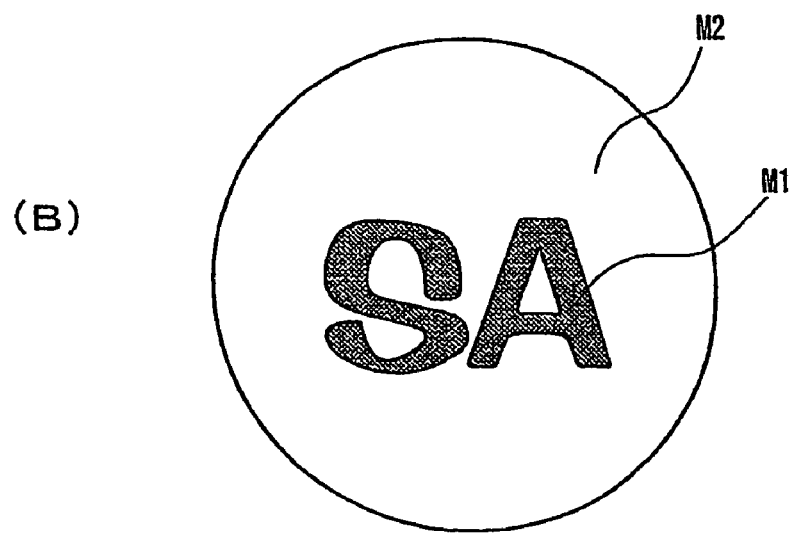
(C) 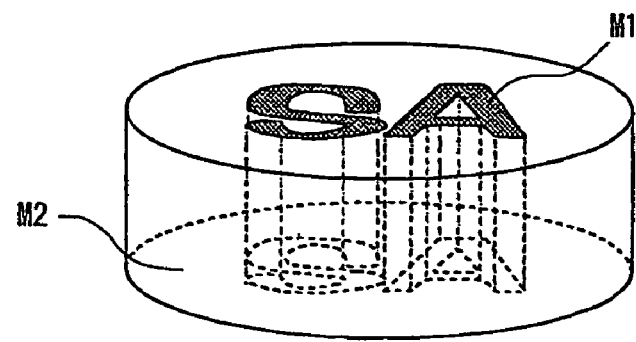

Fig.39
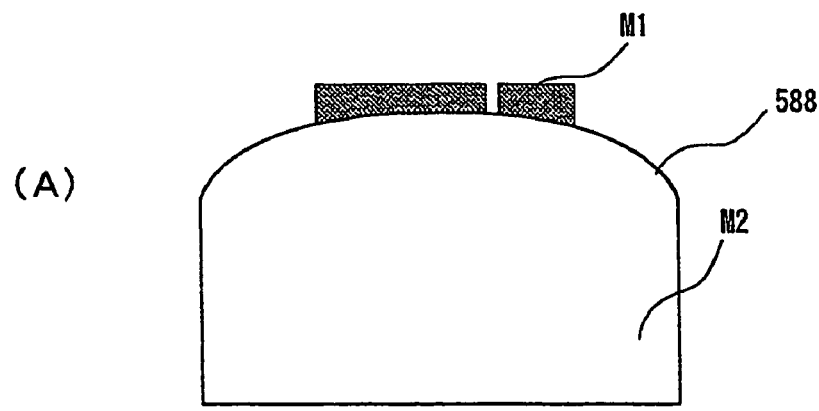
(A)
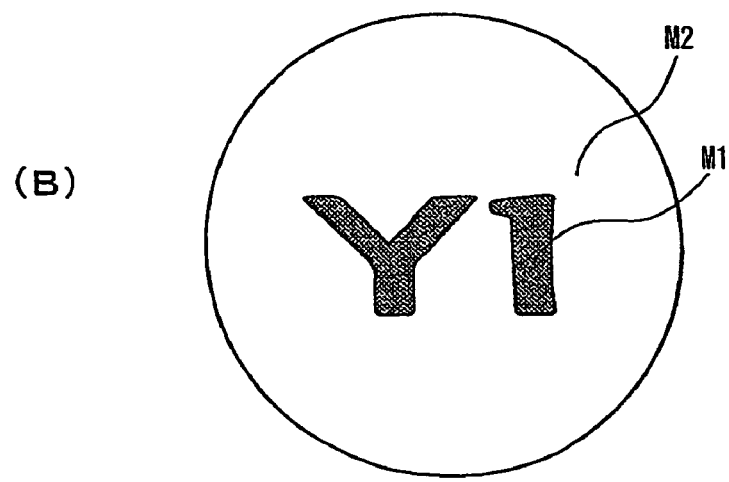
(B)
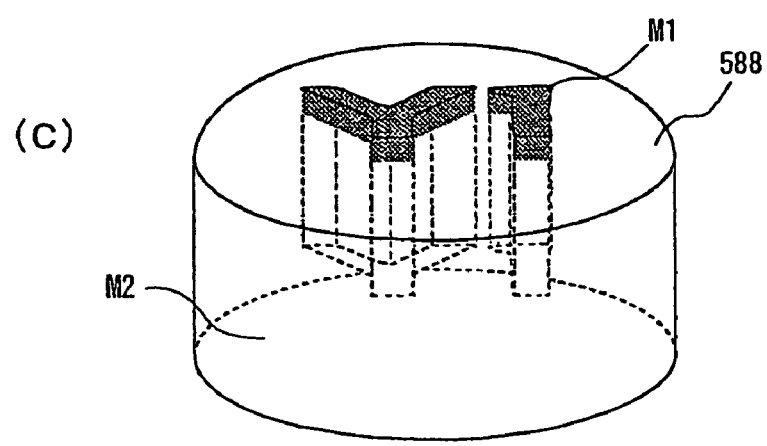
(C)

Fig.40
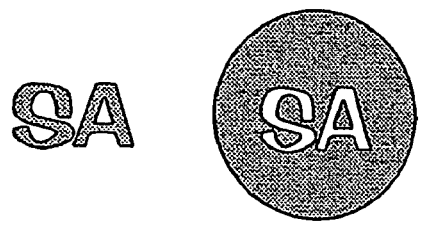
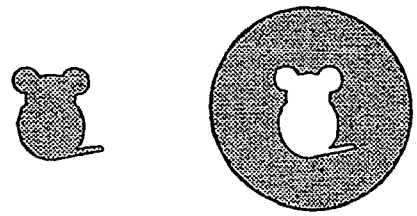
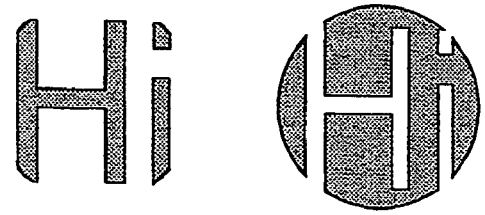
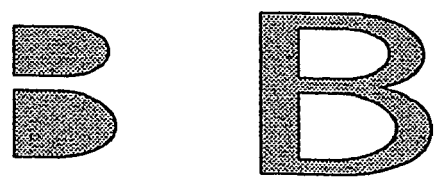
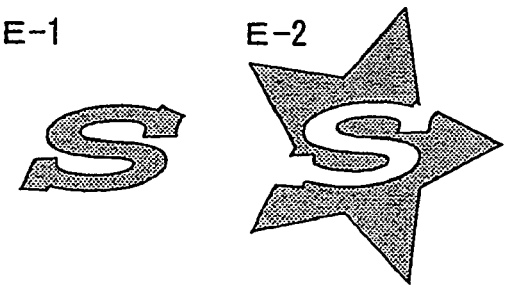

Fig.42
A-1 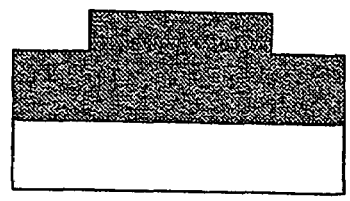
A-2 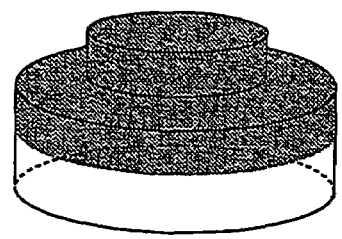
B-1 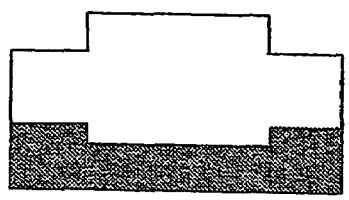
B-2 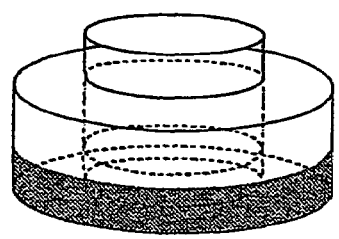
C-1 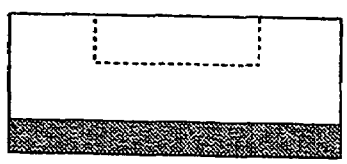
C-2 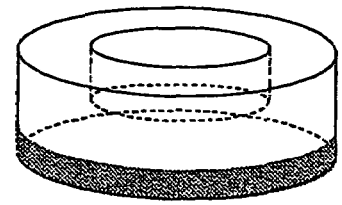
D-1 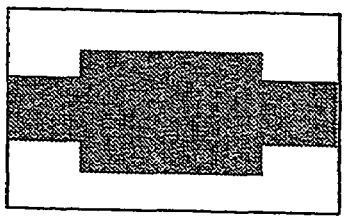
D-2 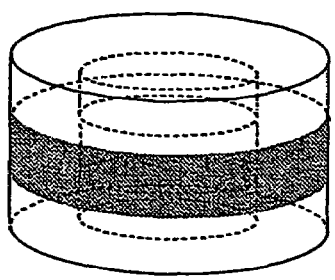

APPARATUS FOR MANUFACTURING A MOLDED PRODUCT, AND MOLDED PRODUCT THAT CAN BE MANUFACTURED WITH THE APPARATUS

The application disclosed herein corresponds to International Application No. PCT/JP02/08695, filed Aug. 28, 2002, which claims priority of Japanese Serial No. 2001-260924, filed Aug. 30, 2001, and Japanese Serial No. 2001-325284, filed Oct. 23, 2001, the contents of which are incorporated into this application.

TECHNICAL FIELD

The present invention relates to an apparatus for manufacturing a molded product by pressing molding materials, a method for manufacturing a molded product with the apparatus and a molded product that can be manufactured by the manufacturing method. More particularly, the invention relates to a rotary press for manufacturing a molded product consisting of a plurality of molded parts part of whose at least two molded parts faces outside of the molded product, a method for manufacturing a molded product with the press and a molded product and so on whose characters and/or graphics can be externally identified.

BACKGROUND ART

Drugs, foods, sanitary products, living miscellaneous goods, sintered structural parts, electronic parts and semiconductors are among areas in which molded products are manufactured by pressing a variety of materials. While molded or semi-molded products in all these areas are manufactured by pressing molding materials into an intended shape, press systems are actually commonly different depending on characteristics of intended molded products and requested needs.

Molded products used for drugs, foods, sanitary products and living miscellaneous goods are relatively simple in shape, can be pressed at low pressures and further generally use rotary presses that can manufacture molded products at high speed out of needs for manufacturing an exceedingly large number of products at low cost. Rotary press, in which a plurality of dies are arranged on a turn table, with punches held thereabove and therebelow and in which the turn table is moved in the direction of rotation, manufactures molded products by continuous supply of molding materials, pressing and ejecting of molded products. Normally capable of manufacturing several thousands of molded products per minute, rotary presses mainly feature a remarkably high productivity as compared with stroke presses that will be discussed later.

On the other hand, stroke presses are chiefly employed for molded products in areas such as sintered structural parts, electronic parts and semiconductors that are more complicated in shape and require pressing at high pressures. As for stroke presses used in metal working areas including sintered structural parts, for example, pressurized cylinder type and eccentric cam type presses are generally used. These presses are designed to press-mold molding materials by moving punches held above and below a die in relative directions. Such presses are commonly characterized in using a single die to supply molding materials, press and eject molded products and allow, because of their simple structure, manufacture of molded products requiring pressing at high pressures, molded products in complicated shape using multipunch and molded products of extremely high precision. However, such presses are low in production efficiency due to the structure and press system thereof and therefore not suited for mass production—disadvantages as compared with rotary presses.

In stroke presses, pairing of a die and punches can be generally broadly divided into stationary die-movable lower punch system and stationary lower punch-movable die system—a system generally called withdrawal dieset. Similarly in press system, some use hydraulic or pneumatic cylinders to apply pressure while others employ a system such as CNC (Computer Numerical Control) equipped with an electronic controller, servo-driven ball screw, etc.

Also in rotary presses, methods for producing shapes of a certain degree of complexity have been disclosed in the case of a single molding material rather than a plurality of molding materials. Ring-shaped punches, as in the lower punch mechanism of the rotary powder compression molding machine recited in Japanese Unexamined Patent Application Publication No. 52-126577, are designed to ensure uniform bulk material density during molding by moving the lower center and outer punches separately and charging bulk material in accordance with the shape of the final molded product. However, since such multistructured punches—conventional so-called ring-shaped punches—are used to aid in charging of bulk material, no consideration has been given to manufacturing a molded product consisting of a plurality of molded parts.

Rotary press for press-coated tablets used in the area of drugs is among apparatuses for manufacturing molded products consisting of a plurality of molded parts. The manufacturing method for press-coated tablets using a rotary press for press-coated tablets is by manufacturing in advance core with a separate rotary press, feeding the coatings into the die of a rotary press for press-coated tablets supplied with an outer-layer bulk material and further feeding and press-molding the outer-layer bulk material. According to the method, it is possible to arrange different constituents at the center and on the outside. In the method for feeding coatings into the die, however, it is substantially impossible to feed a coating identical to the die inner diameter or accurately localize a plurality of coatings at specific positions because present rotary presses for press-coated tablets have difficulties accurately positioning a coating at the center of the die, and therefore it is extremely difficult to divert a rotary press for press-coated tablets for manufacturing non-coated molded products consisting of a plurality of molded parts.

On the other hand, in sintered structural parts or the so-called metallurgy area, a method for manufacturing a molded product containing a plurality of constituents in a localized manner has been disclosed in Japanese Unexamined Patent Application Publication No. 52-2817. The Publication recites a method (FIG. 2) for manufacturing a molded product in which different bulk materials are localized perpendicularly to the pressure application surface, as shown in FIGS. 1(A), 1(B) and 1(C) (it should be borne in mind that while the molded product in the Publication is in troche form with a hollow at the center and with a center pin provided for securing the hollow, the substantial form is the same as those shown in FIGS. 1 and 2). According to the method, multipunches are used for both the upper and lower punches, and one of the lower punches is lowered relative to the die first, and a powdered material is fed into a created space. Then, the upper punch corresponding to the lower punch is lowered to mold under pressure the powdered material between the lower punch, the die and the upper punch. Then, a lower punch different from the lower punch is lowered relative to the die, with the already molded powdered molded compact left in the mold hole. A powdered material different from the powdered material is supplied and then molded under pressure together with the temporary molded product to manufacture a molded product. Although the manufacturing method is assumably intended for a stroke press judging from the area, the method presents a number of manufacturing problems.

Thus, no prior art substantially exists since there is no method for manufacturing a non-press-coated molded product consisting of a plurality of molded parts as industry at present.

In medical workplaces, for example, where white round tablets are predominant, on the other hand, tablet identifiability is an important issue. The reason is that information such as product names, contents of principal agents and manufacturers must be discernible when tablets are in random orientations after being taken out of their packages, and such information is used for confirmation and other purposes in medicine preparation and when patients take medicines. Today, "tablet codes" (codes by combination of characters and graphics) has been introduced as a tablet identification method, and the Federation of Pharmaceutical Manufacturers' Associations of JAPAN (FPMAJ) has defined "the Identification Code Implementation Procedure for Tablets and Capsules" in the FPMAJ Issue 80 that is now practiced by pharmaceuticals manufacturers as a voluntary arrangement.

Tablet codes can be printed by printing characters and other information on the tablet surface by ink or engraved by pressing a punch of convex shape on the surface thereof against a molded product, compacting the tablet and thereby producing a concave engraved code on the tablet surface. Among these, the printing method has had a variety of problems including complication of steps, cost aspect, use of organic solvents and rigorous technical requirements in printing step such as "print deviation."

On the other hand, the engraving method accounts for 70 to 80% of tablets on the whole. However, this method has problems such as difficulties in seeing codes, resulting in a hindrance to identifiability of tablet codes. As compared with tablet printing, nevertheless, engraving does not require tablet coating—a step necessary in printing. Additionally, engraving is simpler with less manufacturing steps, thus allowing manufacturing cost reduction. Further, engraving requires no use of organic solvents needed in printing, resulting in widespread use because of its freedom from printing problems such as "print deviation."

While there may be a variety of reasons for difficult-to-see engraving, such a difficulty is commonly thought to be attributed to its form. Since engraving is intended, by producing a concave indentation on a monochrome tablet, to render the code legible with the shadow created by the indentation and the tablet surface, it is known that the code is less legible due to halation at a relatively bright location such as under a fluorescent lamp, making engraving obviously inferior in terms of identifiability to printing in which characters are clearly discernible by color difference.

Many areas other than drugs produce molded products by compressing molding materials as well. In such molded products, characters and graphics are often added for the purpose of enhancing product added values, from design aspect, for trademark addition and so on. However, such molded products are commonly manufactured by the same manufacturing method as with the aforementioned tablets in drugs, thus entailing the same problems.

DISCLOSURE OF THE INVENTION

As described above, in manufacturing a non-press-coated molded product consisting of a plurality of molded parts, there have been no manufacturing methods or apparatuses conventional art suited for mass production. Therefore, the present invention has been perfected with an object to provide a manufacturing method and apparatus that allows mass production of a molded product consisting of a plurality of molded parts part of whose at least two molded parts faces outside of the molded product. The present invention also provides codes for imparting identifiability to a molded product, for example, a molded product with enhanced identifiability through identification by color difference as in the printing method using the manufacturing method and the apparatus to solve a variety of problems associated with tablet codes. The present invention will be described below together with the progress until the present invention was arrived at.

First, the present inventor investigated whether a molded product consisting of a plurality of molded parts using a plurality of molding materials could be manufactured by reviewing various conventional press methods.

First, stroke presses equipped with multipunches suited for manufacture of complicated shapes were investigated due to the fact that the method recited in Japanese Unexamined Patent Application Publication No. 52-2817 assumes a stroke press, and increasing the number of punches and a die hole was examined. More punches and a die hole considerably increase production volume per step, thus enhancing productivity to a level close to rotary presses. Such an increase in punches and a die hole seemingly allows relatively easy manufacture of products of complicated shape in large volumes using a single molding material. However, this option requires a large compression pressure needed for pressing a large quantity of products in a single step, resulting in new problems such as scaleup of the press itself and lower speed in press operations.

When a molded product consisting of a plurality of molding materials is manufactured, accurately charging a plurality of molding materials in a single step is naturally difficult because of charging quantity adjustment and contamination with other molding materials, requiring molding materials to be individually charged. That is, to clarify a boundary between parts into which a plurality of molding materials are charged and a device for adjusting charging quantities, there are times when post-charging compression of individual molding materials by punches is necessary. However, stroke presses generally convert rotational energy from the motor to vertical motion using eccentric cam, etc., and the distance between the tips of the upper and lower punches in the die is, because of this structure, determined by cam shape and/or cam position. The punch-to-punch distance is relevant to charging of molding materials into the die associated with lowering of the lower punch, pressing of the molded product and unloading thereof. If the punch-to-punch distance is constant and if a molded product is manufactured using a plurality of molding materials, the punch-to-punch distance becomes the same between when a first molding material is charged and pressed and when a second molding material is charged and pressed, with the molded product molded earlier held on top of the lower punch, making it impossible to control the second charging quantity and the pressure for second pressing. As a countermeasure, it is necessary to manually reduce the charging quantity of the first molding material or change the cam shape or position during the second pressing every time. If continuous production is intended, however, these countermeasures are deemed industrially unpractical.

When the compression method is switched from eccentric cam to hydraulic cylinder or servomotor using ball screw, while the punch-to-punch distance can be adjusted in the second charging and pressing, adjustment by hydraulic cylinder does not allow fine tuning, and long hours of continuous operation are impossible due to occurrence of bubbles in the hydraulic cylinder. In contrast, servomotor-driven compression can clear the problems presented by hydraulic cylinder, but is deemed unfit for high-speed continuous pressing because of its slow operation.

Another problem involved in manufacturing a molded product consisting of a plurality of molding materials with a stroke press is difficulties in finely adjusting charging quantities of individual molding materials every pressing due to the structure. The term "every pressing" refers to charging quantity adjustment every pressing during a cycle of molded product manufacture rather than initial setting of charging quantity of each of a plurality of molding materials.

Physical shapes of molding materials used for metallurgy, molding of epoxy resin products and so on—areas in which stroke presses are commonly employed—are often uniform in particle distribution and constant in density. Therefore, molded products produced in an early stage of pressing do not differ much in weight from those produced in a later stage even if initial setting of charging quantity is in a state fixed without fine adjustment every pressing. However, molding materials used for drugs and foods are mixtures of a variety of materials and normally vary in particle distribution, density and so on. Variation in charging caused by these variations translates into variation in product weight and further leads to molding failure attributed to insufficient charging. As a method to eliminate these variations, therefore, rotary presses, noting the fact that the stress occurring during compression molding is proportional to the amount of raw material, have adopted a mechanism that compares the signal with the control standard value set in advance and sends a feedback, in the event of discrepancy, to a powder charging unit to perform weight adjustment (Powder Compression Molding Technology edited by Medicine Manufacturing and Particle Design Group of The Society of Powder Technology, Japan Nikkan Kogyo Shimbun P.111). Weight adjustment of each of a plurality of molding materials is made possible by the fact that rotary press has as many physically independent charging units as the number of a plurality of molding materials on its turn table and is constructed such that charging devices of the independent charging units can move independently from other charging units. In other words, rotary press has a structure to allow instantaneous weight adjustment of individual molding materials. To equip a stroke press with such a feedback mechanism, however, while only one charging device is required for adjusting charging quantity of each of a plurality of molding materials, adjustment of charging quantity for each part must be made for each of a plurality of molding materials, thus resulting in a complex apparatus. Further, charging of a molding material for a next part cannot be adjusted due to the mechanism until charging of a molding material for a previous part is complete, making it impossible to instantaneously adjust weight of each of the molding materials and thereby preventing high-speed pressing. That is, charging quantities of molding materials into the die cannot be changed every pressing, making it, in much probability, substantially impossible to adjust charging quantity of each of a plurality of molding materials.

Another problem involved in manufacturing a molded product consisting of a plurality of molding materials with a stroke press is the need to arrange a plurality of feed shoes (devices for storing and charging molding materials) for charging molding materials into the die. As indicated earlier, it suffices, in the case of a rotary press, to arrange on the turn table as many feed shoes as the number of a plurality of molding materials according to the sequence of charging. In the case of a stroke press substantially consisting of a die and punches, however, the number of feed shoes around the die increases with increasing number of molding materials. Motions of individual feed shoes become complicated, with the feed shoe moving mechanism becoming complicated as well, making it industrially impossible to manufacture a molded product consisting of a plurality of molding materials with a stroke press.

On the other hand, it has been discovered that an attempt to mass-produce a molded product, in which different bulk materials are localized perpendicularly to the pressure application surface, using Japanese Unexamined Patent Application Publication No. 52-2817 recited earlier in background art faces a significant problem. The problem lies in contamination taking place between different bulk materials during manufacture. In the method of the Japanese Unexamined Patent Application Publication No. 52-2817 (FIG. 2), a temporary molded product consisting of either one of the bulk materials is molded first (FIG. 2D), and then the other bulk material is charged into a space surrounded by the temporary molded product, the lower punch, the die, etc. (FIG. 2G) and compression-molded (FIG. 2M). Depending on the position of the temporary molded product molded earlier, however, the bulk material may be charged into unnecessary portions in the next step. More specifically, if the upper surface of the molded product is lower than the upper surface of the die as shown in Step C of FIG. 4, bulk material is supplied onto the upper surface of the temporary molded product molded earlier during bulk material supply shown in Step D. Such bulk material is impossible to remove by rubbing and cutting and prevents manufacture of a composite molded product as shown in FIG. 1 if compressed as is. Conversely, if the upper surface of the molded product is higher than the upper surface of the die as shown in Step C of FIG. 3, the temporary molded product is damaged by a rubbing-cutting plate in the Step E—step for rubbing and cutting following bulk material supply in Step D. These problems do not occur if the post-pressing height of the temporary molded product is constantly in agreement with that of the die upper surface (FIG. 2F) as with the method recited in the Publication. However, when each of temporary molded products is actually manufactured, it seems industrially impossible to adjust the height of the molded product upper surface relative to individual temporary molded products while at the same time taking in consideration variation in charging of individual bulk materials, post-compression plasticity, elastic deformation, etc. of the molded product.

Further, we suppose that a multipunch is used as the lower punch as shown in Step A of FIG. 22(1) and that the lower punch is arranged such that the extreme tip surface (extreme tip portion) of the lower punch matches with the die upper surface. If, in this case, a molded product consisting of two or more types of molding materials is manufactured using a punch having a shape in which a concave surface exists on the lower punch side relative to the die upper surface, in other words, a shape that results in unnecessary bulk material being supplied to the concave portion on the upper tip surface, removal of residual bulk material on the lower punch by the conventional rubbing-cutting method is impossible, and contamination between the bulk material of a next step and the residual bulk material is unavoidable.

As a result of trial and error as described above, the present inventor has devised a rotary press for manufacturing a molded product consisting of a plurality of molded parts part of whose at least two molded parts faces outside of the molded product, the rotary press having a rotatable turn table, provided with a die having a die hole and holding upper and lower punches above and below the die so as to be vertically slidable, and being designed to compress molding materials supplied and charged into the die by moving the upper and lower punches in mutually approaching directions and pressing the molding materials with the punch tips in a state inserted in the die, the rotary press comprising at least the upper punch split into a plurality of punches, means for moving the respective split punches and allowing manipulation of at least two of the plurality of split punches for compression operation, a first molding material supply-charging unit for supplying and charging a first molding material into a space in the die formed above the tip portion of the lower punch or formed by the tip portions of split punches of the lower punch, a second molding material supply-charging unit for supplying and charging a second molding material into a space formed above and/or around the first molding material in the die, a precompression molding unit for compress ion-molding at least one of the molding materials supplied and charged and a main compression molding unit for compression-molding the entire molded product. The rotary press is normally constructed to have the lower punch split into a plurality of punches as with the upper punch and comprises means for moving respective punches of the plurality of punches and for allowing manipulation of at least two of the plurality of split punches for compression operation. The rotary press also comprises, as necessary, devices for removing residual molding material on the lower punch and/or the temporary molded product.

To solve a variety of problems involved in engraving tablets such as poor identifiability and overcome numerous problems associated with printing, on the other hand, the present inventor has devised a new code identification system for molded products using the aforementioned rotary press. The molded product is characterized in that the product consists of a plurality of molded parts part of whose at least two molded parts faces outside of the molded product, in that characters and/or graphics is shaped by at least one molded part, that the molded part shaping the characters and/or graphics differs from other molded parts in color and that the characters and/or graphics can be externally identified. The molded product provides considerably improved identifiability to characters and/or graphics to be identified by representing the characters and/or graphics to be identified with some molded parts and by using different colors for the molded parts representing the characters and/or graphics and the other molded parts. The molded product can be manufactured by using the rotary press according to the present invention, employing a punch having a tip portion shaped to represent characters and/or graphics at least for the upper punch and using at least two molding materials that differ from each other in color.

BRIEF DESCRIPTION OF THE DRAWINGS

FIGS. 1(A), 1(B) and 1(C) illustrate an embodiment (first example) of a molded product manufactured by the manufacturing apparatus of the present invention, with FIG. 1(A) being a side view, FIG. 1(B) being a top view, and FIG. 1(C) being a perspective view;

FIGS. 6(A), 6(B) and 6(C) illustrate an embodiment (second example) of a molded product manufactured by the manufacturing apparatus of the present invention, with FIG. 6(A) being a side view, FIG. 6(B) being a top view, and FIG. 6(C) being a perspective view;

FIGS. 8(A), 8(B) and 8(C) illustrate an embodiment (third example) of a molded product manufactured by the manufacturing apparatus of the present invention, with FIG. 8(A) being a side view, FIG. 8(B) being a top view, and FIG. 8(C) being a perspective view;

FIGS. 10(A), 10(B) and 10(C) illustrate an embodiment (fourth example) of a molded product manufactured by the manufacturing apparatus of the present invention, with FIG. 10(A) being a side view, FIG. 10(B) being a top view, and FIG. 10(C) being a perspective view;

FIGS. 12(A), 12(B) and 12(C) illustrate an embodiment (fifth example) of a molded product manufactured by the manufacturing apparatus of the present invention, with FIG. 12(A) being a side view, FIG. 12(B) being a top view, and FIG. 12(C) being a perspective view;

FIGS. 14(A), 14(B) and 14(C) illustrate an embodiment (sixth example) of a molded product manufactured by the manufacturing apparatus of the present invention, with FIG. 14(A) being a side view, FIG. 14(B) being a top view, and FIG. 14(C) being a perspective view;

FIGS. 16(A), 16(B) and 16(C) illustrate an embodiment (seventh example) of a molded product manufactured by the manufacturing apparatus of the present invention, with FIG. 16(A) being a side view, FIG. 16(B) being a top view, and FIG. 16(C) being a perspective view;

FIGS. 18(A), 18(B) and 18(C) illustrate an embodiment (eighth example) of a molded product manufactured by the manufacturing apparatus of the present invention, with FIG. 18(A) being a side view, FIG. 18(B) being a top view, and FIG. 18(C) being a perspective view;

FIGS. 20(A), 20(B) and 20(C) illustrate an embodiment (ninth example) of a molded product manufactured by the manufacturing apparatus of the present invention, with FIG. 20(A) being a side view, FIG. 20(B) being a top view, and FIG. 20(C) being a perspective view;

FIGS. 25A to 25E2 illustrate the diversity of molded products that can be manufactured using a punch having the single split punch structure in the present invention, with A showing the shape of a punch tip portion consists of a double structure, and series B to E showing a classification of molded products that can be manufactured from the punch focusing attention on concave and convex structures of molded parts provided at the center;

FIG. 26 illustrate specific examples in which split punch structures with different split shapes are used for upper and lower punches in the punches having the split punch structure used in the present invention, with FIGS. 26A-1 and 26B-1 showing upper punches, FIGS. 26A-2 and 26B-2 showing lower punches, and FIGS. 26A-3 and 26B-3 showing sectional views of punch tips when tips of upper and lower punches are brought close to each other as in actual use (shading showing cross section omitted);

FIGS. 27(A), 27(B) and 27(C) illustrate an example of punch having the split punch structure used in the present invention, with FIG. 27(A) being a vertical sectional view (right half) and schematic diagram (left half), FIG. 27(B) being a side view, and FIG. 27(C) being a top view of the punch tip portion;

FIGS. 33(A) and 33(B) illustrate a residual molding material removal device of the present invention, with FIG. 33(A) being a bird's-eye view, and FIG. 33(B) being a top view;

FIGS. 34(A), 34(B) and 34(C) illustrate an embodiment (tenth example) of a molded product manufactured by the manufacturing apparatus of the present invention, with FIG. 34(A) being a side view, FIG. 34(B) being a top view, and FIG. 34(C) being a perspective view;

FIGS. 36(A), 36(B) and 36(C) illustrate an embodiment (eleventh example) of a molded product manufactured by the manufacturing apparatus of the present invention, with FIG. 36(A) being a side view, FIG. 36(B) being a top view, and FIG. 36(C) being a perspective view;

FIGS. 38(A), 38(B) and 38(C) illustrate an example of molded product of the present invention whose characters and/or graphics can be externally identified, with FIG. 38(A) being a side view, FIG. 38(B) being a top view, and FIG. 38(C) being a perspective view;

FIGS. 39(A), 39(B) and 39(C) illustrate an example of molded product of the present invention whose characters and/or graphics can be externally identified, with FIG. 39(A) being a side view, FIG. 39(B) being a top view, and FIG. 39(C) being a perspective view;

FIG. 40 illustrate specific examples of punches having the split punch structure used for manufacturing a molded product of the present invention whose characters and/or graphics can be externally identified, with shapes of split punches (e.g., center and outer punches) side by side;

FIGS. 42A-1 to 42D2 illustrate a molded product manufactured in the embodiment shown in FIG. 41 and the diversity of molded products that can be manufactured by slightly modifying the punch operations, with FIGS. 42A-1 to 42D-1 being sectional views of molded products, and FIGS. 42A-2 to 42D-2 being schematic diagrams of the molded products.

BEST MODE FOR CARRYING OUT THE INVENTION

Figure 2:
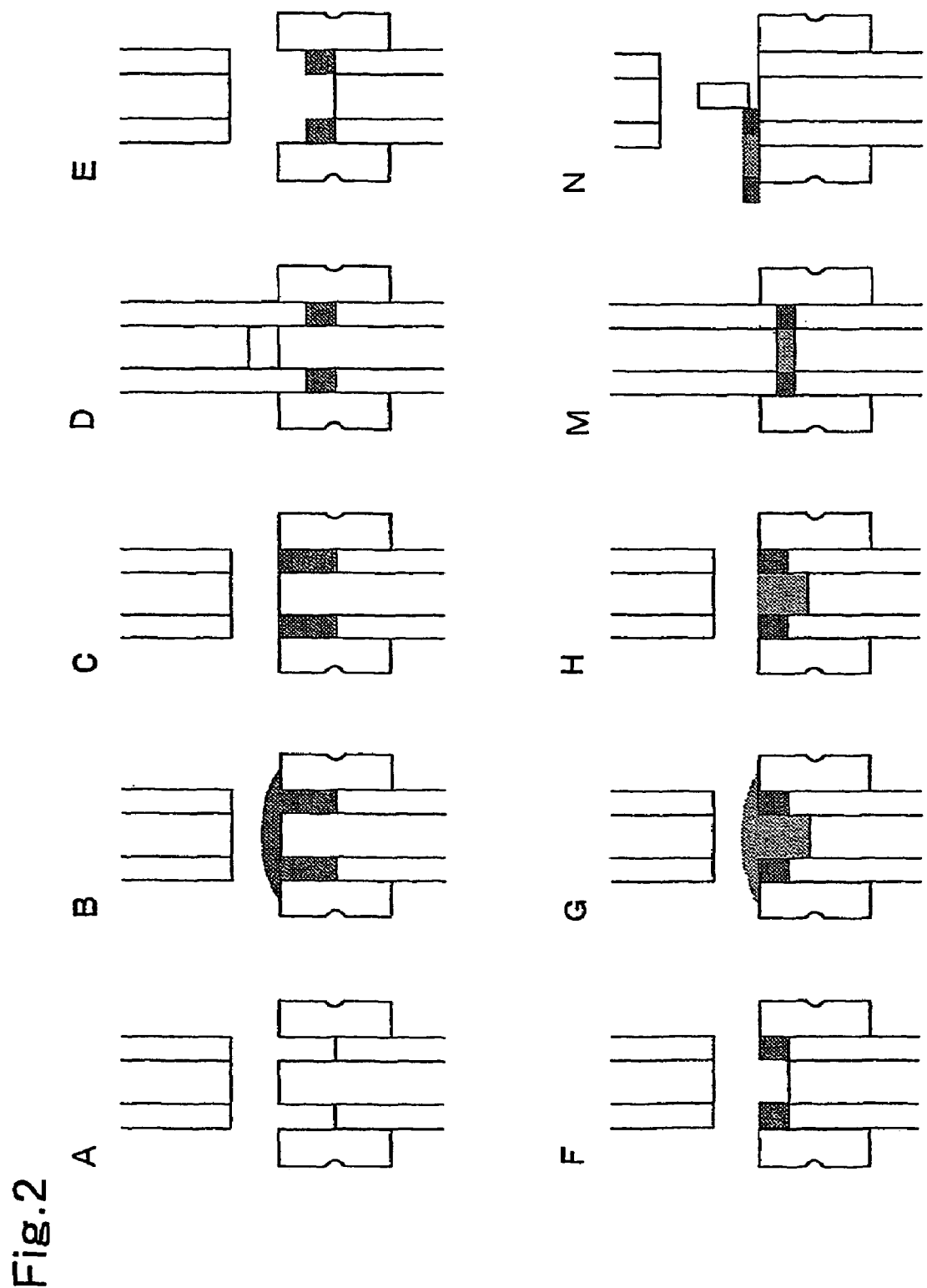
FIG. 2 illustrate explanatory views of punch tip operations showing an example of conventional molded product manufacturing method in which a plurality of molding materials are localized (shading as cross section omitted)

In this description, the term "molding material" is defined as any moldable material including bulk material while the term "bulk material" as powder, granules and something similar thereto. In the present invention, bulk material is preferably used as molding material.

A molded product intended by the present invention is that which consists of a plurality of molded parts part of whose at least two molded parts faces outside of the molded product. In such a molded product, two or more types of molding materials are substantially localized respectively as molded parts, and part of at least two molded parts thereamong faces outside of the molded product. That is, ordinary press-coated products, in which one molded part is entirely covered by another molded part, are excluded. It should be noted that molded parts mean individual partial molded bodies making up the whole of a molded product in the present specification, with each molded part constituted by a single molding material, and are produced by compressing molding materials charged into molds (including a space surrounded by a die and/or punches). It should also be noted that if, for instance, a molding material acquires a new added value as a result of different physical property (e.g., particle size, crystal shape) from the original material despite identical constituents in terms of chemical substance, the molding material can be regarded as a different material from the original material. This holds also true for the case in which a molded product is claimed to be meaningful as two separate molded parts by using two perfectly identical molding materials.

A manufacturing apparatus, according to the present invention that can efficiently mold, in a single step, a molded product consisting of a plurality of molded parts part of whose at least two molded parts faces outside of the molded product, is a rotary press having a rotatable turn table provided with a die having a die hole and holding upper and lower punches above and below the die so as to be vertically slidable, and being designed to compress molding materials supplied and charged into the die by moving the upper and lower punches in mutually approaching directions and pressing with the punch tips in a state inserted in the die, the rotary press being characterized in comprising at least the upper punch or preferably both the upper and lower punches split into a plurality of punches, means for moving the plurality of split punches and allowing manipulation of at least two of the plurality of split punches for compression operation, a first molding material supply-charging unit for supplying and charging a first molding material into a space in the die formed above the tip portion of the lower punch or formed by the tip portions of split punches of the lower punch, a second molding material supply-charging unit for supplying and charging a second molding material into a space formed above and/or around the first molding material in the die, a precompression molding unit for compression-molding at least one of the molding materials supplied and charged and a main compression molding unit for compression-molding the entire molded product. The rotary press comprises, as necessary, a residual molding material removal unit for removing residual molding material remaining on the lower punch and/or the temporary molded product. That is, the apparatus can perform the steps of supplying and charging a plurality of molding materials respectively into intended given spaces, compression-molding at least one of the molding materials supplied and charged and compression-molding the entire molded product as essential steps and may, as necessary, allow performing the step of removing residual molding material on the lower punch and/or the temporary molded product. It should be noted that the space formed by the tip portions of split punches of the lower punch split into a plurality of punches refers to a space formed by moving some of the split punches of the lower punch.

To prevent contamination between molding materials and ensure clear identification between molded parts, it is preferred that individual molding materials be compression-molded every time they are supplied and charged. For this reason, it is preferred that the rotary press of the present invention be normally provided with material supply-charging units and precompression molding units as many as the material supply-charging units, in addition to a main compression molding unit.

It should be noted that main compression refers to a compression operation designed to finally and completely mold the entire molded product that is carried out at high compression pressures. On the other hand, precompression, as opposed to main compression, refers to all compression operations carried out at some point before main compression, and it is preferred that precompression be normally performed as temporary compression. Temporary compression denotes compression operation at low compression pressures. It should be noted that precompression after supply of the last molding material is precompression of the entire molded product, and temporary compression is normally carried out.

When manufacturing a molded product consisting of a plurality of molded parts part of whose two molded parts faces outside of the molded product, for example, the rotary press of the present invention comprises a first molding material supply-charging unit for supplying and charging a first molding material, a precompression molding unit for compression-molding the first molding material, a second molding material supply-charging unit for supplying and charging a second molding material and a main compression molding unit for compression-molding the entire molded product and comprises, as necessary, a residual molding material removal unit for removing the residual first molding material.

If there are a number of molded parts or if molding materials are localized in a complex manner within the final molded product, naturally the number of molding material supply-charging units increases. Similarly, it is necessary to increase the number of precompression molding units for compression-molding molding materials and the number of residual molding material removal units for removing residual molding materials as necessary.

It can be said that the present invention is characterized particularly in its embodiments that contain the step of supplying and charging, onto a molding material or a molded product consisting thereof, another molding material. That is, the rotary press that can perform such a step is particularly characteristic among the rotary presses of the present invention.

Further in addition to the present invention, a method and apparatus are disclosed time that can efficiently localize molding materials in the molded product in the manufacturing step of supplying and charging molding materials. Among them is a provision of a method for pushing up a molded product (temporary molded product) into a molding material, further allowing the molded product to penetrate through the molding material and removing residual molding material on top, thus localizing the molding material in a complicated manner and allowing easy manufacture of the molded product. Also included is use of lower split punches for reducing the amount of residual molding material remaining on the lower punch. That is, the present invention also discloses a set of upper and lower punches having a split punch structure, with each tip thereof being split into a plurality of punches, individual split punches being vertically slidable and at least two split punches being manipulatable for compression operation, in which at least one of the lower split punches is further split as opposed to the corresponding upper split punch, in which part or whole of a residual molding material remaining on the lower punch can be rubbed and cut by a rubbing-cutting plate as the split punch is raised and in which, unlike the lower punch, the upper punch does not have a split form intended for removing the residual molding material by rubbing and cutting. The set is, in other words, a method for reducing a residual molding material in the compression molding apparatus provided, above and below the die, with punches having a split punch structure, with each tip thereof being split into a plurality of punches, individual split punches being vertically slidable, and at least two split punches being manipulatable for compression operation, the method characterized in that at least one of the lower split punches is further split as opposed to the corresponding upper split punch and that part or whole of a residual molding material remaining on the lower punch can be rubbed and cut by a rubbing-cutting plate as the split punch is raised.

Next, a specific description is given of steps for manufacturing a molded product consisting of a plurality of molded parts part of whose at least two molded parts faces outside of the molded product using the rotary press of the present invention. It should be noted that temporary compression is employed as precompression in the examples. While molded products manufactured are shown with a plurality of molded parts indifferent colors, this is for purposes of convenience and clarity, and this does not necessarily mean that molding materials of different colors are used as in the invention of molded products discussed later.

Figure 5:
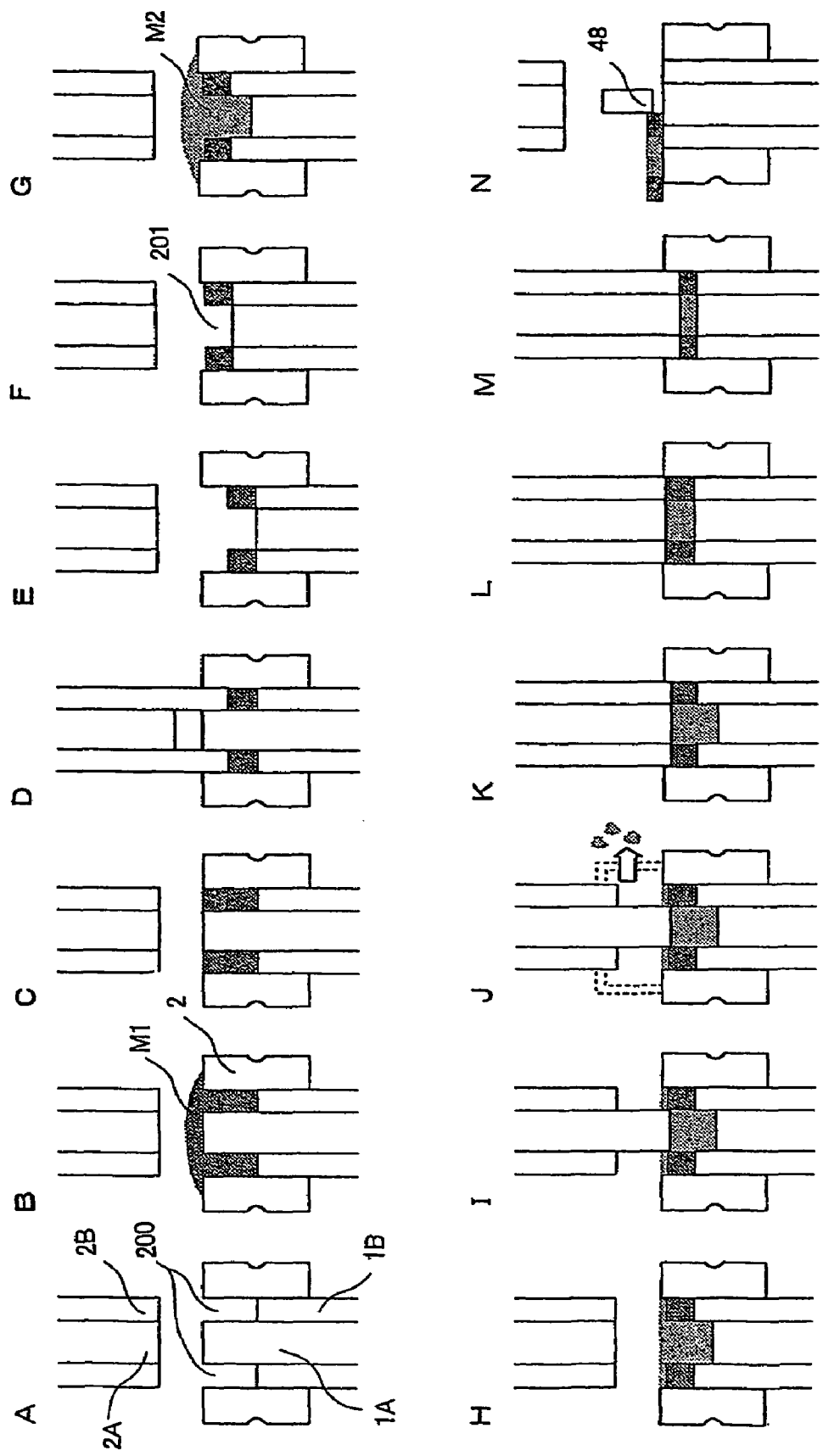
FIG. 5 illustrate explanatory views of punch tip operations showing a first example of manufacturing steps using the manufacturing apparatus of the present invention for a molded product (corresponding to the molded product in FIG. 1) consisting of a plurality of molded parts part of whose at least two molded parts faces outside of the molded product (shading as cross section omitted)

As a first example, a detailed description is given mainly with reference to FIG. 5. It should be noted that the molded product is cylindrical in shape consisting of two types of molding materials, with one of the molded parts surrounded by another, as shown in FIG. 1. Both upper and lower punches used have a double structure in which the tip portion of one punch is completely enclosed by the tip portion of the other punch, as shown in FIG. 24A-1.

First, with a lower split punch 1B lowered below the turn table surface (FIG. 5A), a first molding material M1 is supplied into a first molded part space 200 above the lower split punch 1B within a die 2 (FIG. 5B). The lower split punch 1B is raised as necessary, discharging the excess first molding material M1 out of the die 2 and thus charging a given amount into the space by rubbing and cutting (FIG. 5C). Then, an upper split punch 2B and the lower split punch 1B are moved in mutually approaching directions for precompression, thus temporarily molding the first molding material M1 (FIG. 5D). Next, the lower punches are moved to a given position, with the temporary molded product from the first molding material M1 held on the lower split punch 1B (FIG. 5F). A second molding material M2 is supplied into a second molded part space 201 above a lower punch 1A within the die 2 at a position where the upper end surface of the temporary molded product from the first molding material M1 is slightly lower than the turn table surface (FIG. 5G). The lower punch or punches (the lower split punch 1A and/or the lower split punch 1B) are raised as necessary, discharging the excess second molding material M2 out of the die 2 and thus ensuring charging of a given amount into the space by rubbing and cutting (FIG. 5H). Then, an upper split punch 2A is moved toward the lower split punch 1A such that part of the surface of the second molding material M2 is covered (FIG. 5I). Under this condition, the residual second molding material M2 on the temporary molded product from the first molding material M1 is removed (FIG. 5J). In the next compression operation, compression by moving both upper and lower split punches at the same speed is not preferred as this may disturb the distribution of molding materials within the molded product because of difference in density between the temporary molded product from the first molding material M1 and the second molding material M2. For this reason, the first molding material M1 is covered by moving the upper punch (the upper split punch 2B) toward the lower punch (FIG. 5K), and next the lower split punch 1A is moved toward the upper split punch 2A for precompression until the punch tip surface of the lower split punch 1A is aligned with the punch tip surface of the lower split punch 1B (FIG. 5L). Then, the upper punches (the upper split punches 2A and 2B) and the lower punches (the lower split punches 1A and 1B) are moved respectively in mutually approaching directions for precompression (temporary compression) of the temporary molded products from the first molding material M1 and the second molding material M2 as necessary, eventually followed by main compression (FIG. 5M). The step shown in FIG. 5N is for unloading the completed molded product.

As a second example, a detailed description will be given below mainly with reference to FIG. 7. The molded product is convex in shape, with only the molded part making up the center portion projecting on one side, as shown in FIG. 6. The punches used are the same type as those used in the first example.

First, with a lower split punch 3A lowered below the turn table surface (FIG. 7A), the first molding material M1 is supplied into a first molded part space 202 above the lower split punch 3A enclosed by a lower split punch 3B (FIG. 7B). The lower split punch 3A is raised as necessary, discharging the excess first molding material M1 out of the die 2 and thus ensuring charging of a given amount into the space by rubbing and cutting (FIG. 7C). Then, an upper split punch 4A and the lower split punch 3A are moved in mutually approaching directions for precompression (FIG. 7D), thus temporarily molding the first molding material M1. During or after temporary molding of the first molding material M1, the residual first molding material M1 remaining on the lower split punch 3B is removed (FIG. 7E). Next, with the temporary molded product from the first molding material M1 held by the lower split punches 3A and 3B, the second molding material M2 is supplied into a second molded part space 203 above and around the temporary molded product from the first molding material M1 within the die 2 (FIG. 7G) by lowering the lower punch or punches (both the lower split punches 3A and 3B or the lower split punch 3B) (FIG. 7F). After part of the temporary molded product from the first molding material M1 is stuck into the second molding material M2, the excess second molding material M2 is discharged out of the die 2 as necessary, thus charging a given amount into the space by rubbing and cutting (FIG. 7H). It should be noted that the second molding material M2 can be supplied after sufficiently lowering the lower split punch 3B first such that the temporary molded product from the first molding material M1 is apparently pushed up. Then, the upper punches (the upper split punches 4A and 4B) and the lower punches (the lower split punches 3A and 3B) are moved respectively in mutually approaching directions for precompression (temporary compression) of the entire molded product consisting of the first and second molding materials as necessary, eventually followed by main compression (FIG. 7I). The step shown in FIG. 7J is for unloading the completed molded product.

Figure 9:
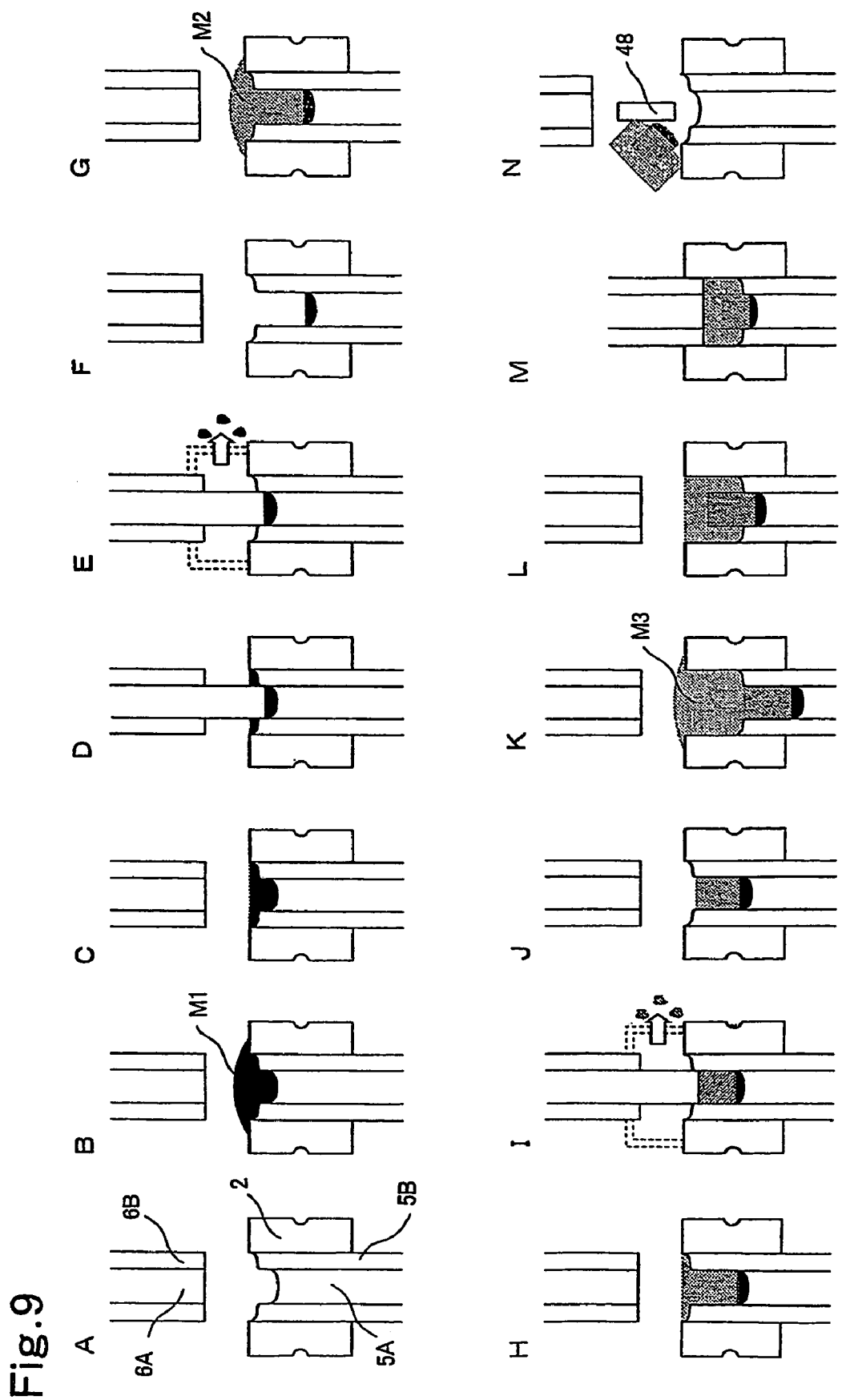
FIG. 9 illustrate explanatory views of punch tip operations showing a third example of manufacturing steps using the manufacturing apparatus of the present invention for a molded product (corresponding to the molded product in FIG. 8) consisting of a plurality of molded parts part of whose at least two molded parts faces outside of the molded product (shading as cross section omitted)

As a third example, a brief description is given next mainly with reference to FIG. 9. The molded product is that in which two types of molding materials are used in the first molded part portion in the molded product of the second example.

Although the third example is basically only a repetition of supply of the first molding material in the second example, the first molding material M1 need not always be compression-molded in FIGS. 9D and 9E, and it suffices to only slightly press the surface of the first molding material M1 with an upper split punch 6A in order to allow removal of residual molding material. To prevent contamination between the first and second molding materials M1 and M2, however, it is preferred that compression molding of the first molding material M1 be carried out.

Figure 11:
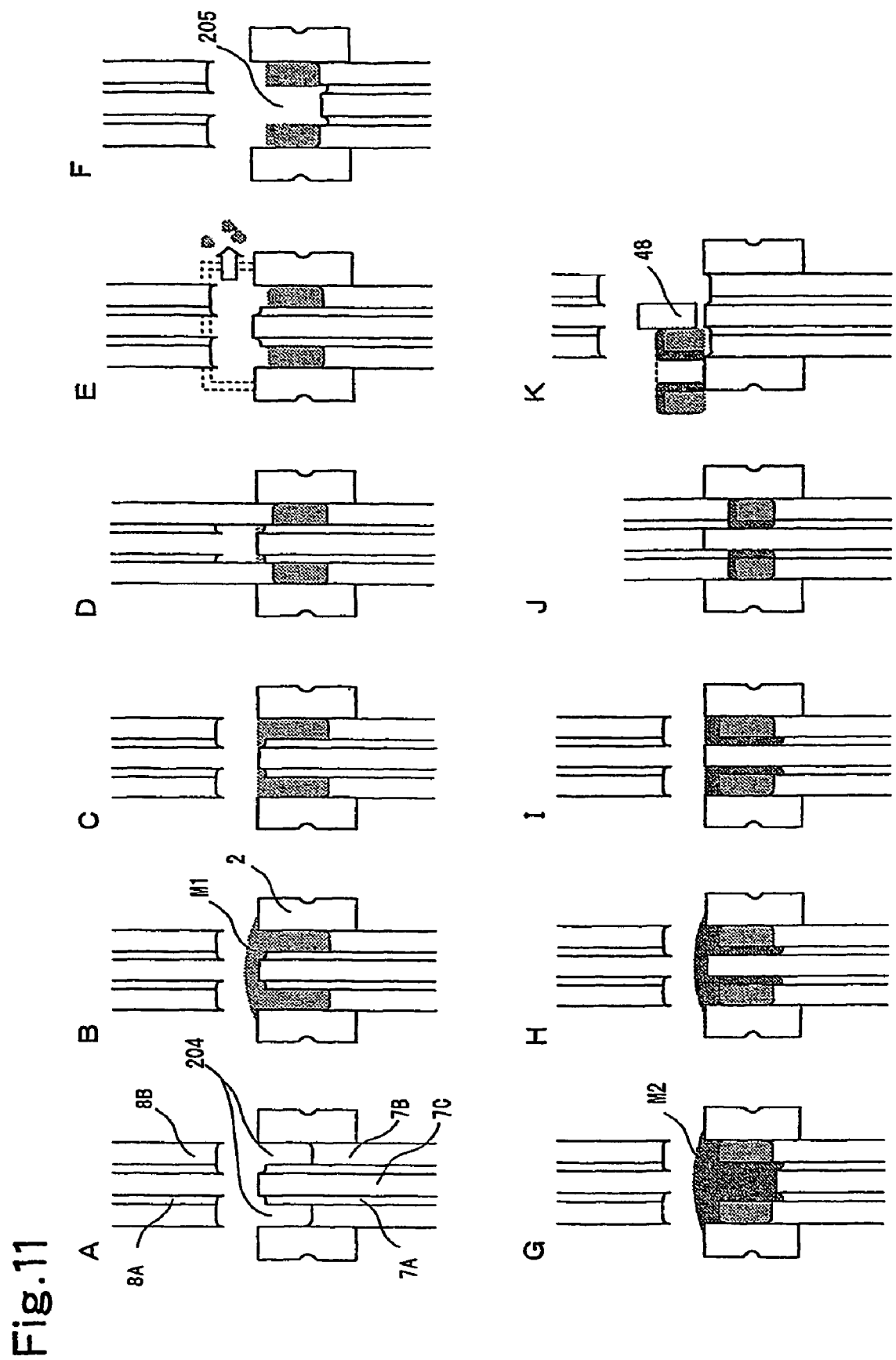
FIG. 11 illustrate explanatory views of punch tip operations showing a fourth example of manufacturing steps using the manufacturing apparatus of the present invention for a molded product (corresponding to the molded product in FIG. 10) consisting of a plurality of molded parts part of whose at least two molded parts faces outside of the molded product (shading as cross section omitted)

As a fourth example, a detailed description will be given below mainly with reference to FIG. 11. The molded product is donut-shaped, with a molding material making up one of the surfaces of the cylindrical structure also existing at the center portion of the molded product, as shown in FIG. 10. While the punches used are of the type in which the tip portion of one punch completely encloses the tip portions of other punches, as shown in FIG. 24B-1, the upper punches have a double structure with a hollow at the center while the lower punches a triple structure with a split punch provided at the center. It should be noted that a lower split punch 7C does not perform compression operation.

First, with a lower split punch 7B lowered below the turn table surface (FIG. 11A), the first molding material M1 is supplied into a first molded part space 204 above the lower split punch 7B enclosed by the die 2 and a lower split punch 7A (FIG. 11B). The lower split punch 7B is raised as necessary, discharging the excess first molding material M1 out of the die 2 and thus ensuring charging of a given amount into the space by rubbing and cutting (FIG. 11C). Then, an upper split punch 8B and the lower split punch 7B are moved in mutually approaching directions for precompression (FIG. 11D), thus temporarily molding the first molding material M1. It should be noted that the tip surface of the lower split punch 7C is always level with the turn table unless otherwise required and may allow compression operation even if fixed in this state. Next, after temporary molding of the first molding material M1, the residual first molding material M1 remaining on the lower split punch 7A is removed (FIG. 11E). With the temporary molded product from the first molding material M1 held on the lower split punch 7B, the second molding material M2 is supplied into a second molded part space 205 above and inside the temporary molded product from the first molding material M1 within the die 2 (FIG. 11G) by lowering the lower punches (the lower split punches 7A and 7C or the lower split punches 7A, 7B and 7C) (FIG. 11F). The lower split punch 7C is raised to its initial position (FIG. 11H), discharging the excess second molding material M2 out of the die 2 as necessary and thus ensuring charging of a given amount into the space by rubbing and cutting (FIG. 11I). Then, the upper punches (the upper split punches 8A and 8B) and the lower punches (the lower split punches 7A and 7B) are moved respectively in mutually approaching directions for precompression (temporary compression) of the entire molded product consisting of the first and second molding materials as necessary, eventually followed by main compression (FIG. 11J). The step shown in FIG. 11K is for unloading the completed molded product.

Figure 13:
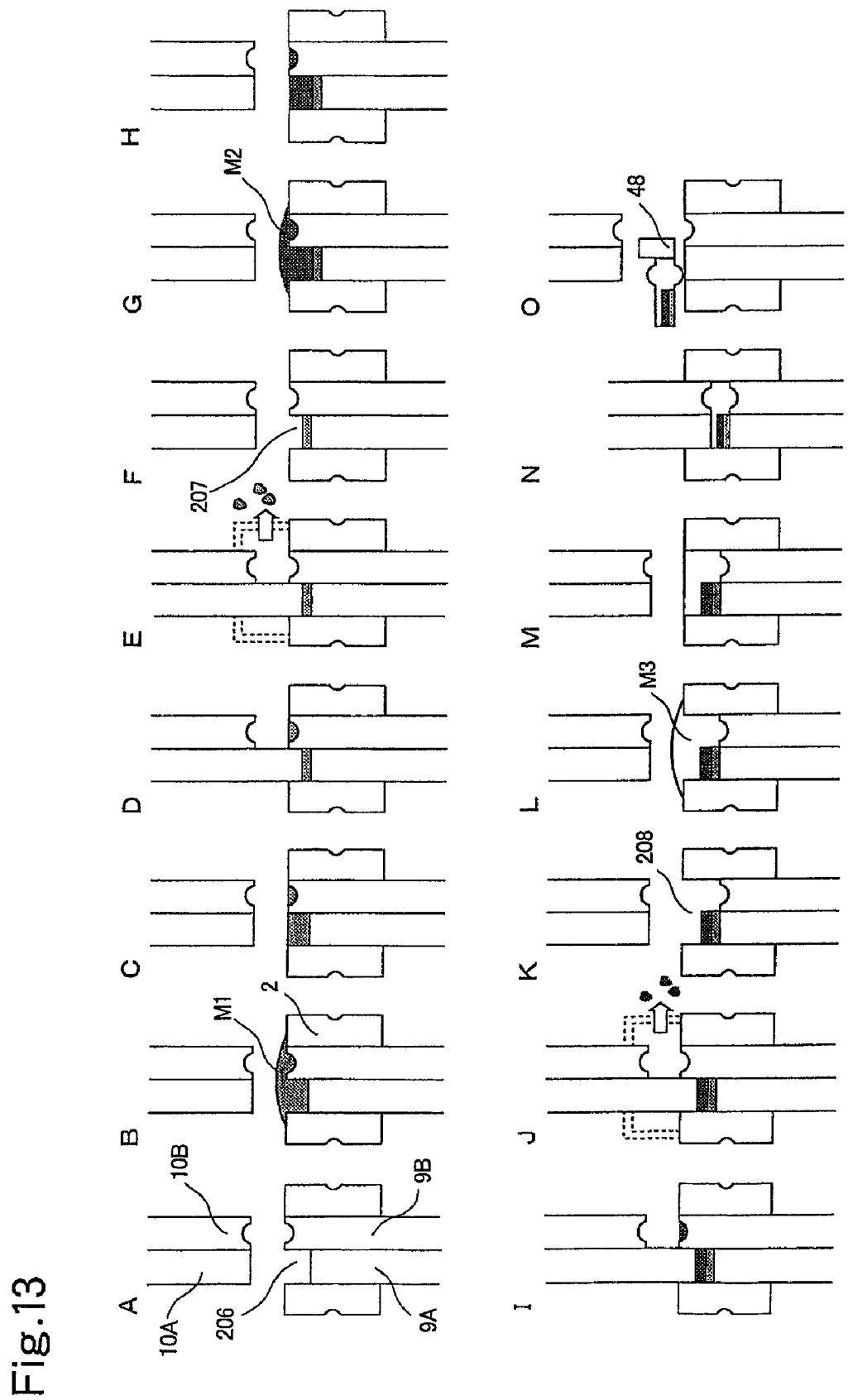
FIG. 13 illustrate explanatory views of punch tip operations showing a fifth example of manufacturing steps using the manufacturing apparatus of the present invention for a molded product (corresponding to the molded product in FIG. 12) consisting of a plurality of molded parts part of whose at least two molded parts faces outside of the molded product (shading as cross section omitted)
Figure 24:
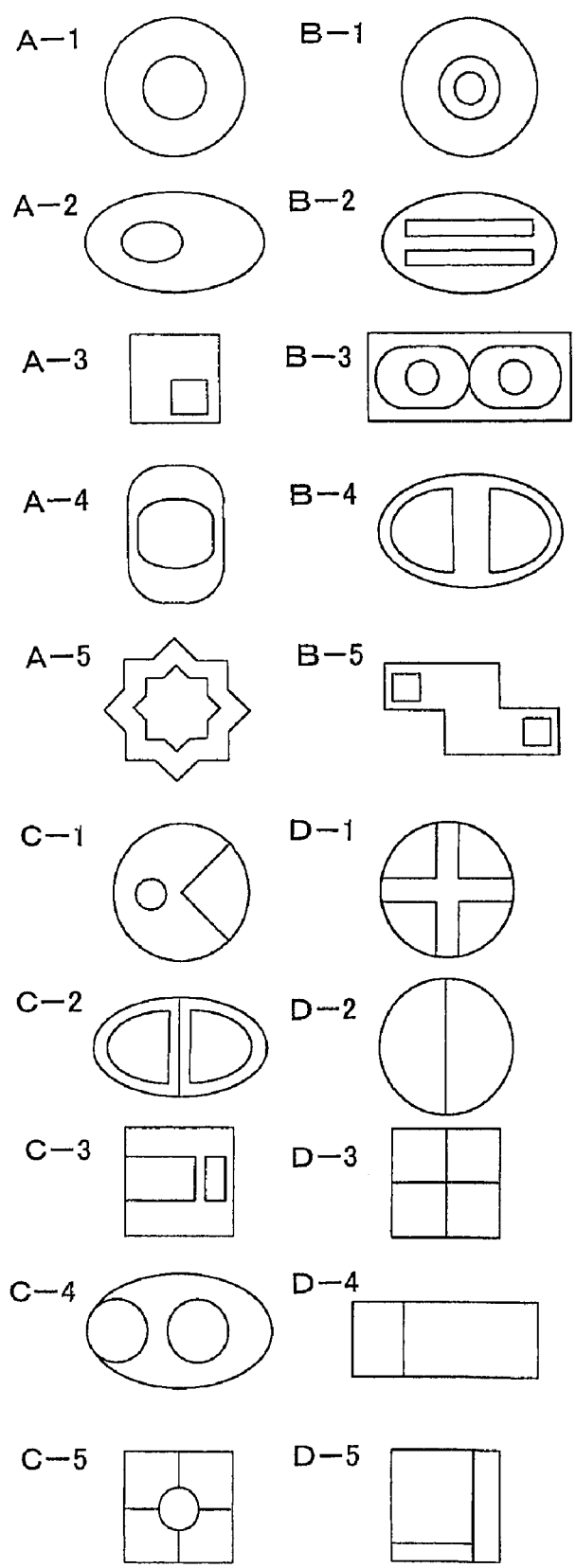
FIG. 24 illustrate top views of example shapes of punch tip portions having a split punch structure used in the present invention, with the shapes classified into four series A to D according to the split form.

As a fifth example, a detailed description will be given below mainly with reference to FIG. 13. The molded product consists of three types of molding materials, with a protrusion on both surfaces of a rectangular parallelepiped, as shown in FIG. 12. The punches used have a rectangular tip surface split into two, with a recess provided on one side for forming protrusions (FIG. 24 D-4).

First, with a lower split punch 9A lowered below the turn table surface (FIG. 13A), the first molding material M1 is supplied into a first molded part space 206 above the lower split punch 9A and enclosed by the die 2 and a lower split punch 9B (FIG. 13B). The lower split punch 9A is raised as necessary, discharging the excess first molding material M1 out of the die 2 and thus ensuring charging of a given amount into the space by rubbing and cutting (FIG. 13C). Then, an upper split punch 10A and the lower split punch 9A are moved in mutually approaching directions for precompression (FIG. 13D), thus temporarily molding the first molding material M1. During or after temporary molding of the first molding material M1, the residual first molding material M1 remaining on the lower split punch 9B is removed (FIG.

13E). Next, the second molding material M2 is supplied (FIG. 13G) into a second molded part space 207 (FIG. 13F) above the temporary molded product from the first molding material held on the lower split punch 9A within the die 2. The lower split punch 9A is raised as necessary, discharging the excess second molding material M2 out of the die 2 and thus ensuring charging of a given amount into the space by rubbing and cutting (FIG. 13H). Then, the upper split punch 10A and the lower split punch 9A are moved in mutually approaching directions for precompression (FIG. 13I), thus temporarily molding the second molding material M2 together with the temporary molded product from the first molding material M1. During or after temporary molding of the second molding material M2 (and the first molding material M1), the residual second molding material M2 remaining on the lower split punch 9B is removed (FIG. 13J). Further, with the lower punch or punches (the lower split punches 9A and 9B or the lower split punch 9B) lowered, a third molding material M3 is supplied (FIG. 13L) into a third molded part space 208 (FIG. 13K) above the temporary molded products from the first and second molding materials M1 and M2 and on the lower split punch 9B within the die 2. The excess third molding material M3 is discharged out of the die 2 as necessary, thus ensuring charging of a given amount into the space by rubbing and cutting (FIG. 13M). Finally, the upper punches (the upper split punch 10A and an upper split punch 10B) and the lower punches (the lower split punches 9A and 9B) are moved in mutually approaching directions for precompression (temporary compression) of the entire molded product consisting of the first, second and third molding materials, eventually followed by main compression (FIG. 13N). The step shown in FIG. 13O is for unloading the completed molded product. It should be noted that it is possible for the first molding material M1 to proceed with the step of removing the residual first molding material by lightly pressing down the surface of the first molding material M1 without precompression thereof.

As a sixth example, a detailed description will be given below mainly with reference to FIG. 15. The molded product is, with one molding material split into four parts and localized on one of the disc-shaped surfaces, as shown in FIG. 14. Both upper and lower punches used have a split structure as shown in FIG. 24D-1, with one of the split punches having a tip portion split into four parts by the other split punch—a cross-shaped split punch.

First, with a lower split punch 11B lowered below the turn table surface (FIG. 15A), the first molding material M1 is supplied into a first molded part space 209 enclosed by the die 2 and a lower split punch 11A above the lower split punch 11B (FIG. 15B). The lower split punch 11B is raised as necessary, discharging the excess first molding material M1 out of the die 2 and thus ensuring charging of a given amount into the space by rubbing and cutting (FIG. 15C). Then, the upper split punch 12B and the lower split punch 11B are moved in mutually approaching directions for precompression (FIG. 15D), thus temporarily molding the first molding material M1. After temporary molding of the first molding material M1, the residual first molding material M1 remaining on the lower split punch 11A is removed (FIG. 15E). With the temporary molded product from the first molding material M1 held on the lower split punch 11B, the second molding material M2 is supplied into a second molded part space 210 above and around the temporary molded product from the first molding material M1 within the die 2 (FIG. 15G) by lowering the lower punches (the lower split punches 11A and 11B or the lower split punch 11A) (FIG. 15F). The excess second molding material M2 is discharged out of the die 2 as necessary, thus ensuring charging of a given amount into the space by rubbing and cutting (FIG. 15H). Then, the upper punches (the upper split punches 12A and 12B) and the lower punches (the lower split punches 11A and 11B) are moved respectively in mutually approaching directions for precompression (temporary compression) of the entire molded product consisting of the first and second molding materials as necessary, eventually followed by main compression (FIG. 15I). The step shown in FIG. 15J is for unloading the completed molded product.

Figure 17:
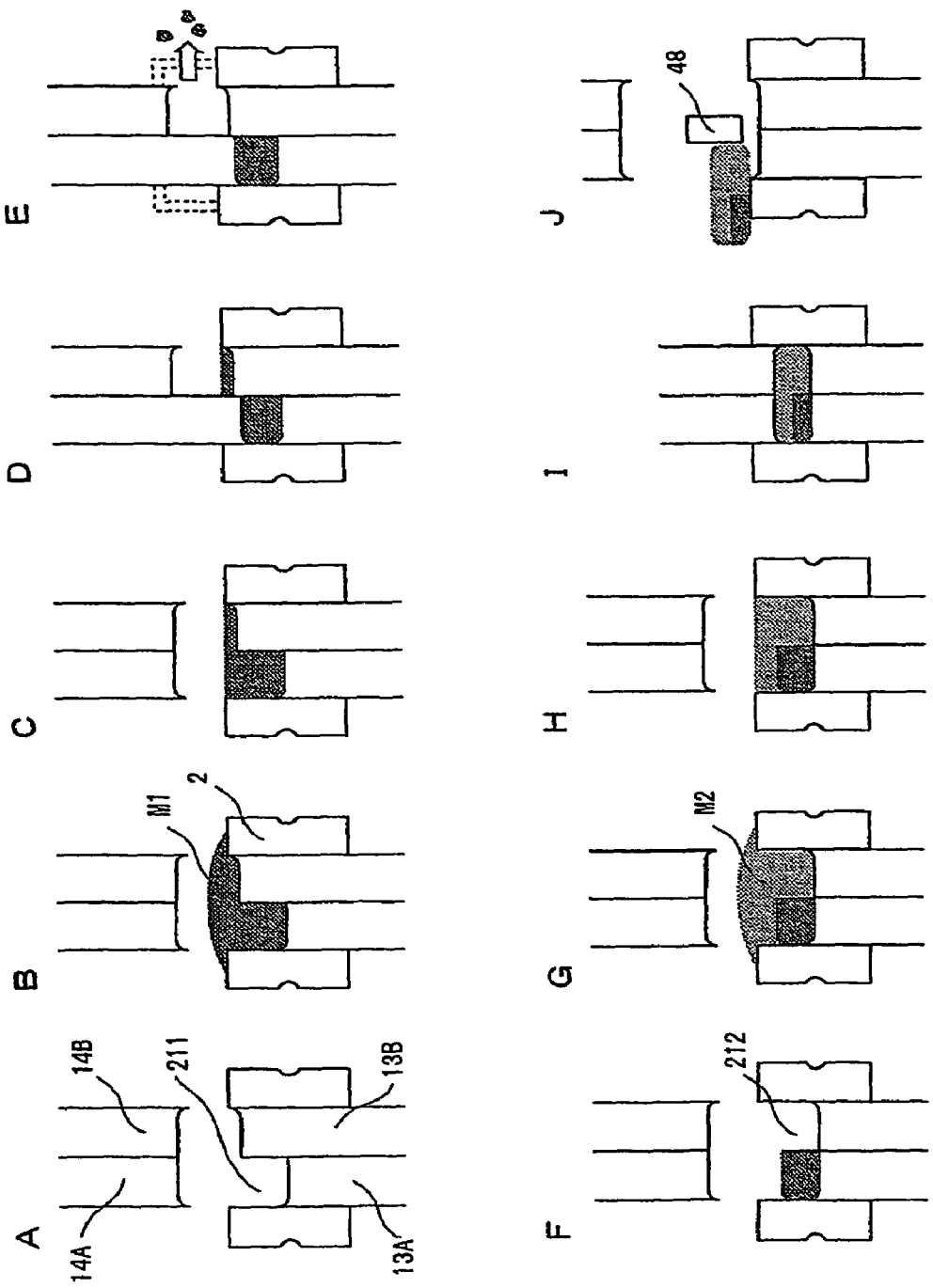
FIG. 17 illustrate explanatory views of punch tip operations showing a seventh example of manufacturing steps using the manufacturing apparatus of the present invention for a molded product (corresponding to the molded product in FIG. 16) consisting of a plurality of molded parts part of whose at least two molded parts faces outside of the molded product (shading as cross section omitted)

As a seventh example, a detailed description will be given below mainly with reference to FIG. 17. The molded product is disc-shaped, with one of the surfaces split into two parts along the diameter, as shown in FIG. 16. The punches used have a circular tip surface split into two parts, as shown in FIG. 24D2.

First, with a lower split punch 13A lowered below the turn table surface (FIG. 17A), the first molding material M1 is supplied into a first molded part space 211 enclosed by the die 2 and a lower split punch 13B and above the lower split punch 13A (FIG. 17B). The lower split punch 13A is raised as necessary, discharging the excess first molding material M1 out of the die 2 and thus ensuring charging of a given amount into the space by rubbing and cutting (FIG. 17C). Then, the upper split punch 14A and the lower split punch 13A are moved in mutually approaching directions for precompression (FIG. 17D), thus temporarily molding the first molding material M1. During or after temporary molding of the first molding material M1, the residual first molding material M1 remaining on the lower split punch 13B is removed (FIG. 17E). Next, with the temporary molded product from the first molding material M1 held by the lower split punches 13A and 13B, the second molding material M2 is supplied into a second molded part space 212 above the temporary molded product from the first molding material M1 and above the lower split punch 13B within the die 2 (FIG. 17G) by lowering the lower punch or punches (both the lower split punches 13A and 13B or the lower split punch 13B) (FIG. 17F). The excess second molding material M2 is discharged out of the die 2 as necessary, thus ensuring charging of a given amount into the space by rubbing and cutting (FIG. 17H). Then, the upper punches (the upper split punches 14A and 14B) and the lower punches (the lower split punches 13A and 13B) are moved respectively in mutually approaching directions for precompression (temporary compression) of the entire molded product consisting of the first and second molding materials as necessary, eventually followed by main compression (FIG. 17I). The step shown in FIG. 17J is for unloading the completed molded product.

Figure 19:
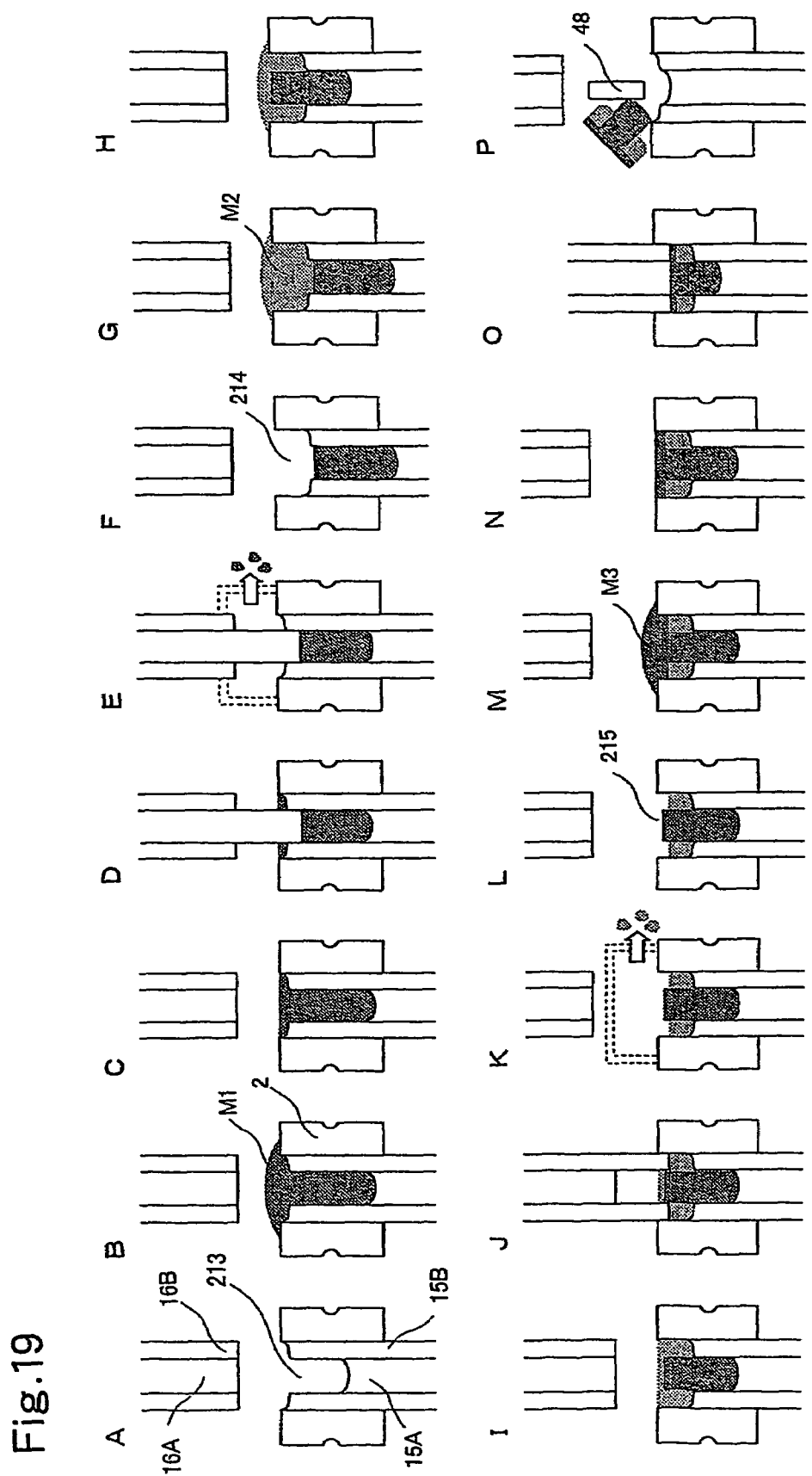
FIG. 19 illustrate explanatory views of punch tip operations showing an eighth example of manufacturing steps using the manufacturing apparatus of the present invention for a molded product (corresponding to the molded product in FIG. 18) consisting of a plurality of molded parts part of whose at least two molded parts faces outside of the molded product (shading as cross section omitted)

As an eighth example, a detailed description will be given below mainly with reference to FIG. 19. The molded product is convex in shape, with the center portion projecting and further the projecting portion and the bottom portion being made of the same molding material, as shown in FIG. 18. The punches used are the same as those used in the first example.

First, with a lower split punch 15A lowered below the turn table surface (FIG. 19A), the first molding material M1 is supplied into a first molded part space 213 enclosed by a lower split punch 15B and above the lower split punch 15A (FIG. 19B). The lower split punch 15A is raised as necessary, discharging the excess first molding material M1 out of the die 2 and thus ensuring charging of a given amount into the space by rubbing and cutting (FIG. 19C). Then, the upper split punch 16A and the lower split punch 15A are moved in mutually approaching directions for precompression (FIG. 19D), thus temporarily molding the first molding material M1. During or after temporary molding of the first molding material M1, the residual first molding material M1 remaining on the lower split punch 15B is removed (FIG. 19E). Next, with the temporary molded product from the first molding material M1 held on the lower split punch 15A, the second molding material M2 is supplied into a second molded part space 214 above and around the temporary molded product from the first molding material M1 within the die 2 (FIG. 19G) by lowering the lower punch or punches (both the lower split punches 15A and 15B or the lower split punch 15B) (FIG. 19F). After part of the temporary molded product from the first molding material M1 is stuck into the second molding material M2 (FIG. 19H), the excess second molding material M2 is discharged out of the die 2 as necessary, thus ensuring charging of a given amount into the space by rubbing and cutting (FIG. 19I). It should be noted that the second molding material M2 can be supplied after sufficiently lowering the lower split punch 15B first such that the temporary molded product from the first molding material M1 is apparently pushed up. Then, the upper split punch 16B and the lower split punch 15B are moved respectively in mutually approaching directions for precompression of the second molding material (FIG. 19J) followed by raising of the upper punch, thus removing the second molding material M2 remaining on the temporary molded product from the first molding material M1 (FIG. 19K). In the removal of the molding material, only the uncompressed second molding material M2 on the temporary molded product from the first molding material M1 is removed while other portions remain unremoved because they have been compression-molded. Next, the third molding material M3 is supplied into a third molded part space 215 above the temporary molded products from the first and second molding materials M1 and M2 within the die 2 (FIG. 19M). The excess third molding material M3 is discharged out of the die 2 as necessary, thus ensuring charging of a given amount into the space by rubbing and cutting (FIG. 19N). Then, the upper punches (the upper split punches 16A and 16B) and the lower punches (the lower split punches 15A and 15B) are moved respectively in mutually approaching directions for precompression (temporary compression) of the entire molded product consisting of the first, second and third molding materials as necessary, eventually followed by main compression (FIG. 19O). The step shown in FIG. 19P is for unloading the completed molded product.

It should be noted that although the same material is used for the third molding material M3 as for the first molding material M1, these materials are described as separate materials for reasons of convenience. It is of course possible to use a completely different molding material for the third molding material M3 from those of the first and second molding materials M1 and M2.

It should be also noted that a method is provided in the eighth example for localizing a molding material in a complex manner and allowing easy manufacture of the molded product by pushing up a temporary molded product into the molding material, allowing the molded product to penetrate through the molding material and thereby removing the residual molding material on top, as shown in FIGS. 19G to 19L, as a method for efficiently localizing molding materials in a molded product. The method is possible only if a residual molding material removal device is available, and a detailed description thereof will be given later.

Figure 21:
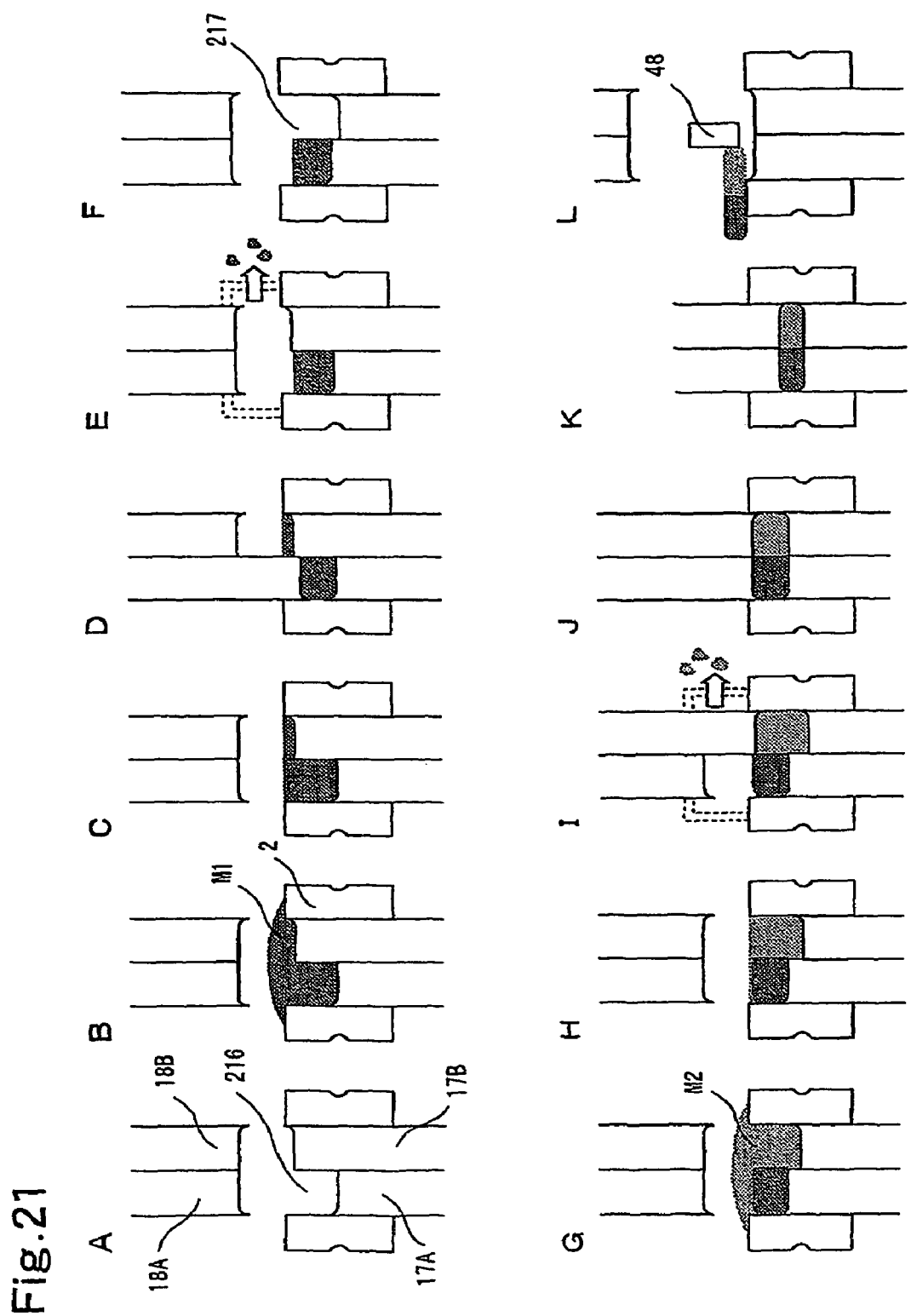
FIG. 21 illustrate explanatory views of punch tip operations showing a ninth example of manufacturing steps using the manufacturing apparatus of the present invention for a molded product (corresponding to the molded product in FIG. 20) consisting of a plurality of molded parts part of whose at least two molded parts faces outside of the molded product (shading as cross section omitted)

As a ninth example, a detailed description will be given below mainly with reference to FIG. 21. The molded product is disc-shaped, with two molded parts provided on the right and left sides separately from each other, as shown in FIG. 20. The punches used are the same as those used in the seventh example.

First, with a lower split punch 17A lowered below the turn table surface (FIG. 21A), the first molding material M1 is supplied into a first molded part space 216 enclosed by a lower split punch 17B and the die 2 and above the lower split punch 17A (FIG. 21B). The lower split punch 17A is raised as necessary, discharging the excess first molding material M1 out of the die 2 and thus ensuring charging of a given amount into the space by rubbing and cutting (FIG. 21C). Then, the upper split punch 18A and the lower split punch 17A are moved in mutually approaching directions for precompression (FIG. 21D), thus temporarily molding the first molding material M1. During or after temporary molding of the first molding material M1, the residual first molding material M1 remaining on the lower split punch 17B is removed (FIG. 21E). Next, with the temporary molded product from the first molding material M1 held by the lower split punches 17A and 17B, the second molding material M2 is supplied into a second molded part space 217 above the temporary molded product from the first molding material M1 within the die 2 (FIG. 21G) by lowering the lower punch or punches (both the lower split punches 17A and 17B or the lower split punch 17B) (FIG. 21F). The excess second molding material M2 is discharged out of the die 2 as necessary, thus ensuring charging of a given amount into the space by rubbing and cutting (FIG. 21H). Further, the second molding material M2 remaining on the surface of the temporary molded product from the first molding material M1 on the lower split punch 17A is removed, with the charged second molding material M2 lightly covered by an upper split punch 18B (FIG. 21I). Then, the upper split punch 18A is lowered onto the molded product such that the tips of the upper split punches are aligned with each other, followed by precompression of the second molding material M2 by the lower split punch 17B and the upper split punch 18B (FIG. 21J). Further, the upper punches (the upper split punches 18A and 18B) and the lower punches (the lower split punches 17A and 17B) are moved respectively in mutually approaching directions for precompression (temporary compression) of the entire molded product consisting of the first and second molding materials as necessary, eventually followed by main compression (FIG. 21K). The step shown in FIG. 21L is for unloading the completed molded product.

It should be noted that the residual molding material removal step can be carried out by compressed air injection and suction (device shown in FIG. 33), brushing, scraper, etc. or a device equipped with a combination thereof in any one of the embodiments. A detailed description will be given later. It should be also noted that, depending on the punch shapes, the residual molding material removal step can be carried out concurrently with the compression step in some cases while the step can only be performed at the completion of the compression step in other cases. If the compression step is skipped, the residual molding material removal step is carried out with the surface of the molding material lightly pressed down by the punch.

Figure 35:
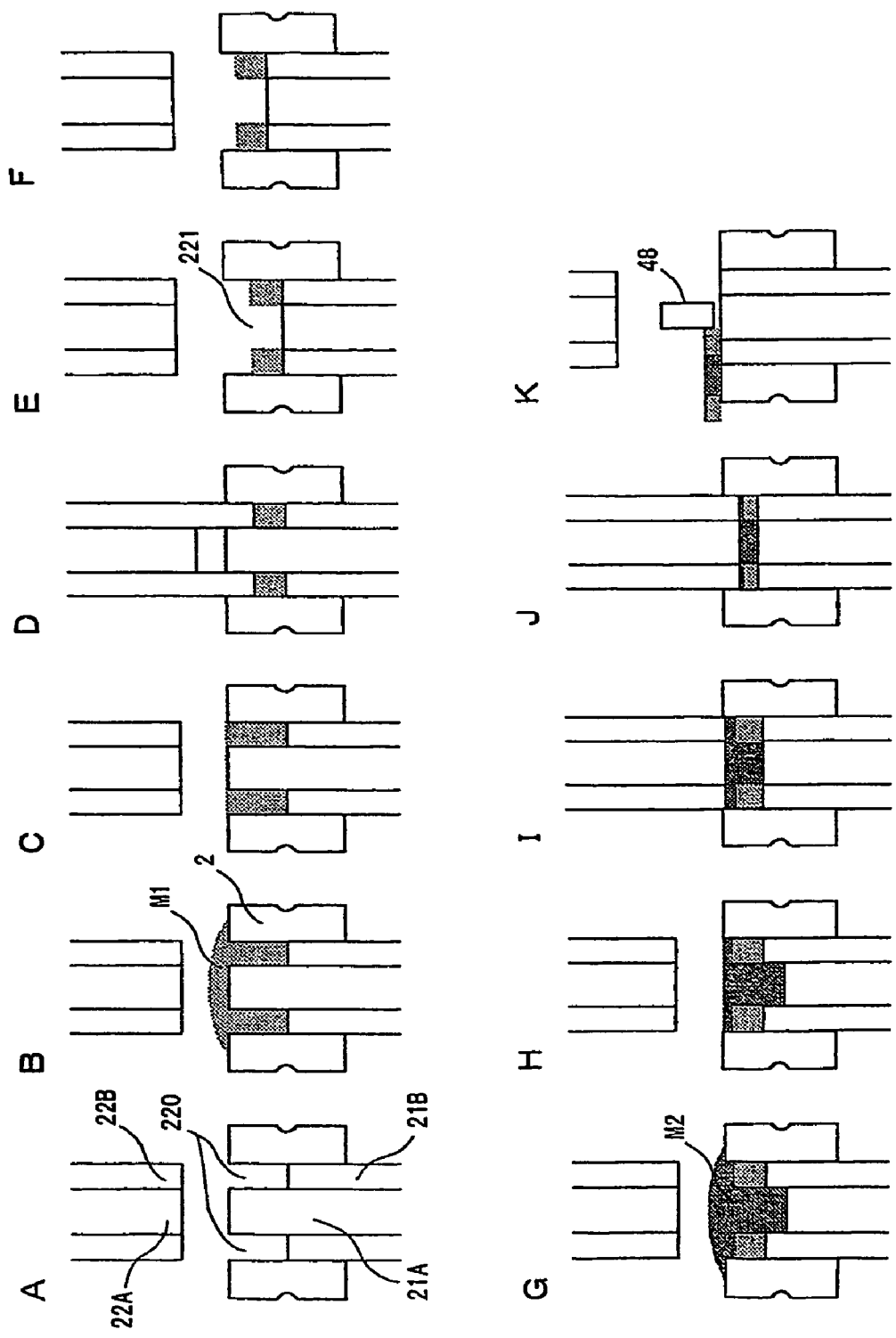
FIG. 35 illustrate explanatory views of punch tip operations showing a tenth example of manufacturing steps using the manufacturing apparatus of the present invention for a molded product (corresponding to the molded product in FIG. 34) consisting of a plurality of molded parts part of whose at least two molded parts faces outside of the molded product (shading as cross section omitted)

While the embodiments requiring the residual molding material removal step have been described so far, an embodiment not requiring the step will be presented next. As a tenth example, a detailed description will be given below mainly with reference to FIG. 35. The molded product is cylindrical in shape and made up of two types of molding materials, with one of the molded parts making up one of the surfaces and the core of the molded product surrounded by the other molded part, as shown in FIG. 34. Both upper and lower punches used have a double structure in which the tip portion of one punch is completely enclosed by the tip portion of the other punch, as shown in FIG. 24A-1.

First, with a lower split punch 21B lowered below the turn table surface (FIG. 35A), the first molding material M1 is supplied into a first molded part space 220 above a lower split punch 21B within the die 2 (FIG. 35B). The lower split punch 21B is raised as necessary, discharging the excess first molding material M1 out of the die 2 and thus ensuring charging of a given amount into the space by rubbing and cutting (FIG. 35C). Then, an upper split punch 22B and the lower split punch 21B are moved in mutually approaching directions for precompression, thus temporarily molding the first molding material M1 (FIG. 35D). Next, the lower punches are moved to a given position, with the temporary molded product from the first molding material M1 held on the lower split punch 21B (FIG. 35F). The second molding material M2 is supplied into a second molded part space 221 above a lower punch 21A and above the temporary molded product from the first molding material M1 within the die 2 at a position where the upper end surface of the temporary molded product from the first molding material M1 is slightly lower than the turn table surface (FIG. 35G). The lower punch or punches (the lower split punch 21A and/or the lower split punch 21B) are raised as necessary, discharging the excess second molding material M2 out of the die 2 and thus ensuring charging of a given amount into the space by rubbing and cutting (FIG. 35H). In the next compression operation, compression by moving both upper and lower split punches at the same speed is not preferred as this may disturb the distribution of molding materials within the molded product because of difference in density between the temporary molded product from the first molding material M1 and the second molding material M2. For this reason, the first molding material M1 is covered by moving the upper punches (an upper split punch 22A and the upper split punch 22B) toward the lower punches, and next the lower split punch 21A is moved toward the upper split punch 22A for precompression until the punch tip surface of the lower split punch 21A is aligned with the punch tip surface of the lower split punch 21B (FIG. 35I). Further, the upper punches (the upper split punches 22A and 22B) and the lower punches (the lower split punches 21A and/or 21B) are moved in mutually approaching directions for precompression (temporary compression) of the temporary molded products from the first and second molding materials M1 and M2, eventually followed by main compression (FIG. 35J). The step shown in FIG. 35K is for unloading the completed molded product.

Figure 37:
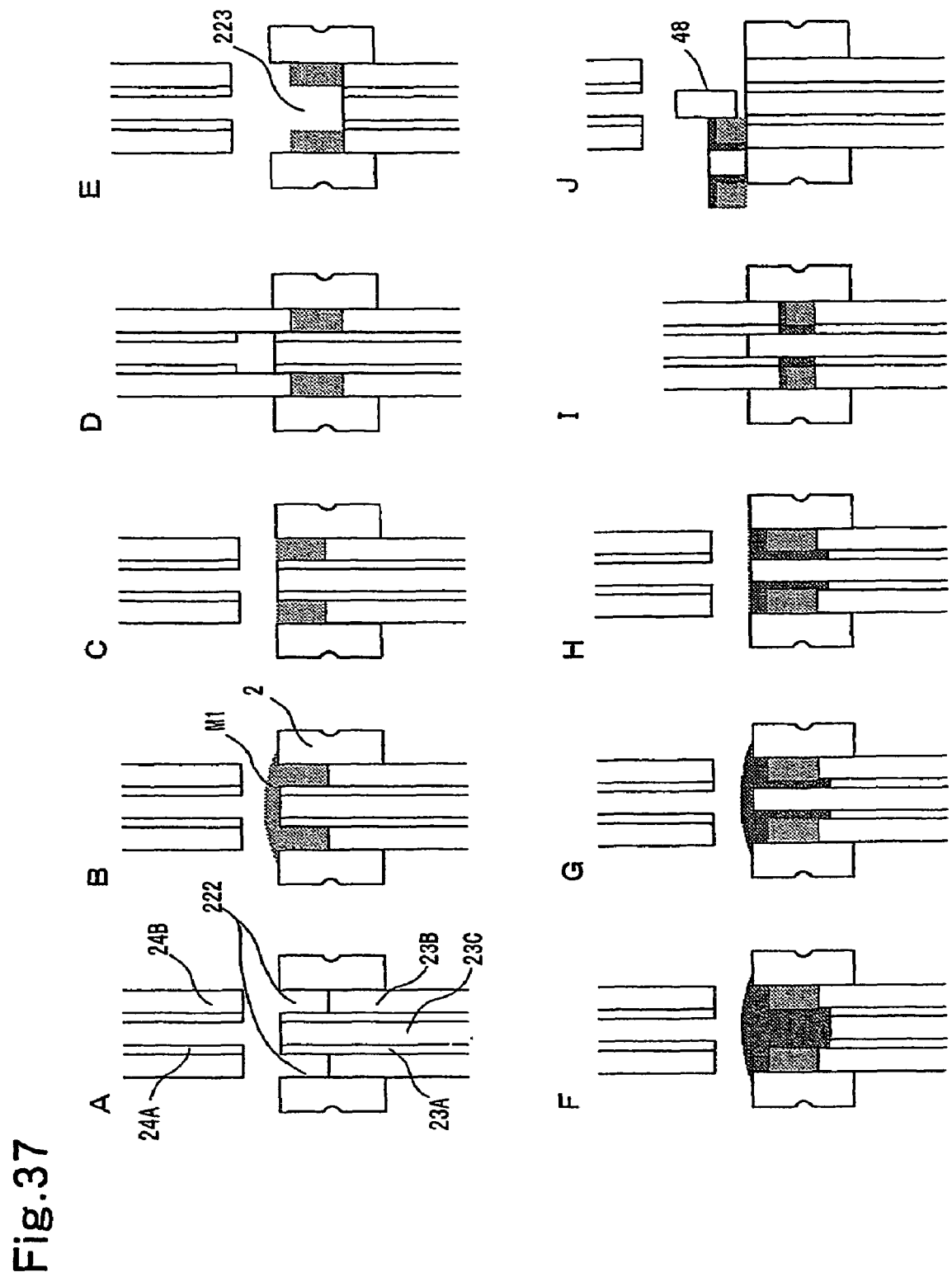
FIG. 37 illustrate explanatory views of punch tip operations showing an eleventh example of manufacturing steps using the manufacturing apparatus of the present invention for a molded product (corresponding to the molded product in FIG. 36) consisting of a plurality of molded parts part of whose at least two molded parts faces outside of the molded product (shading as cross section omitted)

As an eleventh example, a detailed description will be given below mainly with reference to FIG. 37. The molded product is donut-shaped, with a molding material making up one of the surfaces of the cylindrical structure also existing at the center portion of the molded product, as shown in FIG. 36. While the punches used are of the type in which the tip portions of other punches are completely enclosed by the tip portion of one punch, as shown in FIG. 24B-1, the upper punches have a double structure with a hollow at the center. The lower punches have a triple structure with a split punch also provided at the center. It should be noted that a lower split punch 23C does not perform compression operation.

First, with a lower split punch 23B lowered below the turn table surface (FIG. 37A), the first molding material M1 is supplied into a first molded part space 222 enclosed by the die 2 and a lower split punch 23A and above the lower split punch 23B (FIG. 37B). The lower split punch 23B is raised as necessary, discharging the excess first molding material M1 out of the die 2 and thus ensuring charging of a given amount into the space by rubbing and cutting (FIG. 37C). Then, an upper split punch 24B and the lower split punch 23B are moved in mutually approaching directions for precompression (FIG. 37D), thus temporarily molding the first molding material M1. It should be noted that the tip surface of the lower split punch 23C is always level with the turn table unless otherwise required and may allow compression operation even if fixed in this state. Next, with the temporary molded product from the first molding material M1 held on the lower split punch 23B, the second molding material M2 is supplied into a second molded part space 223 above and inside the temporary molded product from the first molding material M1 within the die 2 (FIG. 37F) by lowering the lower punches (the lower split punches 23A and 23C or the lower split punches 23A, 23B and 23C) (FIG. 37E). The lower split punch 23C is raised to its initial position (FIG. 37G), discharging the excess second molding material M2 out of the die 2 as necessary and thus ensuring charging of a given amount into the space by rubbing and cutting (FIG. 37H). Then, the upper punches (an upper split punch 24A and the upper split punch 24B) and the lower punches (the lower split punches 23A and 23B) are moved respectively in mutually approaching directions for precompression (temporary compression) of the entire molded product consisting of the first and second molding materials as necessary, eventually followed by main compression (FIG. 37I). The step shown in FIG. 37J is for unloading the completed molded product.

From here, a description will be further given of the case in which a normal punch not having a split punch structure is used as the lower punch. The present embodiment will be explained below in detail as a twelfth example mainly with reference to FIG. 41. The molded product is cylindrical in shape, with the center portion of a molded part making up one of the surfaces projecting outward and the molded part further projecting into the molded product toward the center thereof, as shown in FIG. 42B. While the punches used are of the type in which the tip portion of one punch is completely enclosed by the tip portion of the other punch, as shown in FIG. 24A-1, the upper punch has a double structure while a normal punch with no split structure is used as the lower punch.

First, with a lower punch 25A lowered below the turn table surface (FIG. 41A), the first molding material M1 is supplied into a first molded part space 224 enclosed by the die 2 and the lower punch 25A and above a lower split punch 25B (FIG. 41B). The lower punch 25A is raised as necessary, discharging the excess first molding material M1 out of the die 2 and thus ensuring charging of a given amount into the space by rubbing and cutting (FIG. 41C). Then, with an upper split punch 26A projecting beyond an upper split punch 26B, the upper split punches 26A and 26B and the lower punch 25A are moved in mutually approaching directions for precompression (FIG. 41D), thus temporarily molding the first molding material M1. Next, with the temporary molded product from the first molding material M1 held on the lower punch 25A, the second molding material M2 is supplied into a second molded part space 225 above the temporary molded product from the first molding material M1 within the die 2 (FIG. 41F) by moving the lower punch 25A to a given position (FIG. 41E). The lower punch 25A is raised to a given position as necessary, discharging the excess second molding material M2 out of the die 2 and thus charging a given amount into the space by rubbing and cutting (FIG. 41G). Then, with the upper split punch 26B projecting beyond the upper split punch 26A, the upper punches and the lower punch 25A are moved in mutually approaching directions for precompression (temporary compression) of the entire molded product consisting of the first and second molding materials as necessary, eventually followed by main compression (FIG. 41M). The step shown in FIG. 41N is for unloading the completed molded product.

Manufacturing steps have been described so far in relation to various embodiments of the method for manufacturing a molded product consisting of a plurality of molded parts part of whose at least two molded parts faces outside of the molded product using the rotary press of the present invention. The rotary press of the present invention is constructed to allow performance of the manufacturing steps in order to manufacture a molded product consisting of a plurality of molded parts part of whose at least two molded parts faces outside of the molded product. From here onwards, conventional rotary press will be described first followed by a detailed description of structural portions of the manufacturing apparatus which is the rotary press of the present invention.

Figure 23:
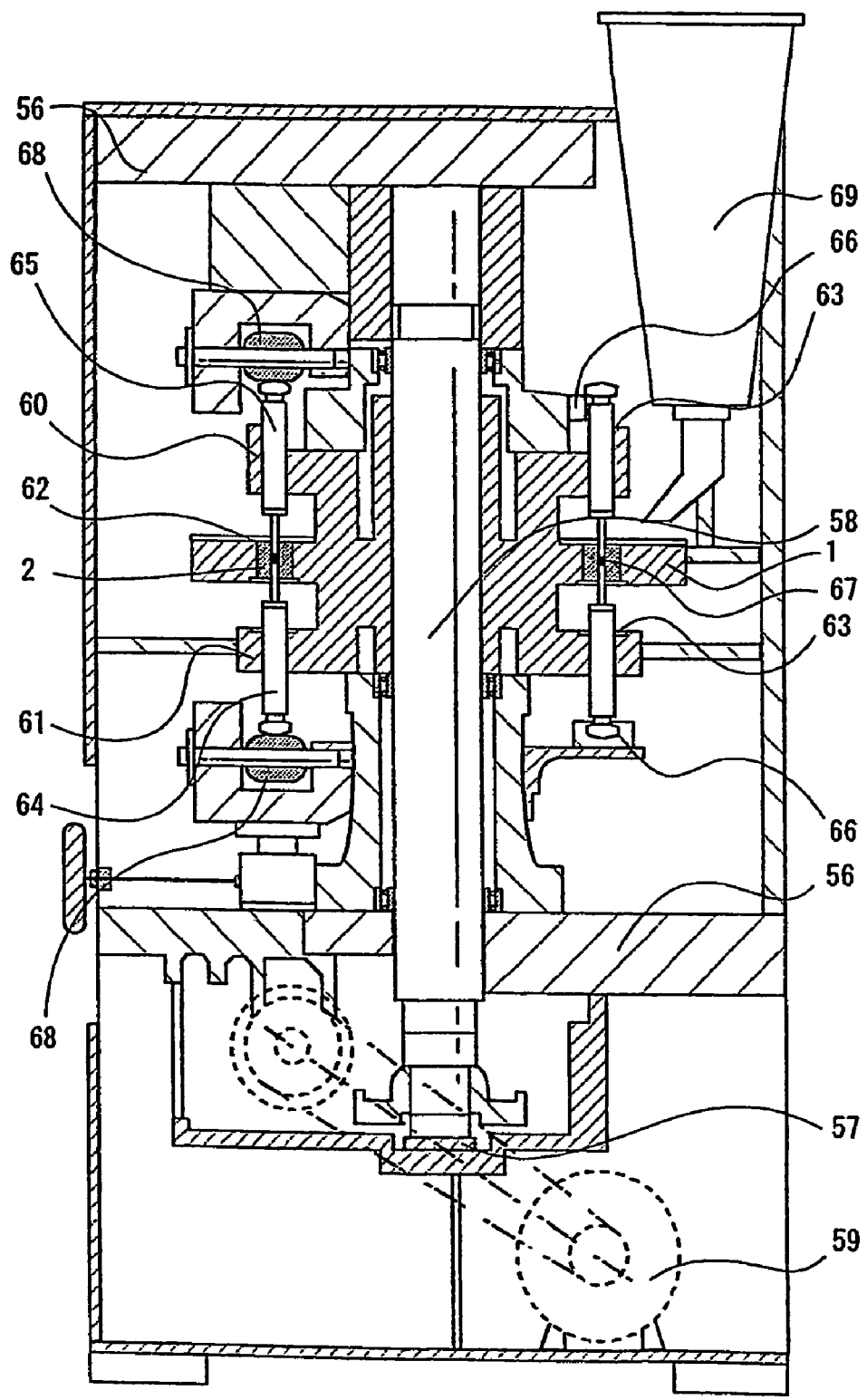
FIG. 23 illustrates an overall front sectional view of a common rotary press, although with no sectional views of punches, vertical shaft and hopper shown.

If shaft-driven, for example, rotary press often has a vertical shaft 58, supported by a bearing 57, arranged at the center portion of a main body frame 56, with a motor 59 transmitting rotational drive force to the vertical shaft and a turn table 1 fixed near the vertical shaft (FIG. 23). Further, there are provided an upper punch holding portion 60, located on the upper portion of the turn table 1, for holding an upper punch so as to be vertically slidable and a lower punch holding portion 61, located on the lower portion of the turn table 1, for holding a lower punch so as to be vertically slidable such that the turn table 1 is sandwiched between the upper and lower punch holding portions 60 and 61. On the turn table 1, there is a die portion made up of a plurality of a die mounting hole 62, for fitting the die 2 so as to be slidable, that are provided along the same circumference. On each of the upper and lower punch holding portions 60 and 61, there are a plurality of punch holding hole 63 drilled for holding the upper and lower punches so as to be slidable. Each of the punch holding hole 63 and the die mounting hole 62 is drilled on the turn table such that the lower punch 64, the upper punch 65 and the die 2 are arranged vertically with their center lines aligned. Tracks 66 are provided correspondingly for track contact portions of the upper punch 65 and the lower punch 64, and the punches move vertically on the tracks as they engage with and are guided by respective cams which will be discussed later. The die 2 has a die hole 67 cut vertically through the die into which the tips of the upper and lower punches 65 and 64 are inserted. It should be noted that 68 represents a compression roller while 69 a hopper in FIG. 23. In addition to shaft-driven rotary press, there are other types of rotary presses such as external gear-driven (external gear type) rotary press in which rotational drive force is transmitted by equipping the turn table with a gear and also internal gear-driven (internal gear type) rotary press.

Next, a description will be given of the punches having a multi-split structure used in the present invention and the portions associated therewith.

The rotary press of the present invention is constructed to have at least the upper punch or preferably both upper and lower punches split into a plurality of punches. Various split forms of the punch tip portions are shown in FIG. 24. For instance, FIG. 24A illustrate punches, each of which consists of two split punches with the tip portions thereof also split into two parts and in which the tip portion of one punch is completely enclosed by the tip portion of the other punch. FIG. 24B illustrate punches, each of which consists of two or more split punches with their tip portions also split into three or more parts and in which the tip portion of one punch completely encloses the tip portions of other punches. FIG. 24C illustrate punches, each of which consists of two or more split punches and in which the tip portions of at least two punches are not completely enclosed by the tip portion of other punch. FIG. 24D illustrate punches, each of which consists of two or more split punches and in which the tip portions of none of the punches are enclosed by the tip portion of other punch. It is to be understood that while some of the punches of FIGS. 24B to 24D consist of the same number of split punches as the number of divisions of the tip portion, others take on the form in which only the tip portion of one split punch is split further. Although the aforementioned forms represent typical split forms of the punch tip portions, split forms are not limited thereby.

While individual split punches that are separate from one another commonly take on the split form in which the upper and lower punches can perform compression in a mutually responsive fashion, the split patterns of the upper and lower punches do not necessarily need to coincide with each other, and the number of divisions and the split shapes of the upper and lower punches may differ from each other. The split patterns of the upper and lower punches are changed for different reasons including changing the split shapes in accordance with the target molded product shape or the arrangement of a plurality of individual ingredients and splitting the lower punch further to reduce the amount of residual molding materials. Among specific examples are the upper and lower punches in which one of the split punches encloses the other split punch or punches as shown in FIG. 26A with the upper punch split into two parts and the lower punch into three parts, those in which while the upper punch is only split into two semicircles, one of the semicircles of the lower punch is further split into two punches as shown in FIG. 26B and those used for example in FIG. 11 in which the upper punch has a double structure with a hollow at the center while the lower punch has a triple structure with no hollow. In any case, the number of divisions and the split shapes are not limited so long as the upper and lower punches can perform compression operation in the compression step using individual split punches making up the upper and lower punches and the combination thereof. Alternatively, it is possible to manipulate the molded product shape by using the lower punch with no split structure and the upper punch with a split structure.

A description will be given of the upper and lower punches both having a split structure but differing in split shape mainly with reference to FIG. 26. FIG. A-1 shows an upper punch, FIG. A-2 a lower punch and FIG. A-3 a sectional view of the punch tips when the upper and lower punches of FIGS. A-1 and A-2 are brought close to each other in the condition adhering to the actual usage (shading representing cross section omitted). The same holds true for FIGS. B-1 to B-3. In this case, the main purpose of having different split shapes for the upper and lower punches lies in reducing the amount of residual molding material on the lower punch rather than localizing the molding material. To reduce the amount of residual molding material on the lower punch, the lower punch is split into more parts than the upper punch, thus reducing the residual molding material on the lower punch not removable with the rubbing-cutting plate. For instance, FIGS. 26A-1 to 26A-3 correspond to FIG.

Figure 3:
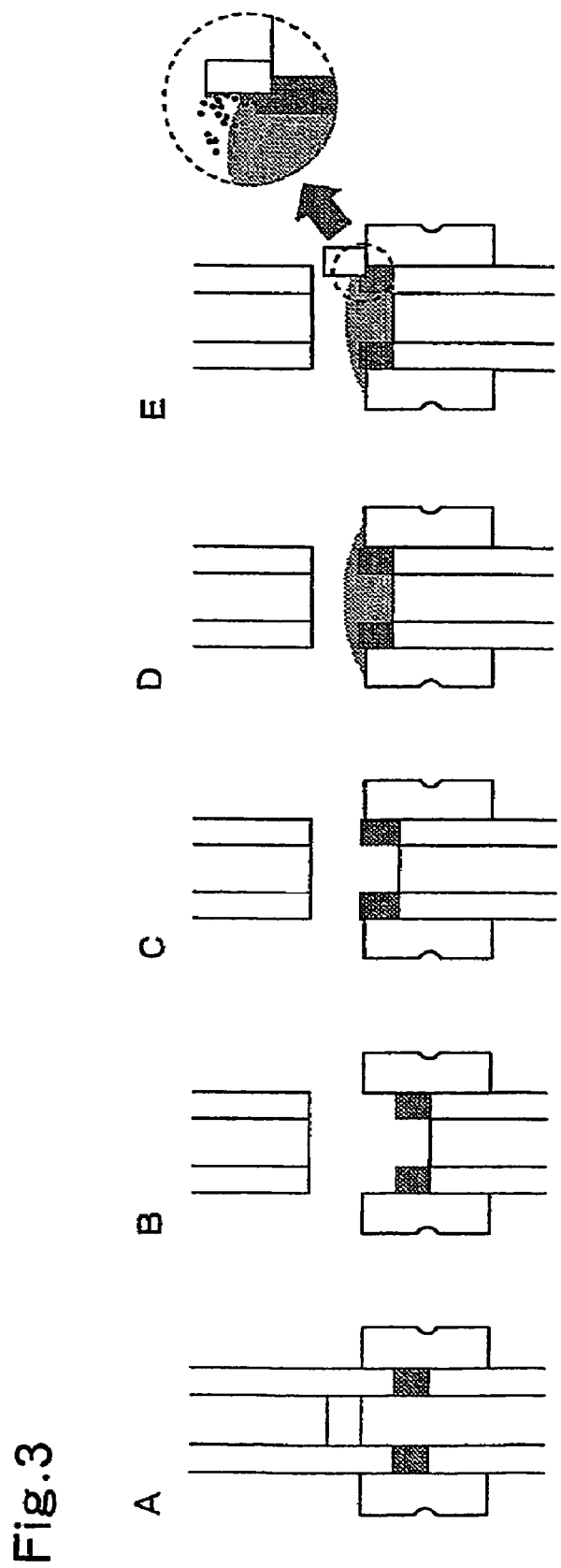
FIG. 3 illustrate explanatory views of punch tip operations showing an example of problem in the rubbing-cutting step in the conventional molded product manufacturing method shown in FIG. 2 in which a plurality of molding materials are localized (shading as cross section omitted)
Figure 4:
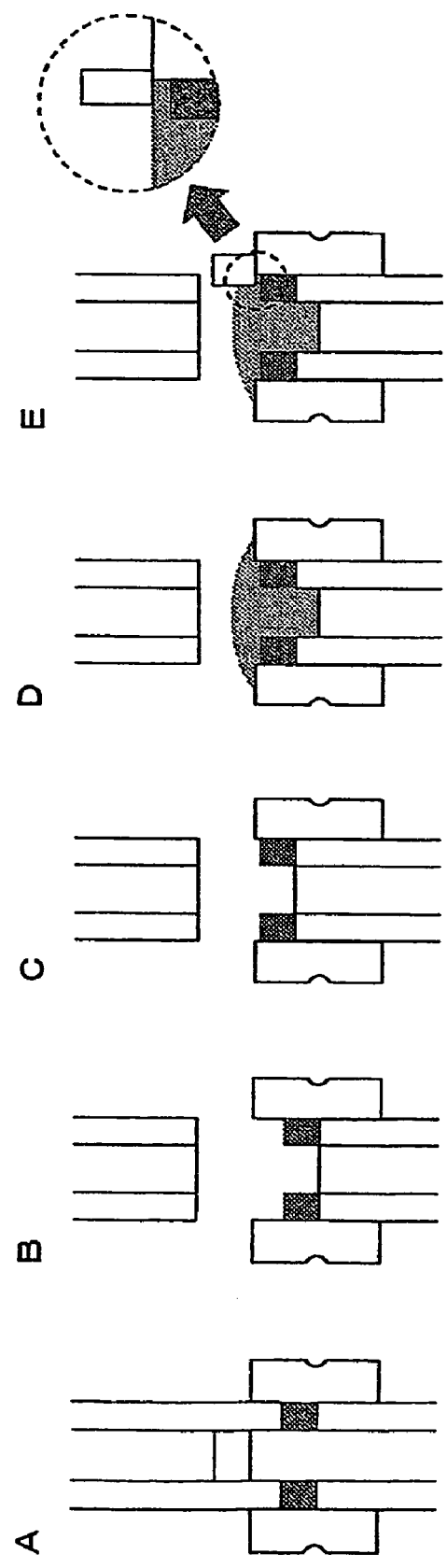
FIG. 4 illustrate explanatory views of punch tip operations showing another example of problem in the rubbing-cutting step in the conventional molded product manufacturing method shown in FIG. 2 in which a plurality of molding materials are localized (shading as cross section omitted)
Figure 22:
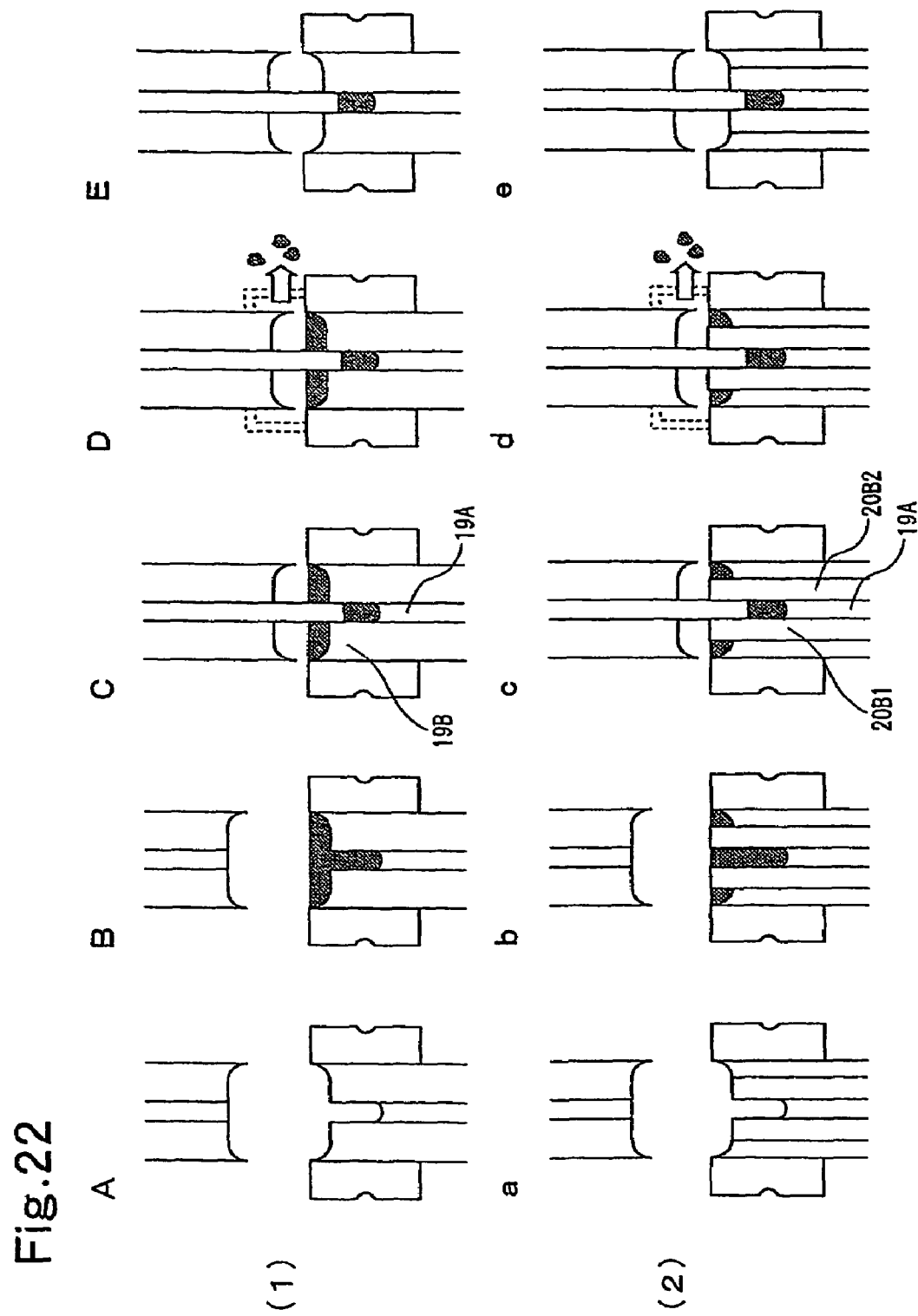
FIG. 22(1) illustrate explanatory views of punch tip operations when normal lower split punches are used, and FIG. 22(2) illustrate explanatory views of punch tip operations when a lower split punch structure is adopted for reducing residual molding material on the lower punches in the molding product manufacturing apparatus according to the present invention (shading as cross section omitted)

22(2). As is apparent from comparison between FIG. 22(1) and FIG. 22(2), a split punch is used for the portion capable of forming the same plane as the turn table, allowing removal of excess molding material from the portions by the rubbing-cutting plate as the split punch is raised to the same plane as the turn table and thereby reducing the absolute amount of residual molding material. Here, the two punch tip portions (20B1, 20B2) for removing excess molding material make up a single split punch. Further, if the punch tips consist entirely of curving surfaces as shown in FIGS. 26B-1 to 26B-3, it is impossible for the lower punch to form the same plane as the turn table. However, removal of excess molding material by the rubbing-cutting plate is possible by raising some of the lower split punches to the proximity of the turn table, thus reducing the absolute amount of residual molding material. That is, the present method for splitting punches does not require the lower punch to take on the split form that allows formation of the same plane as the turn table. It suffices to use the split form that allows reduction of the absolute amount of residual molding material by the rubbing-cutting plate, and the number of divisions is not specifically limited. For example, the lower punch shown in FIGS. 26B-1 to 26B-3 consists of three split punches, with the split form not being evenly split with respect to the longer diameter. The reason is that if the purpose is to remove molding material remaining on one of the split punches, then splitting the other split punch further or evenly splitting the lower punch is meaningless (FIG. 17D, FIG. 21D).

Split punches used in the present invention can be grouped under five types in terms of split form of the upper and lower punches as follows. (1) Both of the upper and lower punches consist of two split punches, with the tip portion of one of the split punches completely enclosing the tip portion of the other punch. (both upper and lower punches with a double structure) (2) Either of the upper and lower punches consists of three or more split punches, with the tip portion of one of the split punches completely enclosing the tip portions of the other punches. (3) At least two of the tip portions of either of the upper and lower punches are not completely enclosed by the other split punches. (4) The tip portions of none of the punches of both the upper and lower punches are enclosed by the tip portions of the other punches. (5) The lower punch is a normal punch with no split structure.

A description has been given so far focusing on punch split forms. Diversity of molded products will be described below that can be manufactured by the rotary press of the present invention and the aforementioned punches. As is evident from the punch split forms and punch structures, punches consisting of a single split form are capable of manufacturing a variety of molded products of different forms. The reason is that while shape change beyond the die inner diameter is impossible as with common presses, variations can be added to molded products, as far as the vertical direction with respect to the punch surface is concerned, by the amount and type of molding material charged, or repetition thereof or the method for setting a space into which molding material is to be charged. Further, the respective split punches of the punches in the rotary press of the present invention having a split punch structure are slidable and at least two thereof are manipulatable for compression operation, considerably enhancing variations as compared with conventional non-split punches.

Figure 25:
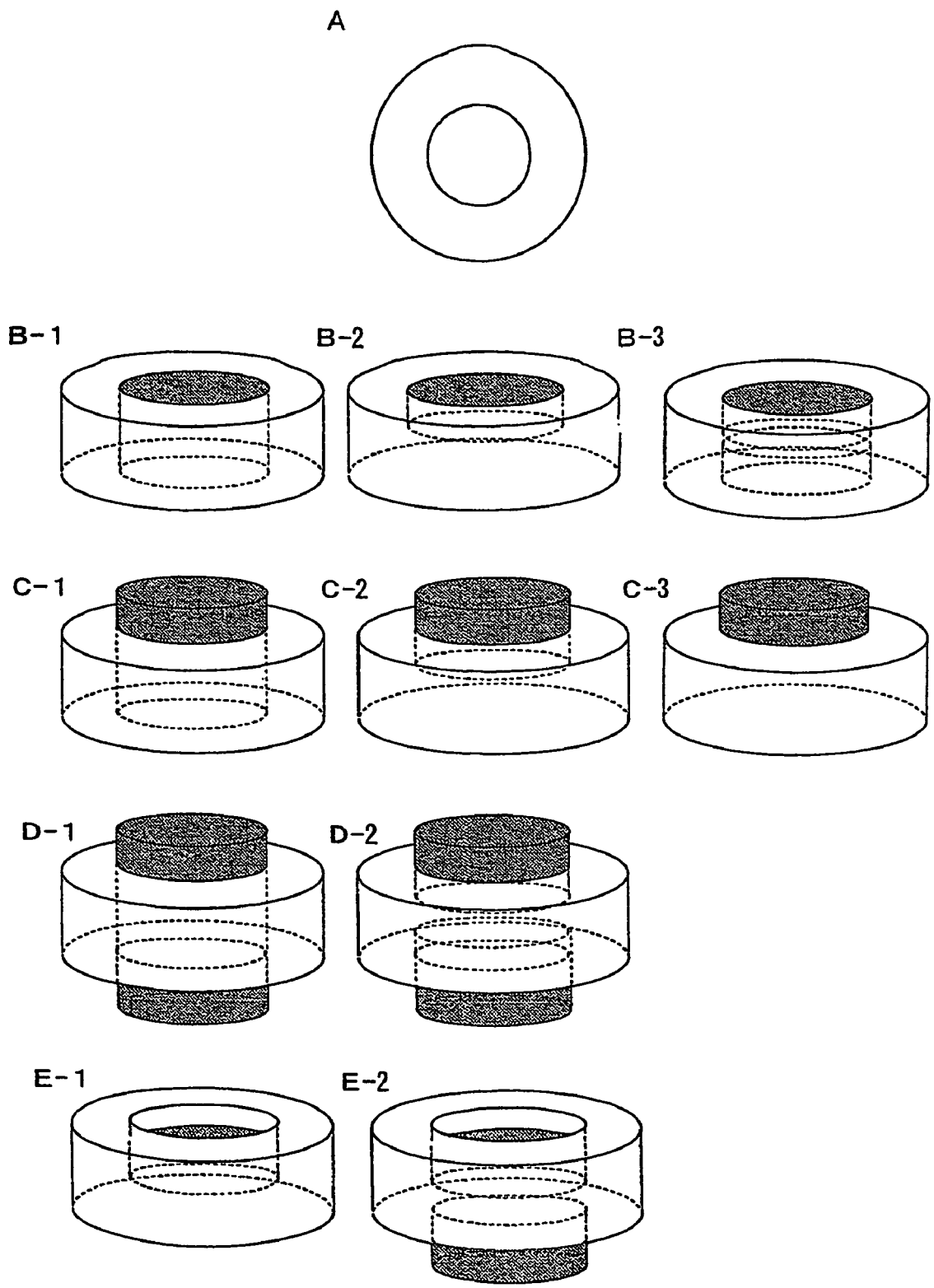

One of such examples is shown in FIG. 25. FIG. 25A illustrates a punch tip surface in which the tip portion of one of the punches completely encloses the tip portion of the other punch (same as FIG. 24A-1). Next, FIGS. 25B-1 to 25E-2 show modes of the molded products that can be manufactured with the punch having the split form. Those shown in FIGS. 25B-1 to 25B-3 are molded products consisting of a plurality of molded parts with no concave or convex structure on either of the surfaces of the cylindrical structure. In detail, these figures show: a molded product in which the molding material located at the center stretches to both surfaces of the cylinder (25B-1, same as FIG. 1); another molded product in which the molding material stretches to only one of the cylinder surfaces (25B-2) and still another molded product in which the molding material stretches to both surfaces of the cylinder but is separated within the molded product (FIG. 25B-3). FIGS. 25C-1 to 25C-3 show molded products consisting of a plurality of molded parts with a convex structure on one of the surfaces of the cylindrical structure: a molded product in which a molding material located at the center stretches to the opposite surface of the cylinder (25C-1); another molded product in which the molding material stops halfway within the cylindrical molded product (25C-2) and still another molded product in which the molding material exists only on top of the cylindrical molded product (25C-3). FIGS. 25D-1 and 25D-2 show molded products consisting of a plurality of molded parts with a convex structure on both surfaces of the cylindrical structure: a molded product in which a molding material located at the center stretches to the opposite surface of the cylinder (25D-1) and another molded product in which the molding material exists on both surfaces but is separated within the cylindrical molded product (25D-2). FIGS. 25E-1 and 25E-2 show molded products consisting of a plurality of molded parts with a concave structure on either of the surfaces of the cylindrical structure: a molded product in which a molding material located at the center stops halfway within the molded product (25E-1) and another molded product in which the other surface has a convex structure consisting of the same molding material. In addition to the above, a variety of other molded products can be manufactured such as those having a concave structure on both surfaces and that including three or more molding materials. Thus, punches made up of a single split form are capable of manufacturing a variety of molded products of different forms, and this holds true for all other punches shown in FIG. 24.

It is to be understood that there are also a considerably large number of variations in moldable molded products in particular in the case of the lower punch being a normal punch with no split structure. One example is shown in FIG. 42. These molded products are also shaped in such a manner as to combine large and small cylindrical structures and consist of a plurality of molded parts with a convex or concave structure on either of the surfaces as with the aforementioned molded products. In detail, FIG. 42A show a molded product that has a combined structure of a cylindrical molded part with a convex structure on one of the surfaces and another cylindrical molded part with no concave or convex structure. FIG. 42B show a molded product that, although having a structure similar to that of FIG. 42A, has a cylindrical molded part with a convex structure further having a convex structure on the junction surface within the molded product. FIG. 42C show a molded product that consists of a cylindrical molded part with a concave structure on one of the surfaces of the cylindrical structure and another cylindrical molded part with no concave or convex structure. FIG. 42D show a cylindrical molded product that has a three-layer structure in which a molded part is added on top of the molded product of FIG. 42A and has no concave or convex structure as a whole.

In the present invention, it is absolutely essential that all individual split punches making up a punch be slidable and that at least two of the split punches making up a punch be manipulatable for compression operation. As an example, a punch is shown in FIG. 27 that corresponds to the series of punches in FIG. 24A and consists of two split punches in which the tip portion of one of the punches completely encloses the tip portion of the other punch. It is to be noted that, from here onwards, the split punches are called split A and B punches for convenience. The punch comprises a split A punch 3A, a split B punch 3B, a split A punch compression head (substantially the same location as the bottom portion of the split A punch) 25, a split B punch compression head 70 and a split B punch vertical sliding motion adjustment roller 23. The compression step is carried out by pressing the split A punch compression head 25 with compression rollers (29, 31, 35 in FIG. 32) and further by pressing the split B punch compression head 70 with compression rollers (33, 37 in FIG. 32). Manipulation of the split A and B punches for compression operation is thus achieved. It is to be noted that the portions of the split A and B punches in contact with the compression rollers (the split B punch compression head 70 and the split A punch compression head 25) are separated vertically, thus preventing the compression rollers for the split A and B punches from interfering with one another.

While the vertical sliding motion of the split A punch is controlled by a normal method mainly using a split A punch track and the bottom portion thereof (split A punch compression head) 25, the vertical sliding motion adjustment roller 23 is provided that comes in direct contact with a split B punch track to allow vertical sliding motion of the split B punch. Preferably, a plurality of bearings 71 are provided within the rollers to allow rotation of the rollers and smooth vertical sliding motion of the split B punch. Here, the vertical sliding motion adjustment roller 23 is arranged outside the split B punch compression head 70, with the vertical sliding motion adjustment roller 23 separated from the split B punch compression head 70. This allows the compression rollers to apply pressure only to the split B punch compression head 70 while not applying direct pressure to the vertical sliding motion adjustment roller 23, thus preventing breakage of the bearings 71 within the vertical sliding motion adjustment roller 23. In compression operation, it is possible to apply pressure to the outer punch more from the side of the center punch, thus allowing efficient transfer of pressure from the compression rollers to the molding materials.

While FIG. 27 assume the lower punch, the basic structure is the same for the upper punch. Among differences between the upper and lower punches are a longer length of the tip portion of the lower punch inserted into the die and different portions prescribing the punch motion (e.g., spaces within the punches) due to different motions of the upper and lower punches.

There is a possibility that the aforementioned punch may have a form in which the motions of the split A and B punches are respectively controlled in reverse. That is, the punch controls the motion of the split A punch with the vertical sliding motion adjustment roller and the track and the motion of the split B punch with the punch bottom portion (same location as the compression head 72 of the split B punch) and the track. The punch is characterized in that an opening (a split B punch opening 73) is provided on the main body of the split B punch and that a split A punch compression head 74 integral with the split A punch and a split A punch vertical sliding motion adjustment roller 75 project from the opening. A description of the punch will be omitted since the same holds true for the punch as for the punch of FIG. 27, except that the motions of the split A and B punches are respectively controlled in reverse.

Figure 29:
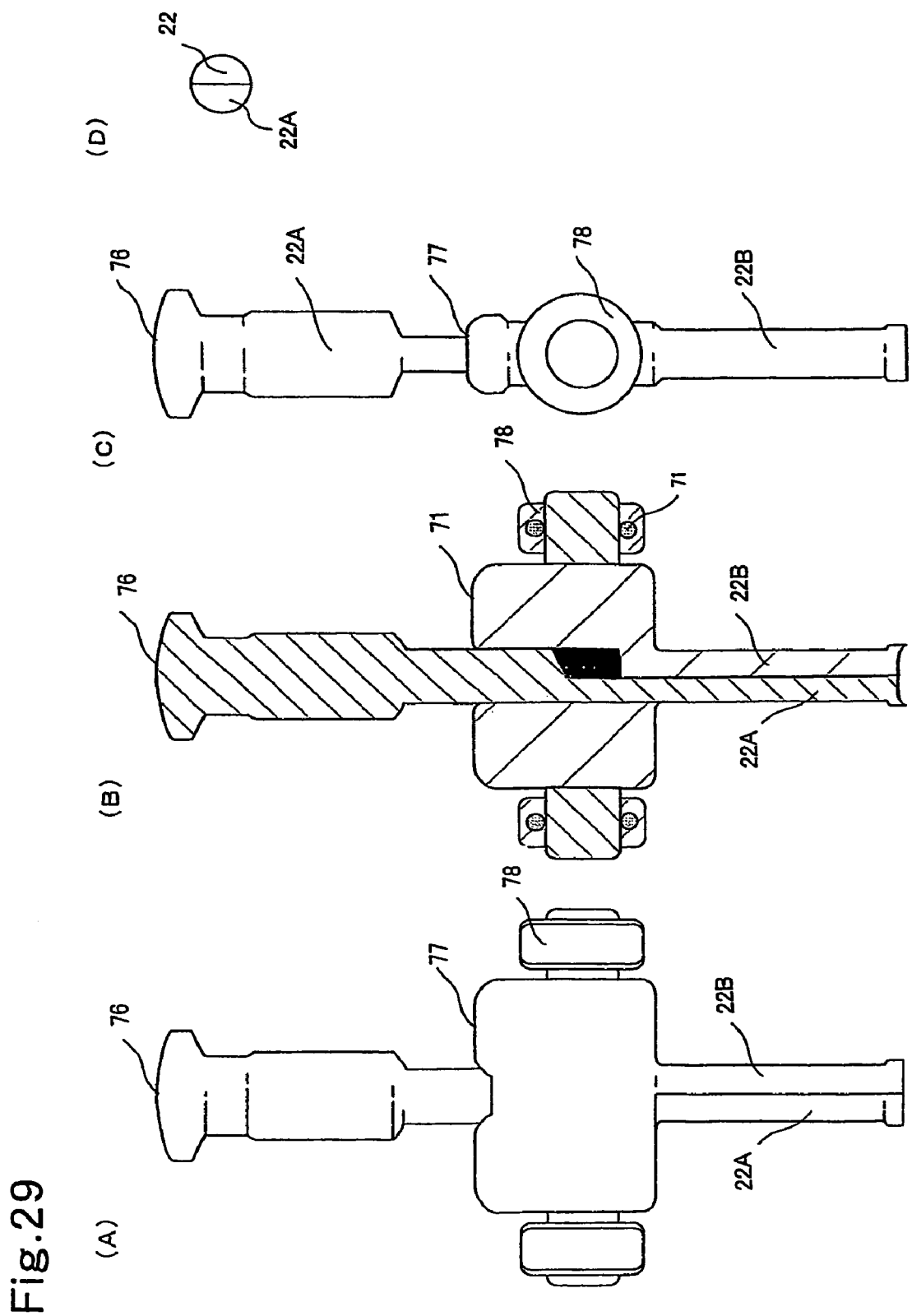
FIGS. 29(A), 29(B), 29(C), and 29(D) illustrate an example of punch having the split punch structure used in the present invention, with FIG. 29(A) being a schematic diagram, FIG. 29(B) being a sectional view, FIG. 29(C) being a side view, and FIG. 29(D) being a top view of the punch tip portion.

FIG. 29 show, as an example of other form of split punches, an embodiment of the punch whose cross section is split into two semicircular punches in which neither of the split punches are enclosed by the other split punch, which corresponds to the punch of FIG. 24D-2. The punch conforms to the basic structure of the punch shown in FIG. 27 except that the tip portion of the punch is not enclosed by other split punches. The punch also comprises a split A punch 22A, a split B punch 22B, a split A punch compression head 76, a split B punch compression head 77, a split B punch vertical sliding motion adjustment roller 78 and others and adopts a similar system for the mechanism controlling the vertical sliding motions and manipulation of the split A and B punches for compression operation.

Figure 15:
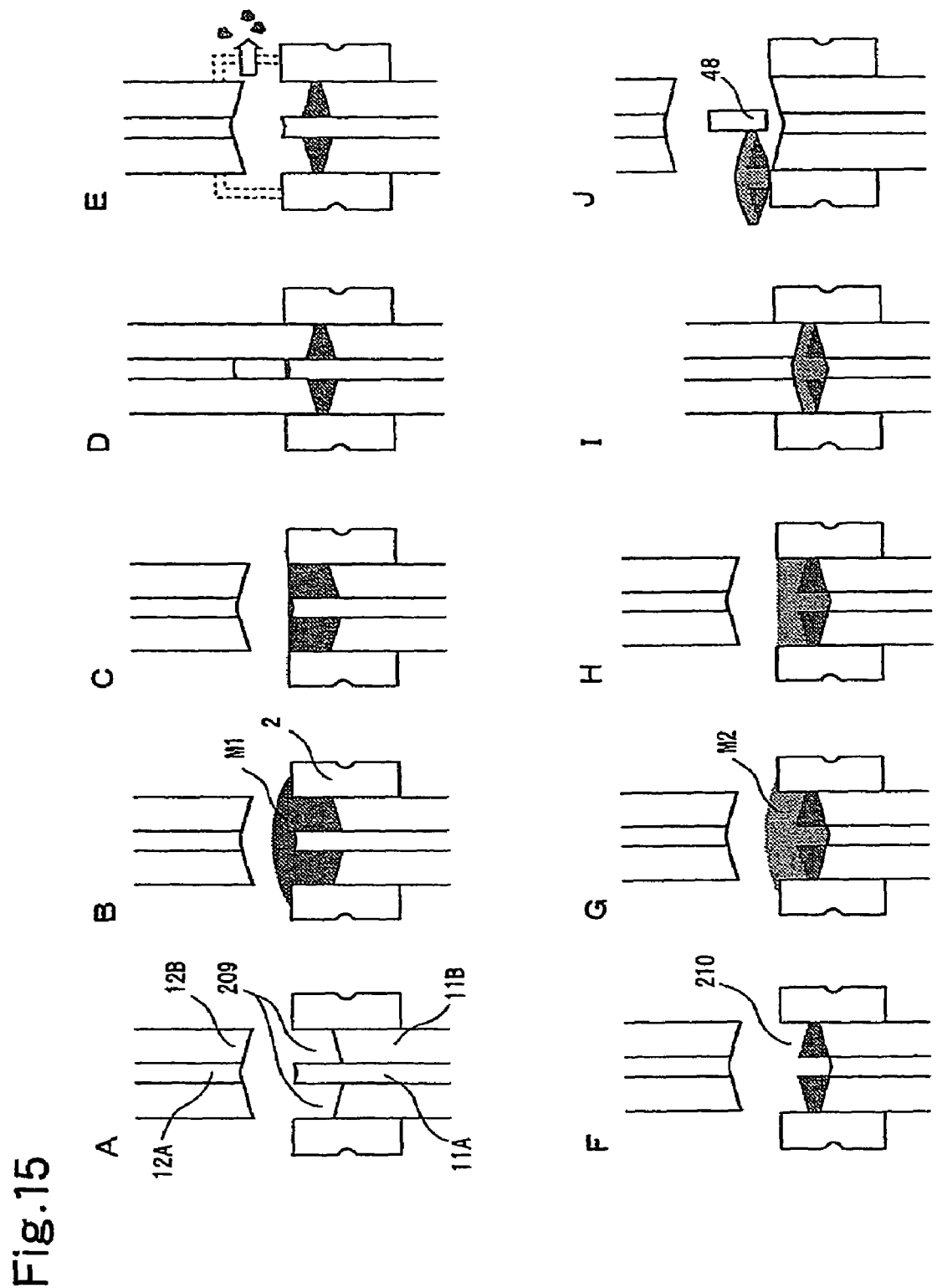
FIG. 15 illustrate explanatory views of punch tip operations showing a sixth example of manufacturing steps using the manufacturing apparatus of the present invention for a molded product (corresponding to the molded product in FIG. 14) consisting of a plurality of molded parts part of whose at least two molded parts faces outside of the molded product (shading as cross section omitted)

In addition, as for the punch whose tip portion is shaped as shown in FIG. 24D-1 for pressing the molded product shapes as shown in FIG. 14, the tip portions of both the upper and lower split punches 12B and 11B as shown in FIG. 15 are split into four parts. However, since these four-part tip portions do not need to perform sliding motion and compression individually, each has an integral structure at the shell portion thereof as the upper split punch 12B or the lower split punch 11B, thus allowing sliding motion and compression integrally. Such a structure, known as so-called "multiple punch" (double punch, sextuple punch) and employed in wide-ranging fields including drugs, is basically identical in terms of structure to those punches in which only the tip portion is split into a plurality of parts.

Figure 30:
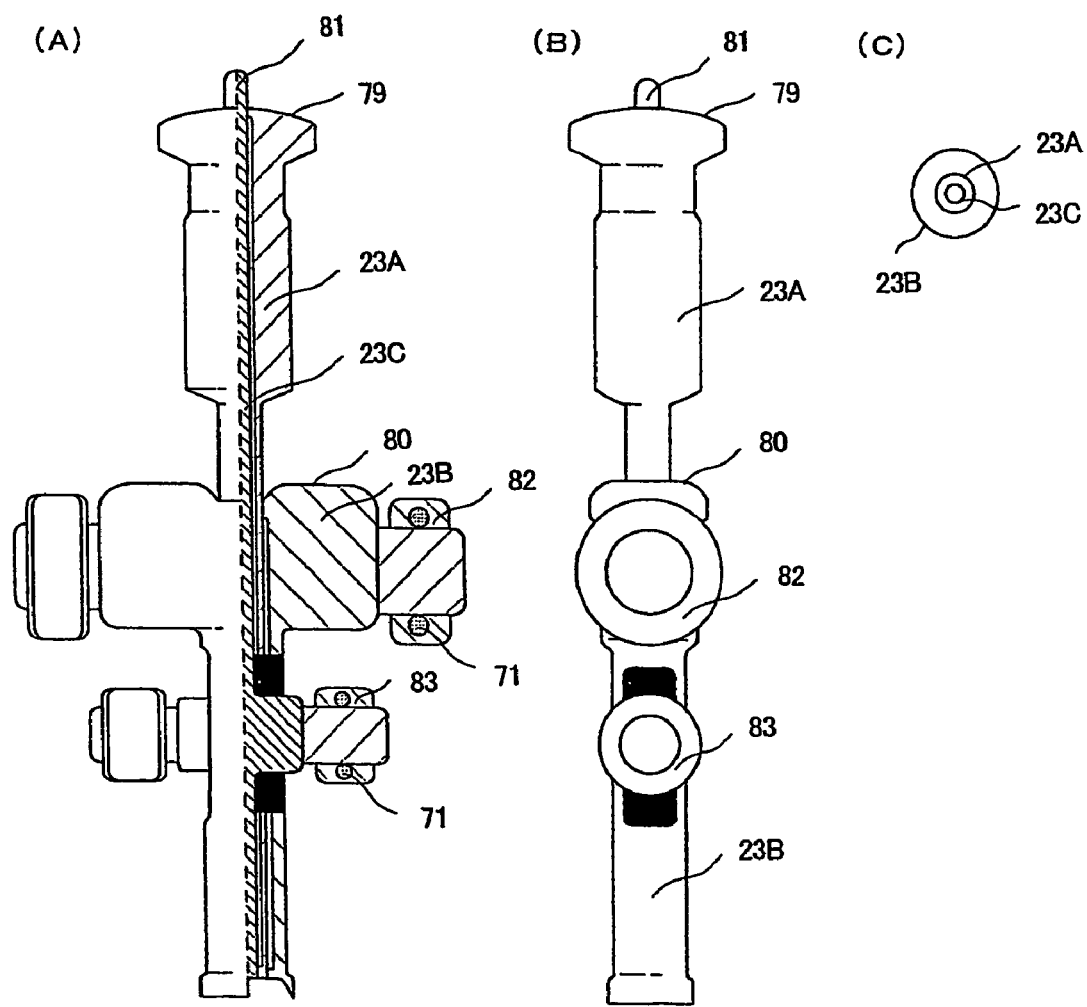
FIGS. 30(A), 30(B) and 30(C) illustrate an example of punch having the split punch structure used in the present invention, with FIG. 30(A) being a vertical sectional view (right half) and schematic diagram (left half), FIG. 30(B) being a side view, and FIG. 30(C) being a top view of the punch tip portion.

Next, FIG. 30 show, as still another form of split punches, an embodiment of the punch that has a triple split punch structure in which the punch is split into three parts, which corresponds to the punch of FIG. 24B-1. While the punch conforms to those punches shown in FIGS. 27 to 29 in terms of basic structure with the majority of the structure being similar, manipulation for compression operation and vertical sliding motion of a split C punch located at the centermost portion are controlled by other portion. The punch comprises split A, B and C punches 23A, 23B and 23C, split A, B and C punch compression heads 79, 80 and 81 and split B and C punch vertical sliding motion adjustment rollers 82 and 83. The compression step is carried out by pressing the split A, B and C punch compression heads 79, 80 and 81 with compression rollers of the press. It is to be noted that since the split A and C punch compression heads 79 and 81 are in proximity of each other, it is necessary to set the positions of the compression rollers of the press so as to prevent contact points (positions) between the compression rollers and the split A and C punches from interfering with each other in order to allow compression operation in the independent compression step. For compression by the split A punch, for example, the compression roller positions are adjusted such that the edge portion of the split A punch compression head comes in contact with the compression rollers to achieve compression. For compression by the split C punch, on the other hand, it is possible to prevent interference between the split A and C punches in the compression step by reducing the compression roller width. Alternatively, interference by the compression rollers can be avoided by moving the split A and C punches toward either side rather than locating them at the center as in the split C punch compression head position in FIG. 30 and thereby securing a distance between the contact point between the split A punch and the compression roller and that between the split C punch and the compression roller (not shown). It may be also possible to prevent interference between individual split punches in the compression step by adjusting the positions of both the rollers and the punch compression heads. Manipulation of the split A, B and C punches for compression operation is achieved by such a structure. While the vertical sliding motion of the split A punch is controlled by a normal method mainly using the split A punch track and the split A punch bottom portion 79 (same location as the split A punch compression head 79), the vertical sliding motion adjustment roller 82 is provided that comes in direct contact with the split B punch track to allow vertical sliding motion of the split B punch. The vertical sliding motion mechanism of the split C punch is similar to that of the split B punch.

Next, a description will be given in detail of an embodiment of the apparatus corresponding to the second embodiment of the manufacturing method of the present invention (FIG. 7) together with operations of the portions thereof mainly with reference to FIGS. 31 and 32 and, as necessary, FIG. 7 as the apparatus of the present invention that is the rotary press for manufacturing a molded product consisting of a plurality of molded parts part of whose at least two molded parts faces outside of the molded product.

Figure 31:
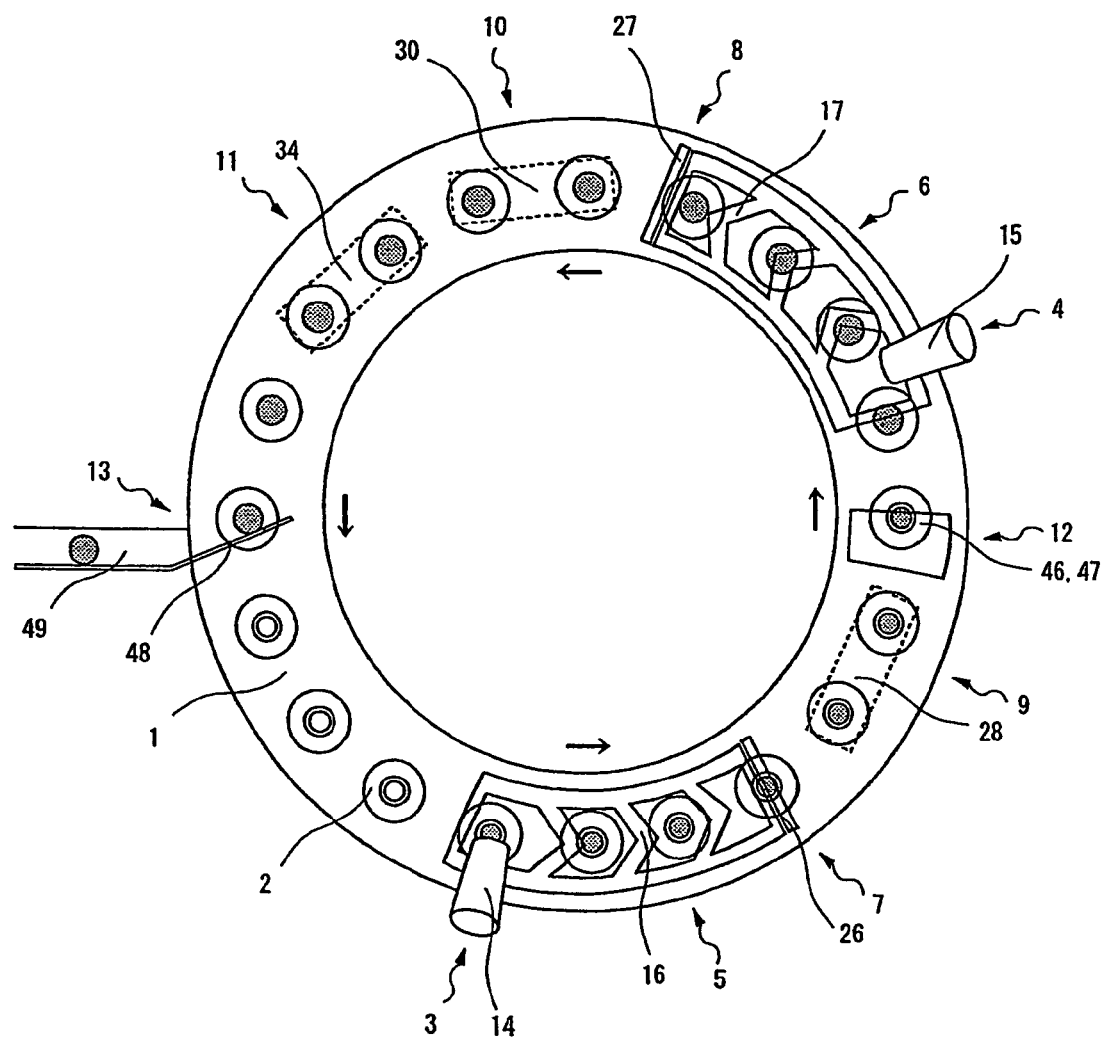
FIG. 31 illustrates a schematic plan view showing a turn table in an embodiment of the rotary press of the present invention.

When looked from above the turn table as shown in FIG. 31, molding material supply portions 3 and 4, molding material charging units 5 and 6, molding material rubbing-cutting portions 7 and 8, compression molding units 9, 10 and 11, a residual molding material removal unit 12 and a product unloading portion 13 are provided along the direction of rotation of the turn table 1. Individual mechanisms will be described separately below.

The molding material supply portions 3 and 4 can be separated, according to the sequence of supply of molding materials, into the portion 3 for supplying the first molding material M1 and the portion 4 for supplying the second molding material M2, with the molding materials supplied by natural fall or by a metered supply machine (not shown) from hoppers 14 and 15 filled with the respective molding materials.

The respective molding materials supplied by the molding material supply portions are then sent next to the molding material charging units 5 and 6. The molding material charging units are designed to charge the first and second molding materials M1 and M2, used as molding materials for the first and second molded parts, respectively into the first and second molded part spaces 202 and 203 (refer to FIG. 7). These portions are intended to hold fixed amounts of the respective molding materials supplied from the molding material supply portions using open feed shoes 16 and 17, provided on the turn table 1 and capable of both storing and supplying the molding materials, and introduce the molding materials held by the feed shoes 16 and 17 into the first and second molded part spaces 202 and 203 (refer to FIG. 7) by lowering the lower split A punch 3A using lowerers 19 and 20 provided on a frame 18, and in certain circumstances, by lowering the lower split B punch 3B using a lowerer 22 provided on a lower split B punch track 21. Although the open feed shoes 16 and 17 are shown in FIG. 31, agitation feed shoes may be employed that forcefully charge the molding materials into the die 2 using agitation vanes (installed at the same positions as the open feed shoes; not shown).

In detail, the first molding material is charged by lowering the lower split A punch 3A within the first open feed shoe 16 on the turn table 1 (FIGS. 7A and 7B). The lower split B punch 3B is maintained at a constant height with respect to the turn table by moving the lower split B punch 3B on the lower split B punch track 21 installed so as to bring the extreme tip portion of the lower split B punch to the same height as the surface of the turn table 1 using the vertical sliding motion adjustment roller 23 of the lower outer punch. On the other hand, the lower split A punch 3A is moved on a lower split A punch track 24 provided on the frame 18 using the lower split A punch bottom portion 25 (same location as the lower split A punch compression head) and further adjusted to a predetermined position using the first lower split A punch lowerer 19 provided on the lower split A punch track 24. The first molding material M1 for the first molded part is thus introduced into the first molded part space 202 enclosed by the lower split B punch 3B and above the lower split A punch 3A.

Next, the second molding material M2 is charged by lowering both the lower split A punch 3A holding the temporary molded first molded part and the lower split B punch 3B or only the lower split B punch 3B within the second open feed shoe 17 on the turn table 1 (FIGS. 7F and G). Here, the lower split B punch 3B is lowered by using the lower split B punch lowerer 22 provided on the lower split B punch track 21. On the other hand, the lower split A punch 3A is moved on the lower split A punch track 24 provided on the frame 18 using the lower split A punch bottom portion 25 (same location as the compression head of the lower split A punch) and lowered using the second lower split A punch lowerer 20 provided on the lower split A punch track 24. The second molding material M2 is thus introduced by lowering both the lower split A punch 3A holding the temporary molded first molded part and the lower split B punch 3B or only the lower split B punch 3B into the second molded part space 203 created above and around the first molding material M1 within the die 2.

The die and the punches charged with the molding materials by the molding material charging units next enter the molding material rubbing-cutting portions 7 and 8. The molding material rubbing-cutting portions adjust the first and second molding materials M1 and M2 supplied and charged as described above to fixed amounts. That is, the respective excess molding materials overflowing from the given spaces are rubbed and cut for removal by rubbing-cutting plates 26 and 27 as the lower split A punch 3A or both the lower split A and B punches 3A and 3B are raised to predetermined positions.

In detail, the first molding material M1 is rubbed and cut by the rubbing-cutting plate 26 attached to the first open feed shoe 16 on the turn table 1. With the extreme tip portion of the lower split B punch 3B leveled with the turn table, the lower split A punch 3a is raised to a predetermined position using the lower split A punch track 24 and the lower split A punch lowerer 19, thus causing the excess amount of the first molding material M1 charged into the first molded part space 202 to overflow from the space. Further, the overflowing first molding material M1 is rubbed and cut by the rubbing-cutting plate 26 attached to the open feed shoe 16, thus allowing a fixed amount of the charged first molding material M1 (FIG. 7C).

Next, the second molding material M2 is rubbed and cut by the rubbing-cutting plate 27 attached to the second open feed shoe 17 on the turn table 1 as with the first molding material M1. Here, the temporary molded product of the first molding material M1 held by the lower split A and B punches 3A and 3B is pushed up into the second molding material M2 supplied into the die 2 as the lower split A punch 3A or both the lower split A and B punches 3A and 3B are raised to predetermined positions using the lower split A punch track 24 and the lower split A punch lowerer 20 or further the lower split B punch track 21 and the lower split B punch lowerer 22, thus causing the excess amount of the second molding material M2 to overflow. Further, the overflowing second molding material M2 is rubbed and cut by the rubbing-cutting plate 27 attached to the second open feed shoe 17, thus allowing a fixed amount of the charged second molding material M2 (FIG. 7H).

The die and the punches charged with fixed amounts of the molding materials next enter the compression molding units 9, 10 and 11. The compression molding units are intended to perform precompression or main compression on either of the first and second molding materials M1 and M2 or both thereof (including the temporary molded product) using compression rollers 28 to 37 held by the frame 18. While precompression may be carried out at the same high compression pressures as for main compression, it is normally preferred that temporary compression at low compression pressures be performed.

In detail, precompression of the first molding material M1 is carried out by pressing using the upper split A punch 4A and the lower split A punch 3A. The upper split A punch 4A is lowered by an upper split A punch lowering cam 39 furnished on an upper split A punch track 38, and preferably the upper split B punch 4B is also concurrently lowered to a predetermined position by an upper split B punch lowering cam 42 furnished on an upper split B punch track 41, thus inserting the tip of the upper split A punch 4A into the space above the lower split A punch 3A and enclosed by the lower split B punch 3B within the die 2. The first molding material M1 charged into the given space is thus confined from above and below and pressed so as to be sandwiched between the upper and lower compression rollers 28 and 29, thus molding a temporary molded product (FIG. 7D).

Precompression (temporary compression) of the temporary molded product from the first molding material M1 and the second molding material M2 is carried out by pressing using the upper split A and B punches 4A and 4B (upper punches) and the lower split A and B punches 3A and 3B (lower punches). To insert the upper split A and B punches 4A and 4B into the die 2, the upper split A and B punches 4A and 4B are lowered to predetermined positions using an upper split A punch lowering cam 40 furnished on the upper split A punch track 38 and an upper split B punch lowering cam 43 furnished on the upper split B punch track 41, inserting the punch tips into the die 2. The temporary molded product from the first molding material M1 and the second molding material M2 are confined so as to be sandwiched from above and below and press-molded in a preliminary fashion by upper split A and B punch precompression rollers 30 and 32 and lower split A and B punch precompression rollers 31 and 33.

In main compression following precompression (temporary compression), the molded product press-molded in a preliminary fashion is press-molded as is in a full scale manner by upper split A and B punch main compression rollers 34 and 36 and lower split A and B punch main compression rollers 35 and 37 (FIG. 7I). It is to be noted that although not preferred, it is possible to omit the precompression of the temporary molded product from the first molding material M1 and the second molding material M2 and perform only the main compression.

Next, the residual molding material removal unit 12 is provided at the precompression location of the first molding material M1 or a location immediately thereafter. As shown in FIG. 7, in the precompression step or immediately thereafter, the lower split B punch 3B is held such that the extreme tip portion thereof is maintained at the same height as the surface of the turn table 1, thus removing the first molding material M1 remaining on the upper end surface of the lower split B punch 3B by compressed air injection and suction, etc.

Figure 7:
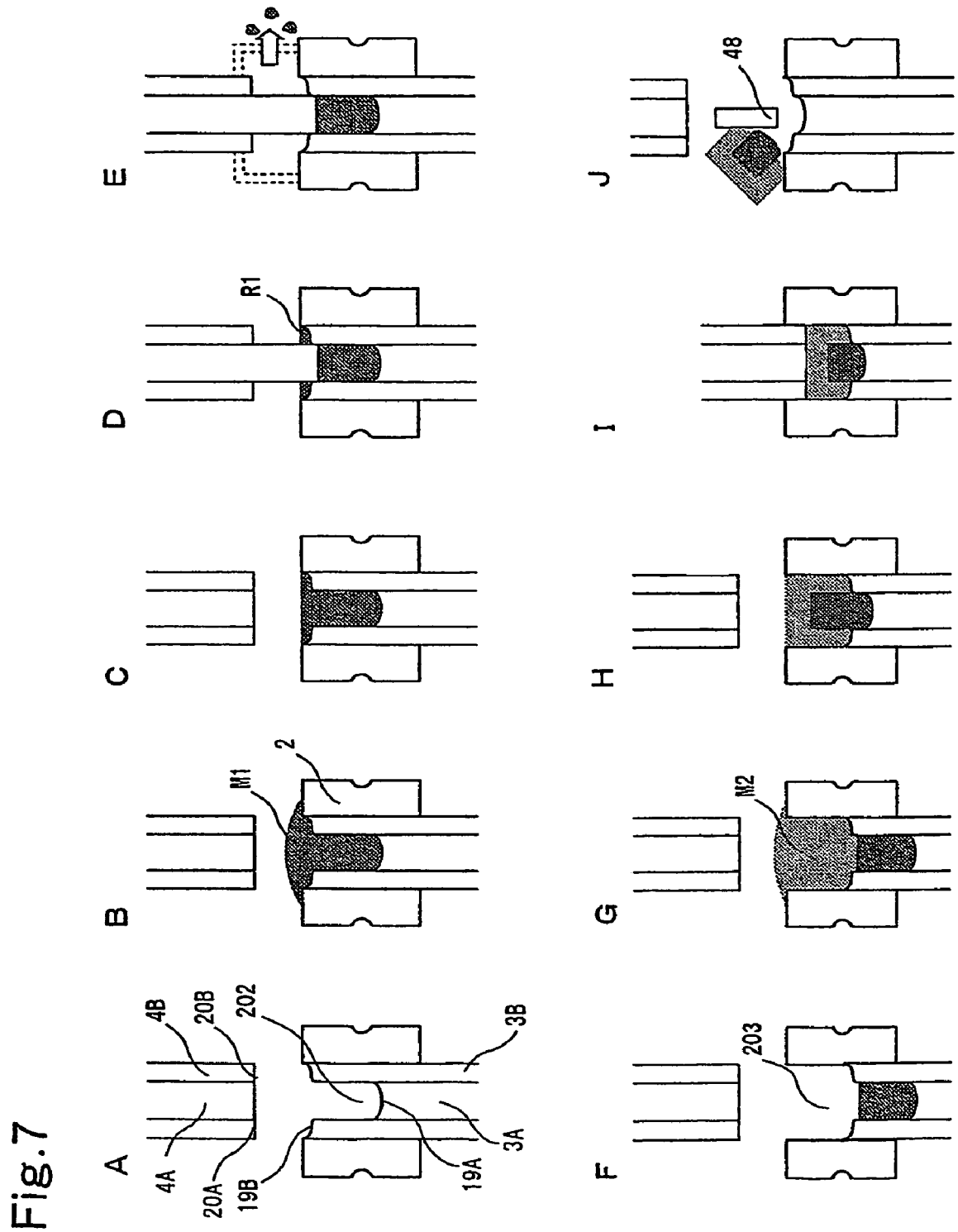
FIG. 7 illustrate explanatory views of punch tip operations showing a second example of manufacturing steps using the manufacturing apparatus of the present invention for a molded product (corresponding to the molded product in FIG. 6) consisting of a plurality of molded parts part of whose at least two molded parts faces outside of the molded product (shading as cross section omitted)

In detail, an upper end surface 19B of the lower split B punch 3B shown in FIG. 7 corresponds to a curving surface 84 of the finished product shown in FIG. 6, and a residual molding material R1 remains at the location. The residual molding material R1 is impossible to remove by rubbing and cutting using the rubbing-cutting plates 26 and 27 of the open feed shoes or agitation feed shoes provided on the turn table 1, and there is a concern of contamination of the first and second molding materials M1 and M2 if the residual molding material is in a state unremoved. In the present embodiment, for this reason, the residual molding material R1 is removed by the residual molding material removal unit 12 furnished on the turn table 1 following the precompression step (FIG. 7E). A residual molding material removal device constituting the residual molding material removal unit comprises, for example as shown in FIG. 33, compressed air injection nozzles 44 for injecting compressed air onto the die surface from all directions and suction boxes 46 and 47 provided with suction hole 45 for aspirating the residual molding material, with the compressed air injection nozzles 44 and the suction boxes 46 and 47 arranged on and parallel with the surface of the turn table 1 so as to sandwich the die and the punches. The compressed air injection nozzles 44 inject compressed air onto the punches and the die from all directions and further the residual molding material R1 is aspirated by the suction hole 45 near the die surface, keeping the residual molding material R1 from flying outside for reliable removal of the residual molding material R1.

The final molded product is sent to the product unloading portion 13 for ejection outside the molding apparatus. The product unloading portion is designed to unload the product using a scraper 48 that guides to a chute 49 by pushing up the product as the lower split A and B punches 3A and 3B rise.

In detail, the upper split A and B punches 3A and 3B are raised along the rising sloped surface by upper split A and B punch raising cams 50 and 51, thus pulling the punch tips out of the die 2. Further, using lower split A and B punch push-up rails 52 and 53, the lower split A and B punches 3A and 3B are pushed up, thus completely pushing a molded product 54 out of the die 2. The molded product 54 that has been pushed out is scraped using the scraper 48 for unloading outside the turn table 1 and then guided into the chute 49 for unloading of the product.

Figure 32:
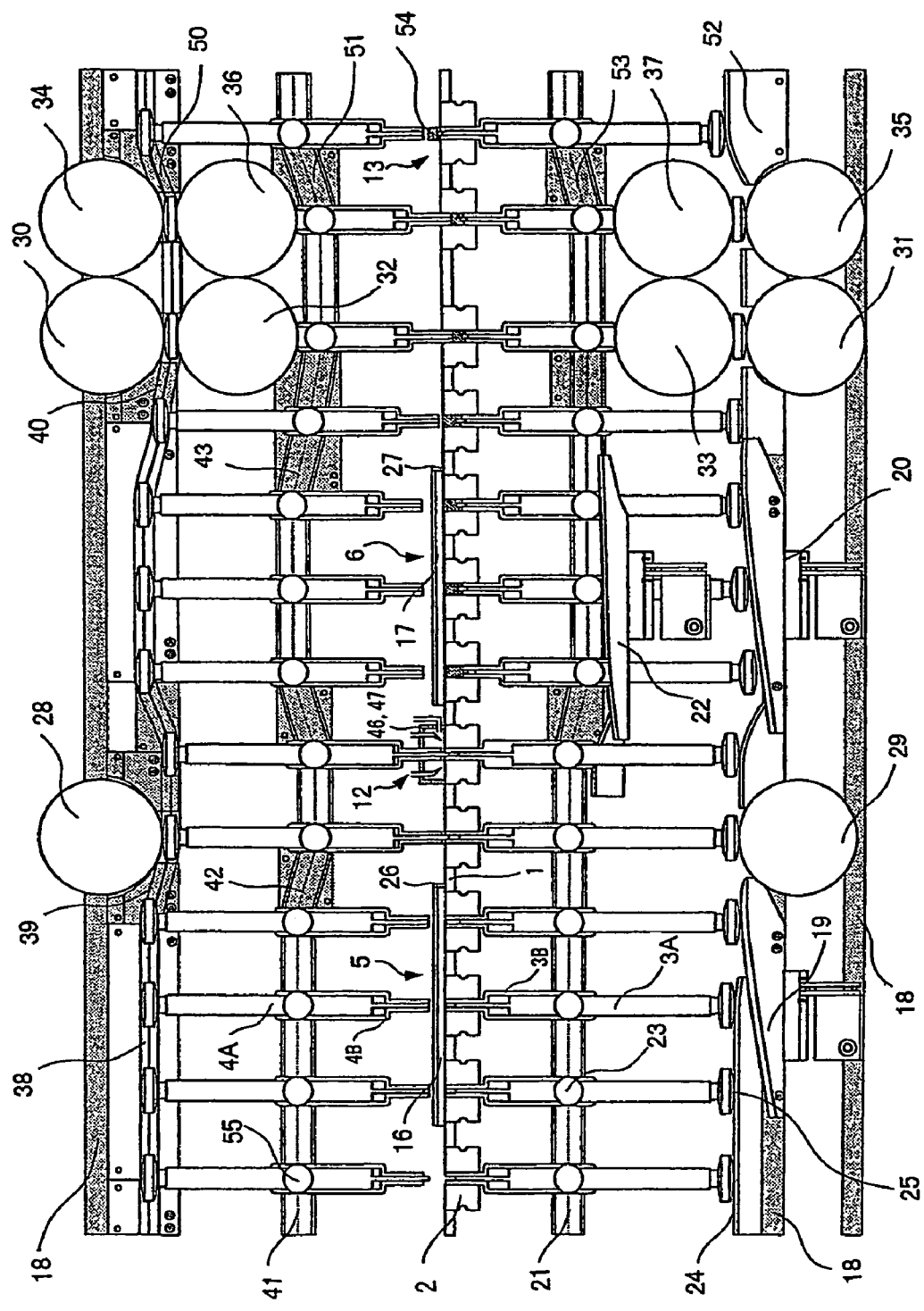
FIG. 32 illustrates a schematic diagram including some sectional portion showing the operation mechanism of the upper and lower punches by developing the turn table in an embodiment of the rotary press of the present invention.

In the apparatus of the present invention shown in FIG. 32, means for moving the split A and B punches refer to the tracks (the lower split B punch track 21, the lower split A punch track 24, the upper split B punch track 41, the upper split A punch track 38), the lowerers (the first lower split A punch lowerer 19, the second lower split A punch lowerer 20, the lower split B punch lowerer 22), the raising cams (the upper split A and B punch raising cams 50 and 51), the lowering cams (the upper split A punch lowering cams 39 and 40, the upper split B punch lowering cams 42 and 43), the push-up rails (the lower split A and B punch push-up rails 52 and 53), the vertical sliding motion adjustment rollers (the lower split B punch vertical sliding motion adjustment roller 23, the upper split B punch vertical sliding motion adjustment roller 55), the lower split A punch bottom portions 25 (same locations as the lower split A punch compression head 25; including those for the upper and lower split punches) and the bearings 71. On the other hand, means for allowing manipulation of the split A and B punches for compression operation refer to the compression rollers (the upper and lower precompression rollers 28 and 29, the upper split A and B punch precompression rollers 30 and 32, the lower split A and B punch precompression rollers 31 and 33, the upper split A and B punch main compression rollers 34 and 36, the lower split A and B punch main compression rollers 35 and 37), the split B punch compression head 70 shown in FIG. 27 and the split A punch compression heads 25 (including those for the upper and lower punches). It is to be noted that these include not only elements of the apparatus main body but also those of the punches. It is also to be noted that the number of punches capable of sliding motion or compression can be increased by increasing the compression rollers, the tracks and so on.

Figure 28:
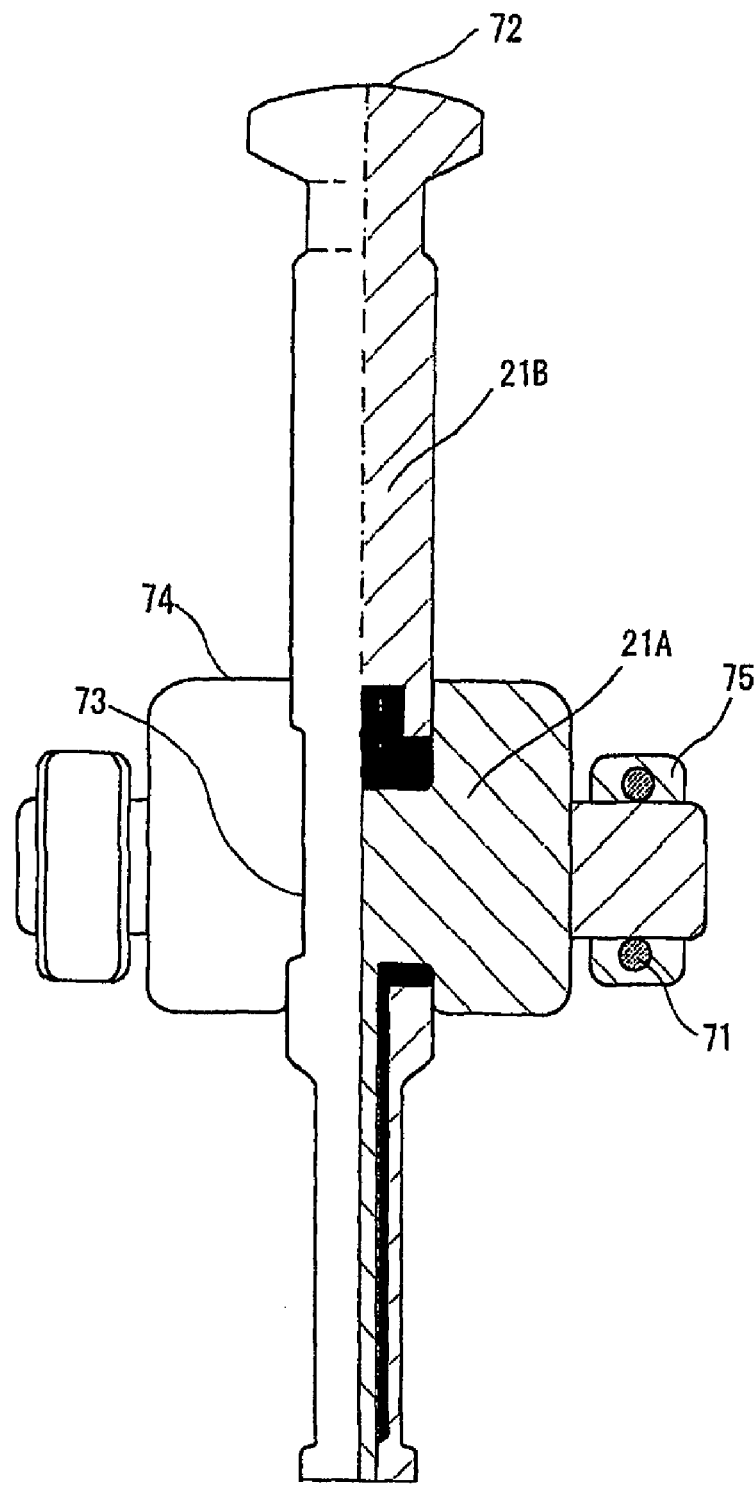
FIG. 28 illustrates an example of punch having the split punch structure used in the present invention, showing a vertical sectional view (right half) and schematic diagram (left half)

As already described in relation to the punches, means for moving the split A and B punches or means for allowing manipulation of the split A and B punches for compression operation include not only the method of controlling the motions of the split B punches by the vertical sliding motion adjustment rollers and tracks thereof and the motions of the split A punches by the split A punch bottom portions (substantially the same location as the split A punch compression heads) and tracks thereof (corresponds to the punches shown in FIG. 27) as shown in FIG. 32 but also an alternative method that is a reverse thereof in which the motions of the split A punches are controlled by the vertical sliding motion adjustment rollers and tracks and the motions of the split B punches by the punch bottom portions and tracks (FIG. 28).

A description has been given so far of the embodiment of the apparatus corresponding to the aforementioned second embodiment of the manufacturing method of the present invention (FIG. 7) as the apparatus of the present invention that is the rotary press for manufacturing a molded product consisting of a plurality of molded parts part of whose at least two molded parts faces outside of the molded product. As for the rotary presses corresponding to embodiments other than the above, it is possible to readily construct such rotary presses by selecting split punches suitable for respective manufacturing steps and molded product and incorporating means for moving the respective split punches and means for allowing manipulation of the split punches for compression operation in conformance with the apparatus corresponding to the second embodiment.

A description will be given next of molded products that can be manufactured by the rotary press for manufacturing a molded product consisting of a plurality of molded parts part of whose at least two molded parts faces outside of the molded product and whose characters and/or graphics can be externally identified.

The molded product of the present invention whose characters and/or graphics can be externally identified is characterized in that the product consists of a plurality of molded parts part of whose at least two molded parts faces outside of the molded product, that the characters and/or graphics is shaped by at least one molded part and that the molded part shaping the characters and/or graphics differs from other molded parts in color. That is, the molded product allows the shape of the characters and/or graphics, represented by at least one molded part, to be correctly externally identified by difference in color between molded parts. Here, the term "molded parts" refers to press-molded parts obtained by directly compressing and molding molding materials such as bulk materials as described earlier. That is, such parts are fundamentally different from molded parts, etc. manufactured by cast molding or plastic molding.

The molded product of the present invention is basically that which can represent characters and/or graphics by molded parts of different color from other molded parts. In the present molded products, while part or majority of the molded parts shaping characters and/or graphics may be covered by other molded parts and the molded parts shaping characters and/or graphics may shape the outline of the molded product, an intermediate configuration therebetween may also be used. While one molded part may be used to represent characters and/or graphics, a plurality of molded parts may also be used to do so. The fact that some molded parts shape characters and/or graphics means that other molded parts different in color also naturally shape the characters and/or graphics or part thereof in the same outline at the adjacent locations.

The fact that two molded parts are different from each other in color literally means that there is a difference in color between the two molded parts and more precisely a difference in color related information in terms of one or more options selected from among hue, brightness and chroma. Further in detail, this indicates that the absolute value, defined by $\Delta L^*$, $\Delta a^*$, $\Delta b^*$ that are the differences in coordinates $L^*$, $a^*$, $b^*$ in the $L^*a^*b^*$ color specification system, is 0 or more. It is to be noted that use of one transparent molded part may be possible in applications other than drugs. In this case, the molded parts can be said to be different in color if the other molded part is not transparent or if the part is different in degree of transparency. The term "characters and/or graphics" in the present invention refers to numbers and also characters in a narrow sense as far as characters are concerned and more specifically includes languages in a broad sense such as numbers, kanji, hiragana, katakana and English. The term "graphics", on the other hand, means shapes conveying some kind of meaning such as marks, signs, emblems and trademarks and further all graphics in a broad sense such as graphics and symbols used simply from the viewpoint of design. It is to be understood that characters and graphics may be used alone or together.

It is possible according to the present invention to mass-produce molded products whose characters and/or graphics of the same standard can be externally identified. That is, the present invention makes it possible to provide a set of molded products whose characters and/or graphics of the same standard can be externally identified. The term "of the same standard" refers to the fact that the shapes, colors and absolute positions of the molded parts, within the final molded product, that shape characters and/or graphics remain unchanged. It is possible according to the present invention to arrange specific molded parts correctly at specific positions since the manufacturing method thereof has the property to prevent displacement of molded parts. Further, the present invention uses molding materials of different colors so as to ensure that the molded parts shaping characters and/or graphics differ in color from other molded parts. Since respective molding materials may be of the same origin, these molding materials basically remain unchanged in color between molded products. Assuming conventional printing, the shape and color may change due to "faded print", and the position readily moves due to "print deviation", which makes the present invention stand in contrast to the prior art. It is to be noted that the term "a set of molded products" refers to a number of mass-produced molded products that may be, for example, 1000 pieces or more or 10000 pieces or more.

A further detailed description will be given below of the case in which the molded product of the present invention whose characters and/or graphics can be externally identified is used for drugs.

It suffices for the molded product of the present invention whose characters and/or graphics can be externally identified to be shaped so as to be easy to hold or so as not to cause malaise when consumed and is not specifically limited. However, it is preferred that the molded product be circular or elliptical as with ordinary drugs.

It suffices for the molded product of the present invention whose characters and/or graphics can be externally identified to be sized so as to be insertable into the mouth and so as not to involve difficulties in deglutition, and it suffices, in the case of a circular tablet, to design the tablet to be about 16 mm or less in diameter or 3 mm to 16 mm in diameter and preferably 5 mm to 13 mm in diameter.

Various additives regularly used in the field of formulation technology such as filler, binder, disintegrator, lubricant and anti-cohesion agent may be, if desired, mixed into molding materials for respective molded parts of the molded product of the present invention whose characters and/or graphics can be externally identified. The amount of addition thereof may be used without any problem based on the scope of knowledge regularly used in the field of formulation technology. It is also possible to obtain a pleasant feeling of consumption by flavoring or scenting respective molded parts with sweeteners and scenting agents regularly used in the field of formulation technology.

As for coloring agents that may be used for coloring molded parts, it suffices to use those regularly used in the field of formulation technology. Possible coloring agents include yellow ferric oxide, red ferric oxide, amaranth, amaranth aluminum lake, tartrazine, tartrazine aluminum lake, fast green FCF, fast green FCF aluminum lake, brilliant blue, brilliant blue aluminum lake, copper chlorophyll, etc.

It is to be understood that while ingredients allowed to be contained in respective molded parts may be used as is, granulated granular substance may be prepared once by granulation by a normal method and sized as necessary for use. It is also possible to prepare granulated granular substance by coating the main ingredient and a binder on an inactive carrier. In the case of an active ingredient of drugs, granulated granular substance may be further coated as necessary with sustained release capsule, time lag capsule, enteric capsule, gastric capsule, water soluble capsule, etc.

Next, a detailed description will be given of the method for manufacturing the molded product of the present invention whose characters and/or graphics can be externally identified.

The molded product of the present invention whose characters and/or graphics can be externally identified can be readily manufactured using the rotary press of the present invention for manufacturing a molded product consisting of a plurality of molded parts part of whose at least two molded parts faces outside of the molded product. That is, it is basically possible to manufacture the molded product of the present invention using compression molding means provided with punches above and below the die, the upper and lower punches having a double structure consisting of a center punch and an outer punch enclosing part or whole of the outer perimeter of the center punch, the tip portion of the center punch and/or the outer punch being shaped to represent characters and/or graphics and both the center and outer punches being slidable and manipulatable for compression operation, and by using molding materials of different colors from each other for the molded part shaping the characters and/or graphics and the other molded part. It is also possible to use punches having a further complex split structure or multistructured punches, while on the other hand, a normal punch with no split structure may be used for the lower punch. While the aforementioned compression molding means are preferably the rotary press of the present invention for manufacturing a molded product consisting of a plurality of molded parts part of whose at least two molded parts faces outside of the molded product, manufacture can be accomplished by manipulating the die and the punches with a manual press. It is to be understood that compression molding by following a series of steps using only a set of die and punches is referred to as integral molding. For instance, conventional press-coated molded products have been manufactured by molding the center molded part in advance with one press and supplying the part to another press halfway through the molding step, and the term "integral molding" has an implication that stands in contrast to such a conventional method. If the molded product of the present invention whose characters and/or graphics can be externally identified is thus defined, the features thereof manifest themselves particularly in the case of integral molding.

Next, a description will be given of the shape of the tip portions of the punches used for manufacturing the molded product of the present invention whose characters and/or graphics can be externally identified.

The fact that characters and/or graphics is shaped by at least one molded part means that the punch tip portions are shaped to represent the characters and/or graphics and that, when viewed from the molded parts, one or a plurality of molded parts formed by the punches represent the characters and/or graphics. In the example described later, "SA" or "Y1" is shaped, and although basically based on the shape of the tip portion of a single punch, each of these shapes consists of a plurality of molded parts as far as molded parts are concerned. In detail, such shapes correspond to the punch tip portions illustrated in FIG. 40. In FIG. 40, FIG. 40A-1 shows the tip portion of a center punch, and FIG. 40A-2 the tip portion of an outer punch. While at least the upper punch takes on such a form, the same form is commonly employed for both upper and lower punches. The same holds true for the tip portions shown in FIGS. 40B to 40E. The series of punches shown in FIGS. 40A to 40C are those designed to manufacture molded products in which the molded part molded by the center punch shapes characters and/or graphics. The punches shown in FIG. 40D are used to manufacture molded products in which the molded part molded by the outer punch shapes characters and/or graphics. The punches shown in FIG. 40E are designed to manufacture molded products in which respective molded parts molded by the center and outer punches shape characters and/or graphics. While, in the series of punches shown in FIGS. 40A, 40B and 40D, the center punch is completely enclosed by the outer punch, part of the center punch is enclosed by the outer punch in the series of punches shown in FIGS. 40C and 40E. It is to be noted that if the center punch is divided into "S" and "A" as in the case of the punch of FIG. 40A, it is preferred that the tip portion of a single center punch be branched into two portions—one for shaping S and the other for shaping A, for example—rather than using two independent punches as described earlier. Similarly, it is preferred that the molded part molded by the outer punch be the center portion of the center molded part "A" shaping the alphabet (corresponds to the inside enclosed within "A"). Thus, in the case of a molded product in which molded parts coexist in a complex manner, it is also preferred that a plurality of molded parts other than that shaping characters and/or graphics be molded by a single punch branched at the tip portion rather than by a plurality of independent punches. Thus, branching the tip portion of a single punch ensures that the same amount of pressure is transferred to a plurality of molded parts at the same speed during compression, thus maintaining the same moldability. Moreover, no complex form will result due to the punch structure, offering additional advantages in terms of punch manufacture and operation. Further, this allows simplification of the punch control means on the main body of the molding apparatus. It is also possible to have an integral punch structure by using a single structural body for the punch shell portion and a separate structural body for the punch tip portion and fastening the shell portion and a plurality of punch tip portions. It is alternately possible, although not preferred, to use a plurality of independent punches rather than a single punch branched at the tip thereof.

From here onwards, various embodiments will be illustrated in relation to the molded product whose characters and/or graphics can be externally identified and the manufacturing method thereof.

First, a description will be given of a cylindrical molded product in which the surrounding and side portions of the molded part shaping the alphabets "SA" are enclosed by the molded part of different color as shown in FIG. 38. The molded product can be manufactured by a method that conforms to the first embodiment (FIG. 5) using different colors for the first and second molding materials. Both the upper and lower punches used in this case have a double structure in which the tip portion of the center punch (FIG. 40A-1) shapes the alphabets "SA", with the tip portion of the outer punch (FIG. 40A-2) completely enclosing the tip portion of the center punch (FIG. 40A-1).

A description will be given next of a convex molded product in which the molded part shaping the alphabet and number "Y1" projects on one side of the molded product as shown in FIG. 39. The molded product can be manufactured by a method that conforms to the second embodiment (FIG. 7) using different colors for the first and second molding materials. The punches used in this case are those similar to the aforementioned punches in which the tip portion of the center punch shapes "Y1."

Figure 41:
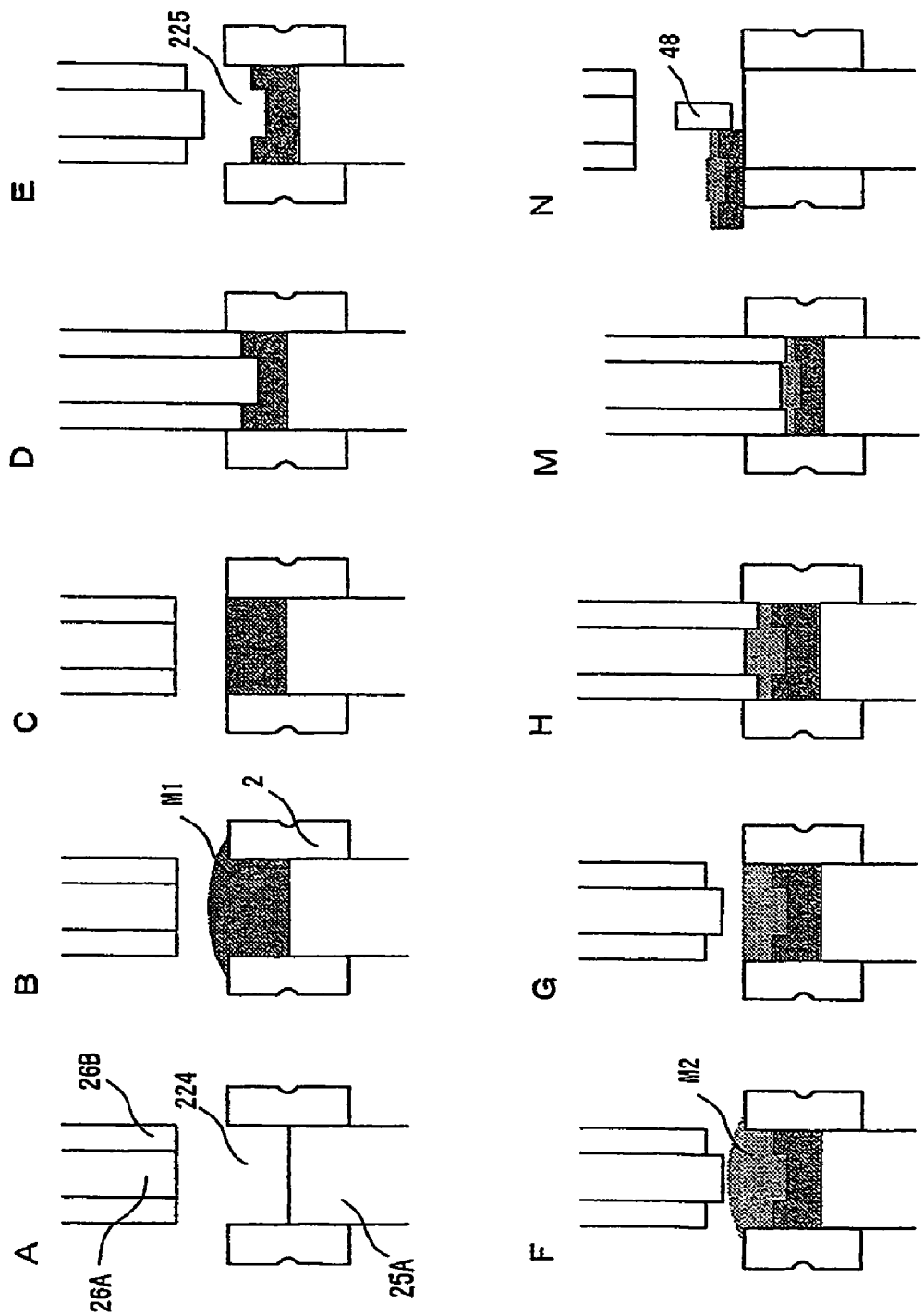
FIG. 41 illustrate explanatory views of punch tip operations showing a twelfth example of manufacturing steps using the manufacturing apparatus of the present invention for a molded product (corresponding to the molded product in FIGS. 42B-1 and 42B-2) consisting of a plurality of molded parts part of whose at least two molded parts faces outside of the molded product (shading as cross section omitted)

In addition to the above, if molding materials of apparently different colors are used as shown in the figures for the molded products manufactured using the rotary press of the present invention and consisting of a plurality of molded parts part of whose at least two molded parts faces outside of the molded product shown in the specific examples of steps for manufacturing a molded product, then these molded products can be said to be externally identifiable. In the embodiment of FIG. 41, it is also possible to manufacture a molded product having a molded part shaping characters and/or graphics on the surface of the molded product by using the upper center punch for shaping characters and/or graphics, reducing the amount of the second molding material and performing precompression only on the center punch portion in FIG. 41H and removing surrounding molding material as residual molding material.

It is to be understood that the technical scope of the present invention is not limited by the aforementioned embodiments.

INDUSTRIAL APPLICABILITY

The rotary press of the present invention makes possible mass production of molded products, among other molded products consisting of a plurality of molded parts, part of whose at least two molded parts faces outside of the molded products and is applicable to drugs, foods, sanitary products and living miscellaneous goods, metallurgy, electronic semiconductors and so on. The present invention also provides a new code identification system for molded products.

The invention claimed is:

1. A rotary press for manufacturing a molded product comprised of a plurality of molded parts of which at least two molded parts face outside of the molded product, the rotary press having a rotatable turn table that is provided with a die having a die hole, holding upper and lower punches above and below the die so as to be vertically slidable, and being designed to compress molding materials supplied and charged into the die by moving the upper and lower punches in mutually approaching directions and pressing the molding materials with the punch tips in a state inserted in the die, the rotary press comprising: an upper punch and a lower punch each of which is split into a plurality of split punches, and the tip surface of said lower punch has a concave portion; means for moving each of the plurality of split punches and means for allowing manipulation of at least two of the plurality of split punches for compression operation; a first molding material supply-charging unit for supplying and charging a first molding material into a space in the die formed above the tip portion of the lower punch or formed by the tip portions of the plurality of split punches of the lower punch; a second molding material supply-charging unit for supplying and charging a second molding material into a space formed above and around the first molding material in the die; a precompression molding unit for compression-molding at least one of the molding materials supplied and charged; a main compression molding unit for compression-molding the entire molded product; and a residual molding material removal unit operable to remove residual molding materials that are left behind in the concave portion of the lower punch after the operation of rubbing-cutting plates and before the addition of a further molding material.

2. The rotary press according to claim 1, further comprising a precompression molding unit for compression-molding each of the molding materials supplied and charged.

3. The rotary press according to claim 1, wherein at least one of the lower split punches is further split as opposed to the corresponding upper split punch and part or whole of a residual molding material remaining on the lower punch can be rubbed and cut by a rubbing-cutting plate as the split punch is raised.

4. The rotary press according to claim 2, wherein at least one of the lower split punches is further split as opposed to the corresponding upper split punch and part or whole of a residual molding material remaining on the lower punch can be rubbed and cut by a rubbing-cutting plate as the split punch is raised.

5. A molding press for manufacturing a molded product comprised of a plurality of molded parts, at least two of which face outside of the molded product, wherein the molding press comprises:
an upper punch;
a lower punch;
wherein each of the lower punch and the upper punch is split into a plurality of split punches;
wherein a tip surface of said lower punch defines a concave space above the tip surface of the lower punch;

punch drive apparatus operable to move at least one of the upper and lower punches in a compression direction towards the other of the upper and lower punches;

first molding material supply-charging apparatus operable to supply a first molding material into a space above the tip surface of the lower punch;

second molding material supply-charging apparatus operable to supply a second molding material into a space adjacent the first molding material supplied into the space above the tip surface of the lower punch;

precompression molding apparatus operable in a precompression molding operation to compression-mold at least the first molding material supplied into the space above the tip surface of the lower punch;

main compression molding apparatus operable in a main compression operation to compression-mold a molded product comprising the precompressed first molding material and the second molding material; and residual molding material removal apparatus operable to remove residual molding material remaining in the concave space above the tip surface of the lower punch after the precompression operation is begun and before a further molding material is supplied into the space above the tip surface of the lower punch.

6. The molding press of claim 5, and further comprising at least one rubbing-cutting plate operable to remove molding material from the space above the tip surface of the lower punch, wherein the residual molding material removal apparatus is operable to remove molding material remaining in the concave space defined by the tip surface of the lower punch after the molding material has been removed from the space above the tip surface of the lower punch by the operation of the rubbing-cutting plate.

7. The molding press of claim 5, wherein the precompression molding apparatus is operable in the precompression molding operation to compression-mold both of the first and second molding materials supplied into the space above the tip surface of the lower punch.

8. The molding press of claim 5, wherein the molding press is a rotary press that includes a rotary turntable.

* * * * *